United States Patent
Wang et al.

(10) Patent No.: US 12,043,573 B2
(45) Date of Patent: *Jul. 23, 2024

(54) ADHESION PROMOTERS AND GEL-MODIFIERS FOR OLEFIN METATHESIS COMPOSITIONS

(71) Applicant: MATERIA, INC., Pasadena, CA (US)

(72) Inventors: Li-Sheng Wang, Azusa, CA (US); Anthony R. Stephen, South Pasadena, CA (US); Paul W. Boothe, Brooklyn, NY (US); Tessa Schulze, Altadena, CA (US); Michael A. Giardello, Pasadena, CA (US); Mark S. Trimmer, Monrovia, CA (US); Christopher J. Cruce, Poway, CA (US); Farshad J. Motamedi, Claremont, CA (US); Brian Edgecombe, Anaheim, CA (US)

(73) Assignee: MATERIA, INC., Pasadena, CA (US)

( * ) Notice: Subject to any disclaimer, the term of this patent is extended or adjusted under 35 U.S.C. 154(b) by 71 days.

This patent is subject to a terminal disclaimer.

(21) Appl. No.: 17/365,433

(22) Filed: Jul. 1, 2021

(65) Prior Publication Data

US 2022/0089481 A1    Mar. 24, 2022

Related U.S. Application Data

(60) Division of application No. 16/571,350, filed on Sep. 16, 2019, now abandoned, which is a continuation of
(Continued)

(51) Int. Cl.
  *C03C 25/30* (2018.01)
  *C08F 32/02* (2006.01)
(Continued)

(52) U.S. Cl.
  CPC .............. *C03C 25/30* (2013.01); *C08F 32/02* (2013.01); *C08K 5/0025* (2013.01); *C08K 5/14* (2013.01);
(Continued)

(58) Field of Classification Search
  CPC ....... C03C 25/30; C08F 32/02; C08K 5/0025; C08K 5/14; C08K 5/29; C08K 2201/014;
(Continued)

(56) References Cited

U.S. PATENT DOCUMENTS 4,049,616 A    9/1977  Scott et al.
4,288,479 A *  9/1981  Brack ................... C08G 69/26
                                              522/174

(Continued)

FOREIGN PATENT DOCUMENTS

EP    1 535 941 A1    6/2005
EP    1589055 A1     10/2005
(Continued)

OTHER PUBLICATIONS

Chatterjee et al., "A General Model for Selectivity in Olefin Cross Metathesis," J. Am. Chem. Soc., 2003, 125, pp. 11360-11370.
(Continued)

*Primary Examiner* — Andrew J. Oyer

(57) ABSTRACT

This invention relates to compositions and methods for improving the adhesion of resin compositions to substrate materials, pre-treating substrate materials to improve the adhesion of resin compositions to the substrate materials, and/or controlling gel formation of resin compositions. More particularly, the invention relates to compositions and methods for improving the adhesion of ring opening metathesis polymerization (ROMP) compositions to substrate materials using adhesion promoters containing isocyanate groups in a resin composition. The invention also relates to
(Continued)

methods for improving the adhesion of resin compositions to substrate materials by pre-treating substrate materials with adhesion promoters containing isocyanate groups. The invention further relates to a method of providing a gel-modified ROMP composition, in which a hydroperoxide is added to a ROMP polymerizable resin composition in order to control gel formation of the polymerizing resin. An improved ROMP composition is further disclosed, comprising a cyclic olefin, a ROMP metathesis catalyst, an adhesion promoter, and an added hydroperoxide gel modifier. The polymer products produced via ROMP reactions of the invention may be utilized for a wide range of materials and composite applications. The invention has utility in the fields of catalysis, organic synthesis, and polymer and materials chemistry and manufacture.

24 Claims, 2 Drawing Sheets

Related U.S. Application Data application No. 14/125,837, filed as application No. PCT/US2012/042850 on Jun. 17, 2012, now Pat. No. 10,457,597.

(60) Provisional application No. 61/654,744, filed on Jun. 1, 2012, provisional application No. 61/498,528, filed on Jun. 17, 2011.

(51) Int. Cl.
    C08G 61/08    (2006.01)
    C08K 5/00     (2006.01)
    C08K 5/14     (2006.01)
    C08K 5/29     (2006.01)

(52) U.S. Cl.
    CPC ............ C08K 5/29 (2013.01); C08G 61/08 (2013.01); C08G 2261/3325 (2013.01); C08G 2261/418 (2013.01); C08K 2201/014 (2013.01)

(58) Field of Classification Search
    CPC ............ C08G 61/08; C08G 2261/3325; C08G 2261/418; B32B 27/18
    See application file for complete search history.

(56) References Cited

U.S. PATENT DOCUMENTS

| | | | |
|---|---|---|---|
| 4,380,617 A | 4/1983 | Minchak et al. |
| 4,584,425 A | 4/1986 | Tom |
| 4,708,969 A | 11/1987 | Leach |
| 4,722,978 A | 2/1988 | Yu et al. |
| 4,902,560 A | 2/1990 | Silver |
| 4,943,397 A | 7/1990 | Johnson |
| 4,990,549 A | 2/1991 | Delvin et al. |
| 5,055,499 A | 10/1991 | Endo et al. |
| 5,063,103 A | 11/1991 | Sugawara et al. |
| 5,096,644 A | 3/1992 | Endo et al. |
| 5,219,656 A | 6/1993 | Klett et al. |
| 5,312,940 A | 5/1994 | Grubbs et al. |
| 5,342,909 A | 8/1994 | Grubbs et al. |
| 5,378,783 A | 1/1995 | Okumura et al. |
| 5,428,098 A | 6/1995 | Brekner et al. |
| 5,728,785 A | 3/1998 | Grubbs et al. |
| 5,840,238 A | 11/1998 | Setiabudi et al. |
| 5,939,504 A | 8/1999 | Woodson, Jr. et al. |
| 5,973,085 A | 10/1999 | Muhlebach et al. |
| 5,977,393 A | 11/1999 | Grubbs et al. |
| 6,001,909 A | 12/1999 | Setiabudi |
| 6,020,443 A | 2/2000 | Woodson et al. |
| 6,040,363 A | 3/2000 | Warner et al. |
| 6,107,420 A | 8/2000 | Grubbs et al. |
| 6,284,852 B1 | 9/2001 | Lynn et al. |
| 6,310,121 B1 | 10/2001 | Woodson et al. |
| 6,323,296 B1 | 11/2001 | Warner et al. |
| 6,409,875 B1 | 6/2002 | Giardello et al. |
| 6,486,279 B2 | 11/2002 | Lynn et al. |
| 6,525,125 B1 | 2/2003 | Giardello et al. |
| 6,552,139 B1 | 4/2003 | Herrmann et al. |
| 6,613,910 B2 | 9/2003 | Grubbs et al. |
| 6,620,955 B1 | 9/2003 | Pederson et al. |
| 6,635,768 B1 | 10/2003 | Herrmann et al. |
| 6,787,620 B2 | 9/2004 | Herrmann et al. |
| 6,838,489 B2 | 1/2005 | Bell et al. |
| 6,890,650 B2 | 5/2005 | Hedden |
| 6,908,970 B2 | 6/2005 | Tsunogae et al. |
| 6,921,735 B2 | 7/2005 | Hoveyda et al. |
| 6,995,226 B2 | 2/2006 | Taguchi et al. |
| 7,025,851 B2 | 4/2006 | Caster et al. |
| 7,026,495 B1 | 4/2006 | Pederson et al. |
| 7,294,717 B2 | 11/2007 | Herrmann et al. |
| 7,339,006 B2 | 3/2008 | Giardello et al. |
| 7,374,863 B2 | 5/2008 | Sugasaki et al. |
| 7,378,528 B2 | 5/2008 | Herrmann et al. |
| 7,381,782 B2 | 6/2008 | Sugawara et al. |
| 7,476,716 B2 | 1/2009 | Sugawara |
| 7,576,227 B2 | 8/2009 | Lysenko et al. |
| 7,652,145 B2 | 1/2010 | Herrmann et al. |
| 7,671,224 B2 | 3/2010 | Winde et al. |
| 7,687,635 B2 | 3/2010 | Verpoort et al. |
| 7,700,698 B2 | 4/2010 | Iwasaki et al. |
| 7,771,834 B2 | 8/2010 | Sugawara |
| 7,879,963 B2 | 2/2011 | Koeniger et al. |
| 7,902,279 B2 | 3/2011 | Lin et al. |
| 7,927,538 B2 | 4/2011 | Moszner et al. |
| 7,964,320 B2 | 6/2011 | Giardello et al. |
| 8,318,965 B2 | 11/2012 | Grela et al. |
| 8,597,794 B2 | 12/2013 | Gairdello et al. |
| 2002/0166629 A1 | 11/2002 | Caster et al. |
| 2002/0172787 A1 | 11/2002 | Warner et al. |
| 2003/0055262 A1 | 3/2003 | Grubbs et al. |
| 2004/0019142 A1* | 1/2004 | Rink ............ C08G 18/4063 524/377 |
| 2006/0211809 A1 | 9/2006 | Kodemura et al. |
| 2006/0211834 A1* | 9/2006 | Sugawara ............ B32B 15/08 526/283 |
| 2007/0037946 A1 | 2/2007 | Sugawara |
| 2007/0043188 A1 | 2/2007 | Schaubroeck et al. |
| 2007/0185343 A1 | 8/2007 | Verpoort et al. |
| 2008/0090176 A1 | 4/2008 | Kusunoki et al. |
| 2008/0293905 A9 | 11/2008 | Schaubroeck et al. |
| 2009/0061713 A1 | 3/2009 | Lin et al. |
| 2009/0143510 A1 | 6/2009 | Lin et al. |
| 2010/0015871 A1 | 1/2010 | Tanimoto et al. |
| 2010/0029801 A1 | 2/2010 | Moszner et al. |
| 2010/0144924 A1 | 6/2010 | Akihiko et al. |
| 2011/0237718 A1 | 9/2011 | Yoshiwara |
| 2012/0088879 A1* | 4/2012 | Yoshiwara ............ C08K 5/14 524/554 |

FOREIGN PATENT DOCUMENTS

| | | |
|---|---|---|
| EP | 2151214 B1 | 2/2010 |
| EP | 1757613 B1 | 1/2011 |
| EP | 2280017 B1 | 2/2011 |
| EP | 1577282 B1 | 6/2011 |
| EP | 2 444 438 A1 | 4/2012 |
| JP | 2010111881 A | 5/2010 |
| WO | 96/16008 A1 | 5/1996 |
| WO | 97/14738 A1 | 4/1997 |
| WO | 99/11454 A1 | 3/1999 |
| WO | 2000/046257 A1 | 8/2000 |
| WO | 02/14376 A2 | 2/2002 |
| WO | 02/079208 A2 | 10/2002 |
| WO | 03/011455 A1 | 2/2003 |
| WO | 2010/037550 A1 | 4/2010 |

(56) References Cited

FOREIGN PATENT DOCUMENTS

| WO | 2010/147116 A1 | 12/2010 |
|---|---|---|
| WO | 2010147116 A1 | 12/2010 |

OTHER PUBLICATIONS

Sanford et al., "New Insights into the Mechanism of Ruthenium-Catalyzed Olefin Metathesis Reactions," J. Am. Chem. Soc., 2001, 123, pp. 749-750.
Scholl et al., "Synthesis and Activity of a New Generation of Ruthenium-Based Olefin Metathesis Catalysts Coordinated with 1,3-Dimesityl-4,5-dihydroimidazol-2-ylidene Ligands," Org. Lett., 1999, vol. 1, No. 6, pp. 953-956.
Schwab et al., "Synthesis and Applications of RuCl2(=CHR')(PR3)2: The Influence of the Alkylidene Moiety on Metathesis Activity," J. Am. Chem. Soc., 1996, 118, pp. 100-110.
International Search Report and Written Opinion for PCT International Application No. PCT/US2012/042850, dated Jan. 21, 2013.
International Preliminary Report on Patentability for PCT International Application No. PCT/US2012/042850, dated Jan. 3, 2014.
Written Opinion and Search Report for SG 201309291l, dated Nov. 2, 2014.
Supplementary Partial European Search Report for EP 12 80 1260 dated Apr. 27, 2015.
English abstract of JP 2010111881.
Hercules Incorporated; "Improving Adhesion between Poly (Dicyclopentadiene) and Carbon Fiber," Research Disclosure, Nov. 1992; No. 343.

* cited by examiner

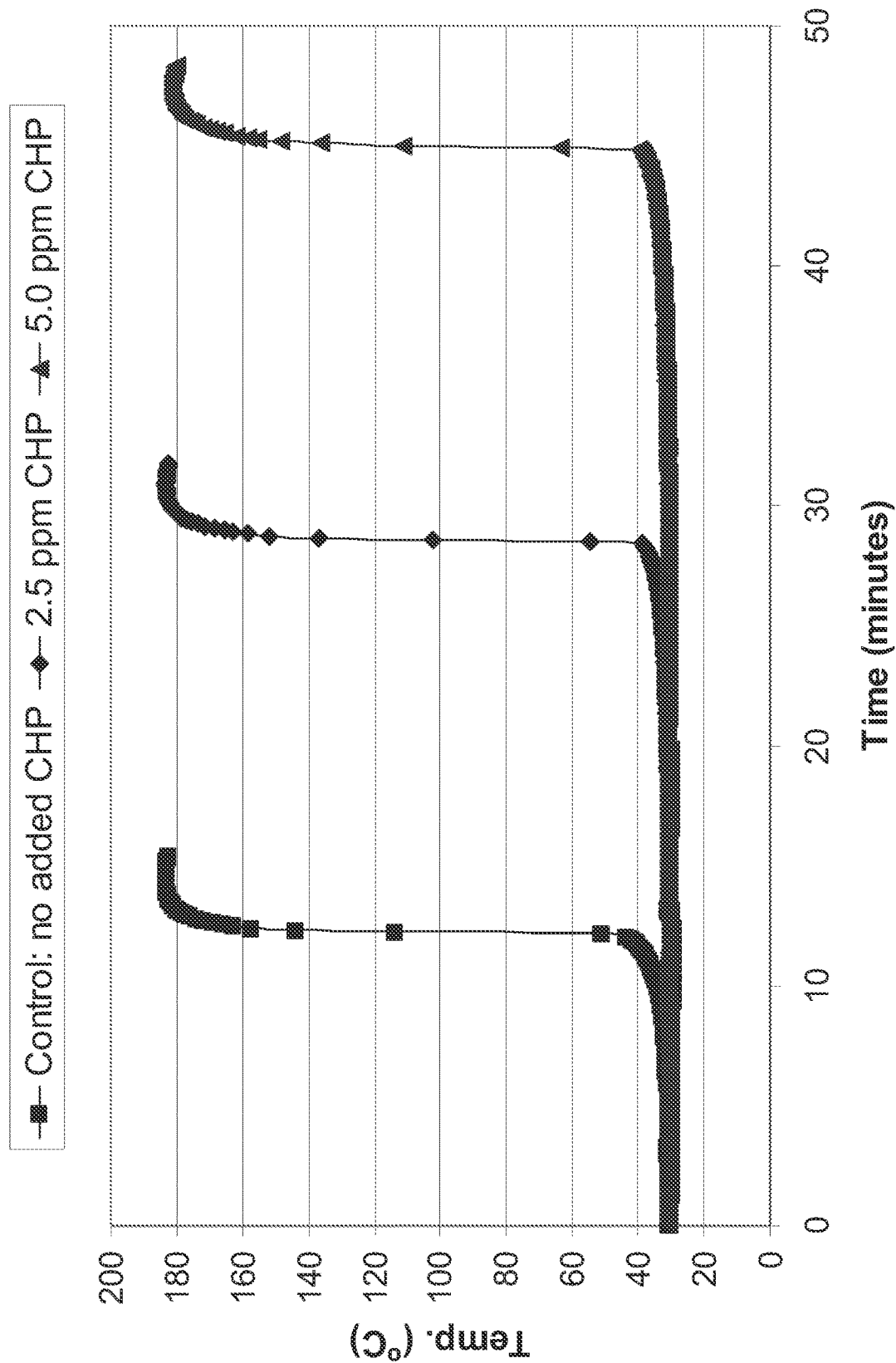
FIG. 1 Effect of Cumyl Hydroperoxide (CHP) on Exotherm Time

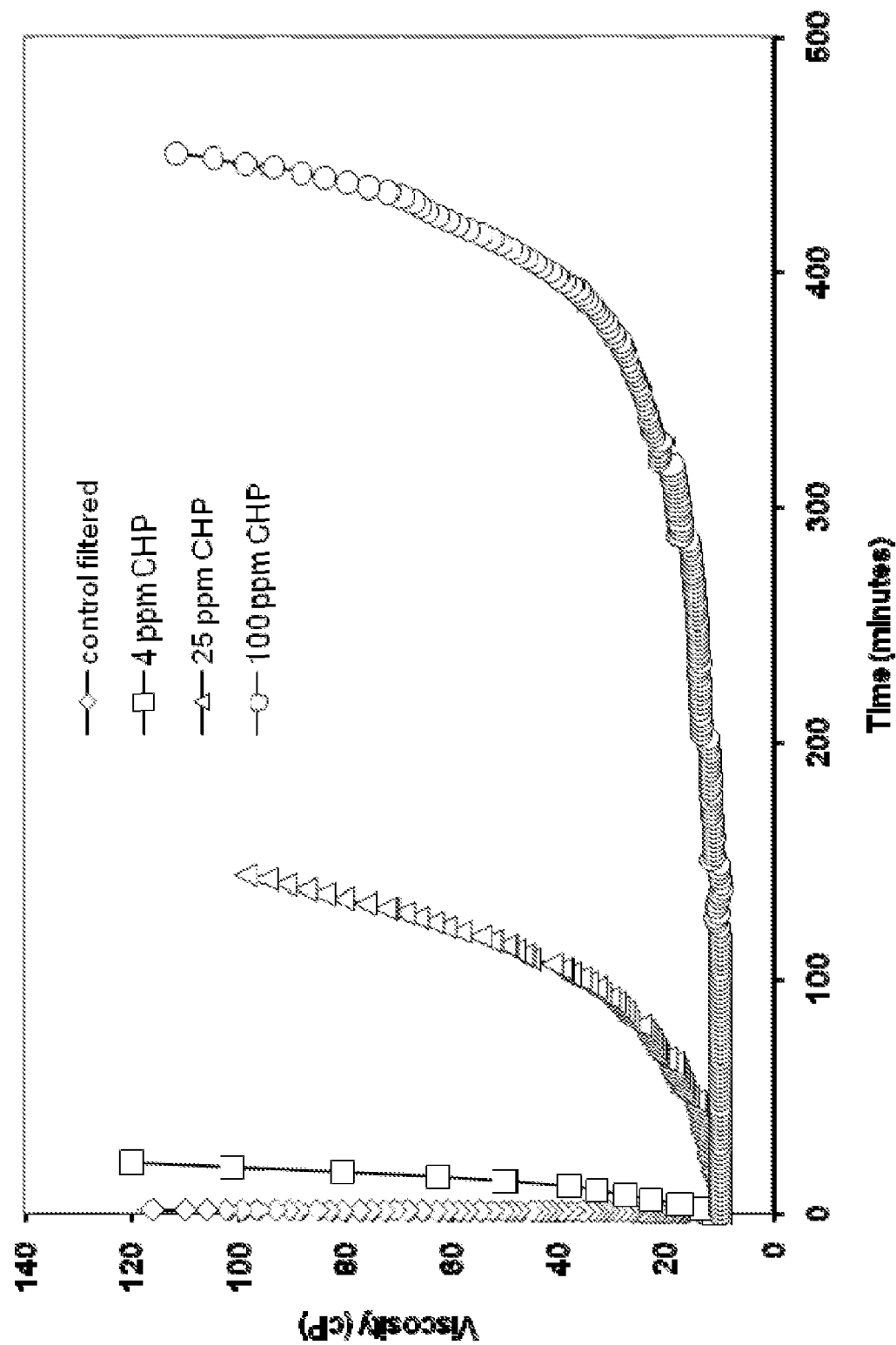

ADHESION PROMOTERS AND GEL-MODIFIERS FOR OLEFIN METATHESIS COMPOSITIONS

RELATED APPLICATIONS

This application is Divisional of U.S. application Ser. No. 16/571,350, filed Sep. 16, 2019; which is a Continuation of U.S. application Ser. No. 14/125,837, filed Jul. 17, 2014; which is a national stage application of PCT/US2012/042850, filed Jun. 17, 2012; which claims the benefit of U.S. Provisional Patent Application No. 61/498,528, filed Jun. 17, 2011, and U.S. Provisional Patent Application No. 61/654,744, filed Jun. 1, 2012, and the contents of which are incorporated herein by reference in its entirety.

TECHNICAL FIELD

The present invention relates to methods and compositions for improving the adhesion of olefin metathesis compositions to substrate materials, and for catalyzing and controlling olefin metathesis reactions. More particularly, the invention relates to methods and compositions for improving the adhesion of ring opening metathesis polymerization (ROMP) compositions to substrate materials, and for catalyzing and controlling ROMP reactions and the manufacture of polymer articles via ROMP. Polymer products produced via the metathesis reactions of the invention may be utilized for a wide range of materials and composite applications. The invention has utility in the fields of catalysis, organic synthesis, and polymer and materials chemistry and manufacture.

BACKGROUND

Polymer-matrix composites offer unique combinations of properties and are useful in a wide range of applications. Such composites may be fabricated utilizing either thermosetting or thermoplastic polymer matrix materials with a variety of particulate or fibrous fillers or reinforcements. It is generally advantageous to have strong adhesion between the polymer matrix material and the surfaces of the various particulate or fibrous substrates and there is considerable art related to substrate finishes and other treatments to optimize adhesion to polymer matrices. For example, in the production of long-fiber reinforced composites, improved adhesion between the polymer matrix and the fiber reinforcement leads to increased material performance. Good adhesion is particularly important where failures are likely to occur by delamination or by other adhesive failure modes.

As described in, for example, U.S. Pat. Nos. 5,840,238, 6,310,121, and 6,525,125, the disclosures of each of which are incorporated herein by reference, polymers generated by olefin metathesis processes are attractive as composite matrix materials. Of particularly beneficial use are the polymers generated by the ROMP of cyclic olefins. The low viscosity of cyclic olefin resin formulations and the ability to control ROMP kinetics (e.g., U.S. Pat. Nos. 4,708,969 and 5,939,504, the disclosures of both of which are incorporated herein by reference) facilitate composite processing and manufacture, and the corrosion resistance and high toughness of ROMP polymers leads to good composite durability. Additionally, certain properties of ROMP polymers, e.g., mechanical strength and stiffness, heat distortion temperature and solvent resistance, can be further enhanced by crosslinking induced via thermal treatment (e.g., U.S. Pat. No. 4,902,560, the disclosure of which is incorporated herein by reference) or chemically by addition of peroxides (e.g., U.S. Pat. No. 5,728,785, the disclosure of which is incorporated herein by reference).

Commercially important ROMP resin formulations are generally based on readily available and inexpensive cyclic olefins such as dicyclopentadiene (DCPD), norbornenes, cyclooctadiene (COD), and various cycloalkenes. However, in contrast to traditional resin systems (e.g., epoxy, acrylate, urethane, and polyester resins) based on polar functional group chemistries, these nonpolar ROMP resins have poor intrinsic adhesion to the relatively polar surfaces of common carbon, glass, or mineral fillers and reinforcements. The addition of various silanes to such resin formulations for improvement of electrical and mechanical properties of ROMP polymers is described in U.S. Pat. Nos. 5,840,238, 6,001,909, and 7,339,006, the disclosures of each of which are incorporated herein by reference. Many widely used commercial silanes do not give optimal properties with ROMP polymers, however, and the greatest enhancements are only obtained when the silanes comprise groups with high metathesis activity (the relative reactivity of various metathesis active groups is described in J. Am. Chem. Soc., 2003, 125, 11360-11370).

Polymers generated by ROMP are particularly well-suited for casting of molded parts and infusion of resin-glass and resin-wood composites, as non-limiting examples. According to one method process, the cyclic olefin monomer is blended with appropriate additives and fillers, and then mixed with an olefin metathesis catalyst. The initial resin mixture is typically a low-viscosity liquid, allowing for a wide range of resin infusion and casting techniques. As the polymerization proceeds, the resin first "gels" (increases in viscosity such that it no longer flows freely) and then "cures" as the resin reaches peak monomer conversion. The kinetics of the rate of gel and cure of olefin metathesis polymerizations depend on monomer, catalyst, and temperature.

When manufacturing articles using olefin metathesis polymerization, any pouring or infusion of catalyzed resin must be complete before the resin viscosity increases to the point that the resin no longer flows to fill the mold under the manufacturing conditions. Pouring or infusion of highly viscous (pre-gelled) or gelled resin may lead to inclusion of trapped air, or produce other defects or conditions that decrease the mechanical properties or visual appearance of the manufactured part. It would, therefore, be desirable to control the gel formation process, in particular to delay the onset of viscosity increase and the onset of the resin gel and cure states, through the use of a gel modification agent. Once the pour or infusion is complete, it would be further advantageous for the onset of polymerization to begin within a reasonable time after the mold is filled, and to proceed at a desirable rate of cure.

The time during which the liquid monomer/catalyst mixture can be worked after the monomer and catalyst is mixed is called the "pot life" of the polymerization reaction mixture. The ability to control the "pot life" becomes even more important for the molding of large parts and to achieve defect-free infusion of porous materials. It would be particularly useful to be able to control the gel formation process, especially the onset of the gel state, of catalyzed ROMP reactions when such large parts are to be produced, or when defects arising from viscosity build-up are to be reduced or eliminated.

Certain limited types of gel modification agents for olefin metathesis polymerizations have been disclosed. For example, U.S. Pat. No. 5,939,504 discloses the use of phosphines, pyridines, and other Lewis bases as gel modifiers. While useful, the effect of such gel modifiers in ROMP reactions can be difficult to control, particularly where relatively small changes in the onset of polymerization are desired. For example, while the addition of small amounts of tributylphosphine, a commercially attractive additive because of its low cost, may produce no noticeable change in pot life, adding a slightly greater amount may overshoot the desired effect by creating a significantly longer delay in the onset of polymerization than desired. From a practical perspective, the inability to finely control the gel formation process makes these gel modifiers less useful in the manufacture of articles of large or varying dimensions. Certain gel modifiers, such as phosphines, also oxidize quite quickly in resin thereby decreasing the ability of the modifier to extend the pot life. Resin compositions relying on phosphine compounds for gel modification, therefore, cannot be stored for any appreciable length of time without reformulation with fresh gel modification additive.

Although acting as activators in some systems (e.g., U.S. Pat. Nos. 4,380,617 and 4,049,616), active oxygen containing compounds, including hydroperoxides, are generally considered to have a negative impact on metathesis catalyst performance. Olefins intended for use in metathesis reactions are often chemically treated (e.g., U.S. Pat. No. 5,378,783) or pre-treated with an adsorbent such as alumina or zeolites (e.g., U.S. Pat. Nos. 7,700,698; 4,943,397; and 4,584,425) to reduce the concentration of oxygen-containing impurities such as hydroperoxides. For example, U.S. Pat. No. 4,584,425 shows that hydroperoxide compounds have a significant negative impact on the ROMP of DCPD with a two part tungsten metathesis catalyst and U.S. Pat. No. 7,576,227 teaches that it is advantageous to remove hydroperoxides and other catalyst poisons to improve cross metathesis turnover number when using ruthenium alkylidene catalysts.

Hydroperoxide additives have been suggested as post-polymerization radical crosslinking initiators for ROMP polymers (e.g., U.S. Pat. Nos. 7,025,851 and 7,476,716). However, U.S. Pat. No. 5,728,785 specifically shows that ROMP of dicyclopentadiene fails in the presence of 1 wt. % (relative to dicyclopentadiene) of tert-butyl hydroperoxide, a level typically useful to effect post-polymerization crosslinking. Others teach that additives used in ROMP formulations should not contain hydroperoxide functionalities, so as to avoid adverse interactions with metathesis catalysts (e.g., U.S. Pat. Nos. 6,323,296 and 6,890,650, the disclosures of which are incorporated herein by reference).

Despite the advances achieved in the art, particularly in the properties of olefin metathesis polymers and their associated applications, a continuing need therefore exists for further improvement in a number of areas, including the adhesion of olefin metathesis compositions, in particular, ROMP compositions, to substrate materials, especially the wide variety of existing substrate materials that have been used with traditional resin systems, and the use of certain gel-modifiers to control the gel formation process of polymerizing ROMP compositions.

SUMMARY OF THE INVENTION

The invention is directed to addressing one or more of the aforementioned concerns and relates to the use of an adhesion promoter in a resin composition, such as a ROMP composition, or as a substrate material pre-treatment to provide useful improvements in the adhesion of a metathesis catalyzed composition to the substrate material, and to the use of a hydroperoxide gel modifier in a ROMP composition to provide useful improvements in the ability to control a ROMP reaction. More particularly, the inventors have discovered that addition of an adhesion promoter according to the invention to a resin composition, particularly a ROMP composition, allows for improvements in the adhesion of the polymerized (resin) composition to the substrate material, without adversely affecting the mechanical properties of the polymerized resin. Alternatively, a substrate material may be pre-treated with an adhesion promoter according to the invention in order to improve the adhesion of the polymerized (resin) composition to the substrate material, without adversely affecting the mechanical properties of the polymerized resin. In addition, the inventors have discovered that addition of a hydroperoxide to the reaction mixture of a ROMP composition allows for superior control over the resin gel and cure formation process, without adversely affecting the mechanical properties of the polymerized ROMP material. Furthermore, the gel modification effect of hydroperoxides is remarkably stable in resin compared to other gel modification agents known in the art.

In one embodiment, the invention provides a method for improving the adhesion of an olefin metathesis reaction, for example, a ROMP reaction, of a cyclic olefin catalyzed by an olefin metathesis catalyst (e.g., a cyclic olefin metathesis catalyst) to a substrate material, in which an adhesion promoter is combined with a cyclic olefin, an olefin metathesis catalyst (e.g., a cyclic olefin metathesis catalyst), and a substrate material thereby forming a resin composition with improved mechanical properties. In another embodiment, the invention provides a method for improving the adhesion of an olefin metathesis reaction, for example, a ROMP reaction, of a cyclic olefin catalyzed by an olefin metathesis catalyst (e.g., a cyclic olefin metathesis catalyst) to a substrate material, such as, for example, a glass substrate material, in which an adhesion promoter is combined with a cyclic olefin, an olefin metathesis catalyst (e.g., a cyclic olefin metathesis catalyst), and a substrate material, such as, for example, a glass substrate material, thereby forming a resin substrate composite material with improved properties. The invention is further directed to a ROMP composition of a cyclic olefin, which may be functionalized or unfunctionalized and may be substituted or unsubstituted, a cyclic olefin metathesis catalyst, a hydroperoxide gel modifier, and an adhesion promoter. The inventive ROMP compositions are easy to handle and use and, when combined with a substrate material and cured, form resin substrate composite materials with improved properties. The adhesion promoter according to the invention, discussed infra, is generally comprised of a compound containing at least two isocyanate groups. An optionally metathesis active compound containing at least one heteroatom may be present in the ROMP composition. The resin composition is then subjected to conditions effective to promote an olefin metathesis reaction of the cyclic olefin in the presence of the olefin metathesis catalyst, the adhesion promoter, and substrate material. The resin composition may also be contacted with a substrate material, rather than, or in addition to the substrate material added to the resin composition, and then subjected to conditions effective to promote an olefin metathesis reaction of the cyclic olefin in the presence of the olefin metathesis catalyst, the adhesion promoter, and the optional added substrate material and/or in contact with the substrate material.

The invention is further directed to a resin composition, for example, a ROMP composition, of a cyclic olefin, which may be functionalized or unfunctionalized and may be substituted or unsubstituted, an olefin metathesis catalyst, an adhesion promoter, and a substrate material, such as, for example, a glass substrate material. In general, the adhesion promoter comprises a compound with at least two isocyanate groups. The adhesion promoter should be present in an amount effective to increase the adhesion of the resin composition to a substrate material when the resin composition is subjected to metathesis catalysis conditions in the presence of the substrate material. The adhesion promoter may also be a mixture of compounds, wherein each compound contains at least two isocyanates. In another embodiment, the adhesion promoter contains at least two isocyanates and contains an olefin metathesis active group. In another embodiment, the adhesion promoter contains at least two isocyanates and does not contain an olefin metathesis active group. In a further embodiment, the adhesion promoter may also contain an optional compound comprising a heteroatom-containing functional group and a metathesis active olefin.

The addition of the adhesion promoter of the invention provides beneficial improvements in the adhesion of an olefin metathesis (e.g., ROMP) composition to the substrate material, such as, for example, a glass substrate material, as compared to a resin composition that is the same with the exception that the adhesion promoter of the invention is not included.

In another embodiment, the invention provides a method for modifying the onset of a ROMP reaction of a cyclic olefin catalyzed by a cyclic olefin metathesis catalyst, in which a hydroperoxide gel modifier is combined with a cyclic olefin and a cyclic olefin metathesis catalyst, thereby forming a ROMP composition. The ROMP composition is then subjected to conditions effective to promote a ROMP reaction of the cyclic olefin in the presence of the cyclic olefin metathesis catalyst and the added hydroperoxide gel modifier.

The invention is further directed to a ROMP composition of a cyclic olefin, which may be functionalized or unfunctionalized and may be substituted or unsubstituted, a cyclic olefin metathesis catalyst, and a hydroperoxide gel modifier. The invention is also directed to a composition comprising a cyclic olefin, which may be functionalized or unfunctionalized and may be substituted or unsubstituted, a cyclic olefin metathesis catalyst, a hydroperoxide gel modifier, and an adhesion promoter of the invention.

In general, the hydroperoxide gel modifier is added in an amount effective to increase the gel time of a ROMP reaction of the cyclic olefin catalyzed by the cyclic olefin metathesis catalyst in the presence of the added hydroperoxide compared to a ROMP reaction of the same cyclic olefin catalyzed by the same cyclic olefin metathesis catalyst in the absence of the added hydroperoxide.

While the invention is of particular benefit for ring-opening metathesis polymerization (ROMP) reactions, it may also find use in combination with other metathesis reactions, such as a ring-opening cross metathesis reaction, a cross metathesis reaction, a self-metathesis reaction, an ethenolysis reaction, an alkenolysis reaction, or an acyclic diene metathesis polymerization reaction, as well as combinations of such metathesis reactions.

These and other aspects of the invention will be apparent to the skilled artisan in light of the following detailed description and examples.

BRIEF DESCRIPTION OF THE DRAWINGS

FIG. 1 depicts the effect of cumyl hydroperoxide (CHP) on exotherm time as described in the Examples.

FIG. 2 depicts the viscosity profile for ROMP of CHP-modified DCPD resin as described in the Examples.

DETAILED DESCRIPTION OF THE DISCLOSURE

Terminology and Definitions

Unless otherwise indicated, the invention is not limited to specific reactants, substituents, catalysts, reaction conditions, or the like, as such may vary. It is also to be understood that the terminology used herein is for the purpose of describing particular embodiments only and is not to be interpreted as being limiting.

As used in the specification and the appended claims, the singular forms "a," "an," and "the" include plural referents unless the context clearly dictates otherwise. Thus, for example, reference to "an α-olefin" includes a single α-olefin as well as a combination or mixture of two or more α-olefins, reference to "a substituent" encompasses a single substituent as well as two or more substituents, and the like.

As used in the specification and the appended claims, the terms "for example," "for instance," "such as," or "including" are meant to introduce examples that further clarify more general subject matter. Unless otherwise specified, these examples are provided only as an aid for understanding the invention, and are not meant to be limiting in any fashion.

In this specification and in the claims that follow, reference will be made to a number of terms, which shall be defined to have the following meanings:

The term "alkyl" as used herein refers to a linear, branched, or cyclic saturated hydrocarbon group typically although not necessarily containing 1 to about 24 carbon atoms, preferably 1 to about 12 carbon atoms, such as methyl, ethyl, n-propyl, isopropyl, n-butyl, isobutyl, t-butyl, octyl, decyl, and the like, as well as cycloalkyl groups such as cyclopentyl, cyclohexyl, and the like. Generally, although again not necessarily, alkyl groups herein contain 1 to about 12 carbon atoms. The term "lower alkyl" refers to an alkyl group of 1 to 6 carbon atoms, and the specific term "cycloalkyl" refers to a cyclic alkyl group, typically having 4 to 8, preferably 5 to 7, carbon atoms. The term "substituted alkyl" refers to alkyl substituted with one or more substituent groups, and the terms "heteroatom-containing alkyl" and "heteroalkyl" refer to alkyl in which at least one carbon atom is replaced with a heteroatom. If not otherwise indicated, the terms "alkyl" and "lower alkyl" include linear, branched, cyclic, unsubstituted, substituted, and/or heteroatom-containing alkyl and lower alkyl, respectively.

The term "alkylene" as used herein refers to a difunctional linear, branched, or cyclic alkyl group, where "alkyl" is as defined above.

The term "alkenyl" as used herein refers to a linear, branched, or cyclic hydrocarbon group of 2 to about 24 carbon atoms containing at least one double bond, such as ethenyl, n-propenyl, isopropenyl, n-butenyl, isobutenyl, octenyl, decenyl, tetradecenyl, hexadecenyl, eicosenyl, tetracosenyl, and the like. Preferred alkenyl groups herein contain 2 to about 12 carbon atoms. The term "lower alkenyl" refers to an alkenyl group of 2 to 6 carbon atoms, and the specific term "cycloalkenyl" refers to a cyclic alkenyl group, preferably having 5 to 8 carbon atoms. The term "substituted alkenyl" refers to alkenyl substituted with one or more substituent groups, and the terms "heteroatom-containing alkenyl" and "heteroalkenyl" refer to alkenyl in which at least one carbon atom is replaced with a heteroatom. If not otherwise indicated, the terms "alkenyl" and "lower alkenyl" include linear, branched, cyclic, unsubstituted, substituted, and/or heteroatom-containing alkenyl and lower alkenyl, respectively.

The term "alkenylene" as used herein refers to a difunctional linear, branched, or cyclic alkenyl group, where "alkenyl" is as defined above.

The term "alkynyl" as used herein refers to a linear or branched hydrocarbon group of 2 to about 24 carbon atoms containing at least one triple bond, such as ethynyl, n-propynyl, and the like. Preferred alkynyl groups herein contain 2 to about 12 carbon atoms. The term "lower alkynyl" refers to an alkynyl group of 2 to 6 carbon atoms. The term "substituted alkynyl" refers to alkynyl substituted with one or more substituent groups, and the terms "heteroatom-containing alkynyl" and "heteroalkynyl" refer to alkynyl in which at least one carbon atom is replaced with a heteroatom. If not otherwise indicated, the terms "alkynyl" and "lower alkynyl" include linear, branched, unsubstituted, substituted, and/or heteroatom-containing alkynyl and lower alkynyl, respectively.

The term "alkoxy" as used herein refers to an alkyl group bound through a single, terminal ether linkage; that is, an "alkoxy" group may be represented as —O-alkyl where alkyl is as defined above. A "lower alkoxy" group refers to an alkoxy group containing 1 to 6 carbon atoms. Analogously, "alkenyloxy" and "lower alkenyloxy" respectively refer to an alkenyl and lower alkenyl group bound through a single, terminal ether linkage, and "alkynyloxy" and "lower alkynyloxy" respectively refer to an alkynyl and lower alkynyl group bound through a single, terminal ether linkage.

The term "aryl" as used herein, and unless otherwise specified, refers to an aromatic substituent containing a single aromatic ring or multiple aromatic rings that are fused together, directly linked, or indirectly linked (such that the different aromatic rings are bound to a common group such as a methylene or ethylene moiety). Preferred aryl groups contain 5 to 24 carbon atoms, and particularly preferred aryl groups contain 5 to 14 carbon atoms. Exemplary aryl groups contain one aromatic ring or two fused or linked aromatic rings, e.g., phenyl, naphthyl, biphenyl, diphenylether, diphenylamine, benzophenone, and the like. "Substituted aryl" refers to an aryl moiety substituted with one or more substituent groups, and the terms "heteroatom-containing aryl" and "heteroaryl" refer to aryl substituents in which at least one carbon atom is replaced with a heteroatom, as will be described in further detail infra.

The term "aryloxy" as used herein refers to an aryl group bound through a single, terminal ether linkage, wherein "aryl" is as defined above. An "aryloxy" group may be represented as —O-aryl where aryl is as defined above. Preferred aryloxy groups contain 5 to 24 carbon atoms, and particularly preferred aryloxy groups contain 5 to 14 carbon atoms. Examples of aryloxy groups include, without limitation, phenoxy, o-halo-phenoxy, m-halo-phenoxy, p-halo-phenoxy, o-methoxy-phenoxy, m-methoxy-phenoxy, p-methoxy-phenoxy, 2,4-dimethoxy-phenoxy, 3,4,5-trimethoxy-phenoxy, and the like.

The term "alkaryl" refers to an aryl group with an alkyl substituent, and the term "aralkyl" refers to an alkyl group with an aryl substituent, wherein "aryl" and "alkyl" are as defined above. Preferred alkaryl and aralkyl groups contain 6 to 24 carbon atoms, and particularly preferred alkaryl and aralkyl groups contain 6 to 16 carbon atoms. Alkaryl groups include, for example, p-methylphenyl, 2,4-dimethylphenyl, p-cyclohexylphenyl, 2,7-dimethylnaphthyl, 7-cyclooctylnaphthyl, 3-ethyl-cyclopenta-1,4-diene, and the like. Examples of aralkyl groups include, without limitation, benzyl, 2-phenyl-ethyl, 3-phenyl-propyl, 4-phenyl-butyl, 5-phenyl-pentyl, 4-phenylcyclohexyl, 4-benzylcyclohexyl, 4-phenylcyclohexylmethyl, 4-benzylcyclohexylmethyl, and the like. The terms "alkaryloxy" and "aralkyloxy" refer to substituents of the formula —OR wherein R is alkaryl or aralkyl, respectively, as just defined.

The term "acyl" refers to substituents having the formula —(CO)-alkyl, —(CO)-aryl, or —(CO)-aralkyl, and the term "acyloxy" refers to substituents having the formula —O(CO)-alkyl, —O(CO)-aryl, or —O(CO)-aralkyl, wherein "alkyl," "aryl," and "aralkyl" are as defined above. Additionally, the term "acyl" also refers to substituents having the formula —(CO)-alkaryl, —(CO)-alkenyl, or —(CO)-alkynyl and the term "acyloxy" also refers to substituents having the formula —O(CO)-alkaryl, —O(CO)-alkenyl, or —O(CO)-alkynyl wherein "alkaryl", "alkenyl," and "alkynyl" are as defined above.

The terms "cyclic" and "ring" refer to alicyclic or aromatic groups that may or may not be substituted and/or heteroatom containing, and that may be monocyclic, bicyclic, or polycyclic. The term "alicyclic" is used in the conventional sense to refer to an aliphatic cyclic moiety, as opposed to an aromatic cyclic moiety, and may be monocyclic, bicyclic, or polycyclic.

The terms "halo" and "halogen" are used in the conventional sense to refer to a chloro, bromo, fluoro, or iodo substituent.

"Hydrocarbyl" refers to univalent hydrocarbyl radicals containing 1 to about 30 carbon atoms, preferably 1 to about 24 carbon atoms, most preferably 1 to about 12 carbon atoms, including linear, branched, cyclic, saturated, and unsaturated species, such as alkyl groups, alkenyl groups, aryl groups, and the like. The term "lower hydrocarbyl" intends a hydrocarbyl group of 1 to 6 carbon atoms, preferably 1 to 4 carbon atoms, and the term "hydrocarbylene" refers to a divalent hydrocarbyl moiety containing 1 to about 30 carbon atoms, preferably 1 to about 24 carbon atoms, most preferably 1 to about 12 carbon atoms, including linear, branched, cyclic, saturated, and unsaturated species. The term "lower hydrocarbylene" refers to a hydrocarbylene group of 1 to 6 carbon atoms. "Substituted hydrocarbyl" refers to hydrocarbyl substituted with one or more substituent groups, and the terms "heteroatom-containing hydrocarbyl" and "heterohydrocarbyl" refer to hydrocarbyl in which at least one carbon atom is replaced with a heteroatom. Similarly, "substituted hydrocarbylene" refers to hydrocarbylene substituted with one or more substituent groups, and the terms "heteroatom-containing hydrocarbylene" and "heterohydrocarbylene" refer to hydrocarbylene in which at least one carbon atom is replaced with a heteroatom. Unless otherwise indicated, the term "hydrocarbyl" and "hydrocarbylene" are to be interpreted as including substituted and/or heteroatom-containing hydrocarbyl and hydrocarbylene moieties, respectively.

The term "heteroatom-containing" as in a "heteroatom-containing hydrocarbyl group" refers to a hydrocarbon molecule or a hydrocarbyl molecular fragment in which one or more carbon atoms is replaced with an atom other than carbon, e.g., nitrogen, oxygen, sulfur, phosphorus, or silicon, typically nitrogen, oxygen, or sulfur. Similarly, the term "heteroalkyl" refers to an alkyl substituent that is heteroatom-containing, the term "heterocyclic" refers to a cyclic substituent that is heteroatom-containing, the terms "heteroaryl" and "heteroaromatic" respectively refer to "aryl" and "aromatic" substituents that are heteroatom-containing, and the like. It should be noted that a "heterocyclic" group or compound may or may not be aromatic, and further that "heterocycles" may be monocyclic, bicyclic, or polycyclic as described above with respect to the term "aryl." Examples of heteroalkyl groups include alkoxyaryl, alkylsulfanyl-substituted alkyl, N-alkylated amino alkyl, and the like. Examples of heteroaryl substituents include pyrrolyl, pyrrolidinyl, pyridinyl, quinolinyl, indolyl, pyrimidinyl, imidazolyl, 1,2,4-triazolyl, tetrazolyl, etc., and examples of heteroatom-containing alicyclic groups are pyrrolidino, morpholino, piperazino, piperidino, etc.

By "substituted" as in "substituted hydrocarbyl," "substituted alkyl," "substituted aryl," and the like, as alluded to in some of the aforementioned definitions, is meant that in the hydrocarbyl, alkyl, aryl, or other moiety, at least one hydrogen atom bound to a carbon (or other) atom is replaced with one or more non-hydrogen substituents. Examples of such substituents include, without limitation: functional groups referred to herein as "Fn," such as halo, hydroxyl, sulfhydryl, $C_1$-$C_{24}$ alkoxy, $C_2$-$C_{24}$ alkenyloxy, $C_2$-$C_{24}$ alkynyloxy, $C_5$-$C_{24}$ aryloxy, $C_6$-$C_{24}$ aralkyloxy, $C_6$-$C_{24}$ alkaryloxy, acyl (including $C_2$-$C_{24}$ alkylcarbonyl (—CO-alkyl) and $C_6$-$C_{24}$ arylcarbonyl (—CO-aryl)), acyloxy (—O-acyl, including $C_2$-$C_{24}$ alkylcarbonyloxy (—O—CO-alkyl) and $C_6$-$C_{24}$ arylcarbonyloxy (—O—CO-aryl)), $C_2$-$C_{24}$ alkoxycarbonyl (—(CO)—O-alkyl), $C_6$-$C_{24}$ aryloxycarbonyl (—(CO)—O-aryl), halocarbonyl (—CO)—X where X is halo), $C_2$-$C_{24}$ alkylcarbonato (—O—(CO)—O-alkyl), $C_6$-$C_{24}$ arylcarbonato (—O—(CO)—O-aryl), carboxy (—COOH), carboxylato (—COO⁻), carbamoyl (—(CO)—NH$_2$), mono-($C_1$-$C_{24}$ alkyl)-substituted carbamoyl (—(CO)—NH($C_1$-$C_{24}$ alkyl)), di-($C_1$-$C_{24}$ alkyl)-substituted carbamoyl (—(CO)—N($C_1$-$C_{24}$ alkyl)$_2$), mono-($C_1$-$C_{24}$ haloalkyl)-substituted carbamoyl (—(CO)—NH($C_1$-$C_{24}$ haloalkyl)), di-($C_1$-$C_{24}$ haloalkyl)-substituted carbamoyl (—(CO)—N($C_1$-$C_{24}$ haloalkyl)$_2$), mono-($C_5$-$C_{24}$ aryl)-substituted carbamoyl (—(CO)—NH—($C_5$-$C_{24}$ aryl)), di-($C_5$-$C_{24}$ aryl)-substituted carbamoyl (—(CO)—N($C_5$-$C_{24}$ aryl)$_2$), di-N—($C_1$-$C_{24}$ alkyl), N—($C_5$-$C_{24}$ aryl)-substituted carbamoyl (—(CO)—N($C_1$-$C_{24}$ alkyl)($C_5$-$C_{24}$ aryl)), thiocarbamoyl (—(CS)—NH$_2$), mono-($C_1$-$C_{24}$ alkyl)-substituted thiocarbamoyl (—(CS)—NH($C_1$-$C_{24}$ alkyl)), di-($C_1$-$C_{24}$ alkyl)-substituted thiocarbamoyl (—(CS)—N($C_1$-$C_{24}$ alkyl)$_2$), mono-($C_5$-$C_{24}$ aryl)-substituted thiocarbamoyl (—(CS)—NH—($C_5$-$C_{24}$ aryl)), di-($C_5$-$C_{24}$ aryl)-substituted thiocarbamoyl (—(CS)—N($C_5$-$C_{24}$ aryl)$_2$), di-N—($C_1$-$C_{24}$ alkyl), N—($C_5$-$C_{24}$ aryl)-substituted thiocarbamoyl (—(CS)—N($C_1$-$C_{24}$ alkyl)($C_5$-$C_{24}$ aryl)), carbamido (—NH—(CO)—NH$_2$), cyano (—C≡N), cyanato (—O—C≡N), thiocyanato (—S—C≡N), formyl (—(CO)—H), thioformyl (—(CS)—H), amino (—NH$_2$), mono-($C_1$-$C_{24}$ alkyl)-substituted amino (—NH($C_1$-$C_{24}$ alkyl)), di-($C_1$-$C_{24}$ alkyl)-substituted amino (—N($C_1$-$C_{24}$ alkyl)$_2$), mono-($C_5$-$C_{24}$ aryl)-substituted amino (—NH($C_5$-$C_{24}$ aryl)), di-($C_5$-$C_{24}$ aryl)-substituted amino (—N($C_5$-$C_{24}$ aryl)$_2$), $C_2$-$C_{24}$ alkylamido (—NH—(CO)-alkyl), $C_6$-$C_{24}$ arylamido (—NH—(CO)-aryl), imino (—CR=NH where R=hydrogen, $C_1$-$C_{24}$ alkyl, $C_5$-$C_{24}$ aryl, $C_6$-$C_{24}$ alkaryl, $C_6$-$C_{24}$ aralkyl, etc.), $C_2$-$C_{20}$ alkylimino (—CR=N(alkyl), where R=hydrogen, $C_1$-$C_{24}$ alkyl, $C_5$-$C_{24}$ aryl, $C_6$-$C_{24}$ alkaryl, $C_6$-$C_{24}$ aralkyl, etc.), arylimino (—CR=N(aryl), where R=hydrogen, $C_1$-$C_{20}$ alkyl, $C_5$-$C_{24}$ aryl, $C_6$-$C_{24}$ alkaryl, $C_6$-$C_{24}$ aralkyl, etc.), nitro (—NO$_2$), nitroso (—NO), sulfo (—SO$_2$—OH), sulfonato (—SO$_2$—O⁻), $C_1$-$C_{24}$ alkylsulfanyl (—S-alkyl; also termed "alkylthio"), $C_5$-$C_{24}$ arylsulfanyl (—S-aryl; also termed "arylthio"), $C_1$-$C_{24}$ alkylsulfinyl (—(SO)-alkyl), $C_5$-$C_{24}$ arylsulfinyl (—(SO)-aryl), $C_1$-$C_{24}$ alkylsulfonyl (—SO$_2$-alkyl), $C_1$-$C_{24}$ monoalkylaminosulfonyl —SO$_2$—N(H) alkyl), $C_1$-$C_{24}$ dialkylaminosulfonyl —SO$_2$—N(alkyl)$_2$, $C_5$-$C_{24}$ arylsulfonyl (—SO$_2$-aryl), boryl (—BH$_2$), borono (—B(OH)$_2$), boronato (—B(OR)$_2$ where R is alkyl or other hydrocarbyl), phosphono (—P(O)(OH)$_2$), phosphonato (—P(O)(O⁻)$_2$), phosphinato (—P(O)(O⁻)), phospho (—PO$_2$), and phosphino (—PH$_2$); and the hydrocarbyl moieties $C_1$-$C_{24}$ alkyl (preferably $C_1$-$C_{12}$ alkyl, more preferably $C_1$-$C_6$ alkyl), $C_2$-$C_{24}$ alkenyl (preferably $C_2$-$C_{12}$ alkenyl, more preferably $C_2$-$C_6$ alkenyl), $C_2$-$C_{24}$ alkynyl (preferably $C_2$-$C_{12}$ alkynyl, more preferably $C_2$-$C_6$ alkynyl), $C_5$-$C_{24}$ aryl (preferably $C_5$-$C_{14}$ aryl), $C_6$-$C_{24}$ alkaryl (preferably $C_6$-$C_{16}$ alkaryl), and $C_6$-$C_{24}$ aralkyl (preferably $C_6$-$C_{16}$ aralkyl). Additional functional groups referred to herein as "Fn", include without limitation, isocyanate (—N=C=O), and thioisocyanate (—N=C=S).

By "functionalized" as in "functionalized hydrocarbyl," "functionalized alkyl," "functionalized olefin," "functionalized cyclic olefin," and the like, is meant that in the hydrocarbyl, alkyl, olefin, cyclic olefin, or other moiety, at least one hydrogen atom bound to a carbon (or other) atom is replaced with one or more functional groups such as those described hereinabove. The term "functional group" is meant to include any functional species that is suitable for the uses described herein. In particular, as used herein, a functional group would necessarily possess the ability to react with or bond to corresponding functional groups on a substrate surface.

In addition, the aforementioned functional groups may, if a particular group permits, be further substituted with one or more additional functional groups or with one or more hydrocarbyl moieties such as those specifically mentioned above. Analogously, the abovementioned hydrocarbyl moieties may be further substituted with one or more functional groups or additional hydrocarbyl moieties as noted above.

"Optional" or "optionally" means that the subsequently described circumstance may or may not occur, so that the description includes instances where the circumstance occurs and instances where it does not. For example, the phrase "optionally substituted" means that a non-hydrogen substituent may or may not be present on a given atom, and, thus, the description includes structures wherein a non-hydrogen substituent is present and structures wherein a non-hydrogen substituent is not present.

The term "substrate material," as used herein, is intended to generally mean any material that the resin compositions of the invention may be contacted with, applied to, or have the substrate material incorporated into the resin. Without limitation, such materials include reinforcing materials, such as filaments, fibers, rovings, mats, weaves, fabrics, knitted material, cloth or other known structures, glass fibers and fabrics, carbon fibers and fabrics, aramid fibers and fabrics, and polyolefin or other polymer fibers or fabrics. Other suitable substrate materials include metallic density modulators, microparticulate density modulators, such as microspheres, and macroparticulate density modulators, such as glass or ceramic beads.

In reference to the ROMP reaction of a cyclic olefin catalyzed by the cyclic olefin metathesis catalyst, the term "onset of a ROMP reaction" generally refers to the initial rapid increase in the viscosity of the resin composition that occurs during polymerization just prior to gelation. The progress of an olefin metathesis polymerization can be monitored by measuring the increase in viscosity as the reaction proceeds from the monomer to the gelled state.

The progress of an exothermic olefin metathesis polymerization may also be conveniently monitored by measuring the temperature increase as the metathesis reaction proceeds from the monomer to the cured state. In the context of the present invention, and as described in the examples herein, the term "time to exotherm" (or "exotherm time") is defined as the last measured time point after which the temperature of a metathesis catalyzed resin composition increases by more than 1° C./second. As shown in FIG. 1, the initial increase in the exotherm profile is distinct allowing for a precise measurement of the exotherm onset, the exotherm time, and the exotherm peak temperature. The exotherm peak temperature is the maximum temperature the resin reaches during the polymerization and is related to the completeness of the polymerization reaction. Lowered peak temperatures can be an indication of incomplete polymerization. In general, measurement of the exotherm profile is convenient and provides an understanding of the cure behavior and when the cured state is achieved.

The terms "pot life" and "gel time" are generally used interchangeably. Various techniques and equipment useful for determining gel time are known in the art and may be utilized in the present invention. For example, the gel behavior, including the gel time and pot life, may be determined using a viscometer, as described in the examples, or by other suitable techniques. In many cases, it is convenient and sufficient to estimate the gel time by qualitative observation of properties such as pourability or elasticity. Such techniques must necessarily allow for an increase in the gel time to be determined, such that, in the context of the present invention, the difference in gel time can be determined between ROMP compositions containing added hydroperoxide and ROMP compositions that do not contain added hydroperoxide. The skilled artisan will appreciate that measurement of the actual gel time may depend on the equipment and techniques utilized, as well the type of composition being evaluated. However, in the context of the present invention, a determination of the relative increase in gel time achieved through the addition of hydroperoxide to a ROMP composition should not be affected by the particular technique or equipment utilized to determine the gel time.

The skilled artisan will also appreciate that the "working time" (or "workable pot life") may vary for different ROMP compositions and, for a particular ROMP composition, may also depend on the application or equipment utilized. Typically, the working time is greater than the time to onset of the polymerization (e.g., when the viscosity begins to rise rapidly), but less than the exotherm time.

Adhesion Promoter

One aspect of this invention is directed to adhesion promoters generally comprising a compound containing at least two isocyanate groups (such as, for example, methylene diphenyl diisocyanate and hexamethylene diisocyanate). In one embodiment, the adhesion promoter is a diisocyanate, triisocyanate, or polyisocyanate (i.e., containing four or more isocyanate groups). In a further embodiment, the adhesion promoter is a mixture of at least one diisocyanate, triisocyanate, or polyisocyanate. In a more particular aspect of the invention, the adhesion promoter comprises, or is limited to, a diisocyanate compound, or mixtures of diisocyanate compounds.

In general, the adhesion promoter may be any compound having at least two isocyanate groups. Suitable adhesion promoters include, without limitation, isocyanate compounds comprising at least two isocyanate groups, and wherein the compounds are selected from hydrocarbyl, substituted hydrocarbyl, heteroatom-containing hydrocarbyl, substituted heteroatom-containing hydrocarbyl, and functionalized hydrocarbyl compounds. As described above, suitable hydrocarbyl adhesion promoter compounds generally include alkyl, cycloalkyl, alkylene, alkenyl, alkynyl, aryl, cycloalkyl, alkyaryl, and aralkyl compounds. Substituted heteroatom-containing, and functionalized hydrocarbyl adhesion promoter compounds include the afore-mentioned hydrocarbyl compounds, as well as the variations thereof noted hereinabove.

In one embodiment the adhesion promoter is an alkyl diisocyanate. An alkyl diisocyanate refers to a linear, branched, or cyclic saturated or unsaturated hydrocarbon group typically although not necessarily containing 1 to about 24 carbon atoms, preferably a diisocyanate containing 2 to about 12 carbon atoms, and more preferably a diisocyanate containing 6 to 12 carbon atoms such as hexamethylene diisocyanate (HDI), octamethylene diisocyanate, decamethylene diisocyanate, and the like. Cycloalkyl diisocyanates contain cyclic alkyl group, typically having 4 to 16 carbon atoms. A preferred cycloalkyl diisocyanate containing 6 to about 12 carbon atoms are cyclohexyl, cyclooctyl, cyclodecyl, and the like. A more preferred cycloalkyl diisocyanate originates as a condensation product of acetone called 5-isocyanato-1-(isocyanatomethyl)-1,3,3-trimethylcyclohexane, commonly known as Isophorone diisocyanate (IPDI) and the isomers of isocyanato-[(isocyanatocyclohexyl)methyl] cyclohexane ($H_{12}MDI$). $H_{12}MDI$ is derived from the hydrogenated form of the aryl diisocyanate methylene diphenyl diisocyanate (MDI).

In another embodiment, the adhesion promoter is an aryl diisocyanate. Aryl diisocyanates refers to aromatic diisocyanates containing a single aromatic ring or multiple aromatic rings that are fused together, directly linked, or indirectly linked (such that the different aromatic rings are bound to a common group such as a methylene or ethylene moiety). Preferred aryl diisocyanates contain 5 to 24 carbon atoms, and particularly preferred aryl diisocyanates contain 5 to 14 carbon atoms. Exemplary aryl diisocyanates contain one aromatic ring or two fused or linked aromatic rings, e.g., phenyl, tolyl, xylene, naphthyl, biphenyl, diphenylether, benzophenone, and the like. Preferred aromatic diisocyanates include toluene diisocyanates, tetramethylxylene diisocyanate (TMXDI), and methylene diphenyl diisocyanate (MDI), which may comprise any mixture of its three isomers, 2,2'-MDI, 2,4'-MDI, and 4,4'-MDI.

In another embodiment, the adhesion promoter is a polymer-containing isocyanate, such as, for example, diisocyanates. Polymer-containing isocyanates refers to a polymer-containing two or more terminal and/or pendant alkyl or aryl isocyanate groups. The polymer-containing isocyanates generally have to have a minimal solubility in the resin to provide improved mechanical properties. Preferred polymer-containing isocyanates include, but are not limited to, PM200 (poly MDI), Lupranate® (poly MDI from BASF), Krasol® isocyanate terminated polybutadiene prepolymers, such as, for example, Krasol® LBD2000 (TDI based), Krasol® LBD3000 (TDI based), Krasol® NN-22 (MDI based), Krasol® NN-23 (MDI based), Krasol® NN-25 (MDI based), and the like. Krasol® isocyanate terminated polybutadiene prepolymers are available from Cray Valley.

In yet another embodiment, the adhesion promoter is a trimer of alkyl diisocyanates and aryl diisocyanates. In its simplest form, any combination of polyisocyanate compounds may be trimerized to form an isocyanurate ring containing isocyanate functional groups. Trimers of alkyl diisocyanate and aryl diisocyanates may also be referred to as isocyanurates of alkyl diisocyanate or aryl diisocyanate. Preferred alkyl diisocyanate and aryl diisocyanate trimers include, but are not limited to, hexamethylene diisocyanate trimer (HDIt), isophorone diisocyanate trimer, toluene diisocyanate trimer, tetramethylxylene diisocyanate trimer, methylene diphenyl diisocyanate trimers, and the like. More preferred adhesion promoters are toluene diisocyanates, tetramethylxylene diisocyanate (TMXDI), and methylene diphenyl diisocyanate (MDI) including any mixture of its three isomers 2,2'-MDI, 2,4'-MDI and 4,4'-MDI; liquid MDI; solid MDI; hexamethylenediisocyanatetrimer (HDIt); hexamethylenediisocyanate (HDI); isophorone diisocyanate (IPDI), 4,4'methylene bis(cyclohexyl isocyanate) (H12MDI); polymeric MDI (PM200); MDI prepolymer (Lupranate® 5080); liquid carbodiimide modified 4,4'-MDI (Lupranate® MM103); liquid MDI (Lupranate® MI); liquid MDI (Mondur® ML). Even more preferred adhesion promoters are methylene diphenyl diisocyanate (MDI) including any mixture of its three isomers 2,2'-MDI, 2,4'-MDI and 4,4'-MDI; liquid MDI; solid MDI; hexamethylenediisocyanatetrimer (HDIt); hexamethylenediisocyanate (HDI); isophorone diisocyanate (IPDI), 4,4'methylene bis(cyclohexyl isocyanate) (H12MDI); polymeric MDI (PM200); MDI prepolymer (Lupranate® 5080); liquid carbodiimide modified 4,4'-MDI (Lupranate® MM103); liquid MDI (Lupranate® MI); liquid MDI (Mondur® ML).

In further embodiments, the adhesion promoter may include an optional compound with a heteroatom-containing functional group and a metathesis active olefin. The compound containing a heteroatom-containing functional group and a metathesis-active olefin reacts with an isocyanate group and may provide the olefin metathesis composite with improved mechanical properties. The compound containing a heteroatom-containing functional group and a metathesis-active olefin typically contains between 2 and 20 carbons with oxygen, nitrogen, sulfur, phosphorus, or silicon functional groups. Preferred compounds containing a heteroatom-containing functional group and a metathesis-active olefin typically contain between 5 and 10 carbons with hydroxyl, amine, thiol, phosphorus-containing functional groups, or silane functional groups. Phosphorous-containing functional groups include, for example, alkyl and aryl-substituted phosphonato, phosphoryl, phosphanyl, and phosphino compounds. More preferred compounds containing a heteroatom-containing functional group and a metathesis-active olefin derived from norbornenes, oxanorbornanes, cyclooctenes, and cyclooctadienes, which typically contain between 7 and 10 carbons with hydroxyl, amine, thiol, phosphorus-containing functional groups, or silane functional groups. Further preferred compounds containing a heteroatom-containing functional group and a metathesis-active olefin include, but are not limited to, 5-norbornene-2-methanol (NB-MeOH); 2-hydroxyethyl bicyclo[2.2.1]hept-2-ene-5-carboxylate (HENB); and allyl alcohol.

Any concentration of adhesion promoter which improves the mechanical properties of the olefin composite is sufficient for the invention. In general, suitable amounts of adhesion promoter range from 0.001-50 phr, particularly, from 0.05-10 phr, more particularly, 0.1-10 phr, or, even more particularly, 0.5-4.0 phr.

In one embodiment, the adhesion promoter is contacted with a cyclic olefin, an olefin metathesis catalyst, and a substrate material, such as, for example, a glass substrate material, thereby forming a resin composition, for example, a ROMP composition. The resin composition is then subjected to conditions effective to promote an olefin metathesis reaction. In a further embodiment, the adhesion promoter may be applied to or contacted with the substrate surface, such as, for example, a glass substrate, to functionalize the surface prior to application of the resin composition. In a further embodiment, the adhesion promoter is combined with a resin composition comprising a cyclic olefin, the resin composition is combined with an olefin metathesis catalyst, and the resulting resin composition is applied to the substrate material, such as, for example, a glass substrate.

In an additional embodiment, the adhesion promoter is contacted with a cyclic olefin, an olefin metathesis catalyst, a hydroperoxide gel modifier, and a substrate material thereby forming a resin composition, for example, a ROMP composition. The resin composition is then subjected to conditions effective to promote an olefin metathesis reaction. In a further embodiment, the adhesion promoter may be applied to or contacted with the substrate surface to functionalize the surface prior to application of the resin composition. In a further embodiment, the adhesion promoter is combined with a resin composition comprising a cyclic olefin and a hydroperoxide gel modifier, the resin composition is combined with an olefin metathesis catalyst, and the resulting resin composition is applied to the substrate material.

Substrate Surfaces

The invention is generally suitable for use with any substrate material in which the addition of the adhesion promoter provides beneficial improvements in the adhesion of a resin (e.g., ROMP) composition to the substrate material as compared to a resin composition that is the same with the exception that the adhesion promoter is not included. The invention is directed to the use of any substrate material in which the surfaces of such materials are capable of reacting with the adhesion promoters of the invention having at least two isocyanate groups. The invention is particularly beneficial for use with glass and carbon material surfaces suitable for use with epoxy and methacrylate resins, including those containing finishes or sizings, in which case the finishes or sizings do not need to be removed (e.g., by washing or heat cleaning) for the inventive adhesion promoters to be effective. The invention is also suitable for use with wood and aluminum materials. Suitable substrate materials may also be selected from fibrous, woven, microparticulate, ceramic, metal, polymer, and semiconductor materials.

Method for Modifying Gel Formation

In another aspect, the invention provides a method for modifying the onset of a ROMP reaction of a cyclic olefin catalyzed by a cyclic olefin metathesis catalyst, in which a hydroperoxide gel modifier is combined with a cyclic olefin and a cyclic olefin metathesis catalyst, thereby forming a ROMP composition. The ROMP composition is then subjected to conditions effective to promote a ROMP reaction of the cyclic olefin in the presence of the cyclic olefin metathesis catalyst and the added hydroperoxide gel modifier.

The addition of an olefin metathesis catalyst to an olefinic composition can, under appropriate conditions, initiate a polymerization reaction, thereby forming a catalyzed resin. The period of time during which the catalyzed resin has sufficiently low viscosity such that the resin will flow for the manufacturing process is known as the pot life. As the polymerization reaction progresses, the viscosity of the resin increases such that the resin is no longer able to flow freely. This is known as the gel state. After the resin has achieved a gel state, the polymerization reaction continues until no further monomer is consumed under the reaction conditions. This is known as the cured state. In some embodiments, the polymerization may be exothermic, driving the polymerization to the cured state. The progress of an olefin metathesis polymerization is commonly monitored by measuring the increase in viscosity from the monomer to the gelled state, or by monitoring the temperature increase of an exothermic polymerization from the monomer to the cured state.

The onset of the gel state can be varied by many factors, including the chemical nature of the monomer, type of olefin metathesis catalyst, catalyst concentration, reaction temperature and the effect of various additives. It is often useful to be able to delay the onset of the gel state and to increase the gel time in a controlled fashion to tailor the polymerization process to the desired application or reaction conditions. Use of gel-modification additives allows the pot life of the catalyzed resin to be extended such that the resin remains fluid during the pour, cast, injection, or infusion into the mold. Gel-modification additives must offer controlled changes in the viscosity profile and time to exotherm such that the resin polymerizes efficiently once the mold is filled, to minimize mold cycle time. Ideally controlling the amount of gel modification agent allows control of the gel time over several hours. Furthermore, it is important the gel-modifying agent does not adversely affect the mechanical properties of the cured resin.

Applicants have discovered that the use of hydroperoxide-containing compounds allows the onset of the resin gel and cure states in olefin metathesis polymerizations to be delayed in a controlled manner. Although in general the hydroperoxide may be any organic hydroperoxide that is effective to delay the onset of the gel state, the hydroperoxide is typically an alkyl, for example, $C_2$-$C_{24}$ alkyl, aryl, for example, $C_5$-$C_{24}$ aryl, aralkyl, or alkaryl, for example, $C_6$-$C_{24}$ alkaryl, hydroperoxide, especially secondary or tertiary aliphatic or aromatic hydroperoxides. More specific hydroperoxides suitable for use include tert-butyl hydroperoxide, tert-amyl hydroperoxide, cumene hydroperoxide, diisopropyl benzene hydroperoxide, (2,5-dihydroperoxy)-2,5-dimethylhexane, cyclohexyl hydroperoxide, triphenylmethyl hydroperoxide, pinane hydroperoxide (e.g., Glidox® 500; LyondellBasell), and paramenthane hydroperoxide (e.g., Glidox® 300; LyondellBasell). More preferably, the hydroperoxides suitable for use include tert-butyl hydroperoxide and cumene hydroperoxide. Gel-modification additives may be added to the reaction mixture in the absence of solvent, or as organic or aqueous solutions. A single hydroperoxide compound may be used as the gel-modification additive, or a combination of two or more different hydroperoxide compounds may be used.

The hydroperoxide compounds can generally be added to the reaction mixture at any point prior to the onset of the gel state. Conveniently, an appropriate amount of hydroperoxide gel modifier may be added to the resin during the formulation step at which time any other additives can be included prior to coming into contact with catalyst. Unlike other gel-modification additives known in the art, hydroperoxides may be added to a stock solution of resin and have a usable shelf life of many weeks or months while substantially maintaining the gel-modification activity. Alternatively, the hydroperoxide compound can be added directly to the catalyst and/or a catalyst carrier and delivered to the resin during the catalyzation step. In another embodiment, the hydroperoxide may be added to the catalyzed resin mixture after addition of the catalyst.

The invention includes all concentrations of hydroperoxide which delay the onset of the gel-state of a particular metathesis polymerization. Advantageously, the use of hydroperoxides gel modifiers has been found to substantially maintain the properties of the cured polymer including peak exotherm temperature and mechanical properties. While not necessarily limited, the hydroperoxide concentration is advantageously between 0.01 and 1000 equivalents with respect to catalyst. In other embodiments the hydroperoxide concentration may be between 0.1 and 20 equivalents with respect to catalyst. Generally, higher concentrations of hydroperoxide will lead to longer pot life. Additionally, in other embodiments the hydroperoxide concentration may be between 0.05 and 100 equivalents with respect to catalyst. Additionally, in other embodiments the hydroperoxide concentration may be between 0.1 and 50 equivalents with respect to catalyst.

Modification of highly active polymerizations (due to higher resin temperatures, highly active metathesis catalyst, or other factors) typically requires addition of higher concentrations of hydroperoxide compounds. However, if the concentration of gel-modification agent is too high for a given catalyst or the reaction conditions, the polymerization may be incomplete, and the resin may fail to cure properly. This could result in lower exotherm temperatures or reduced mechanical properties.

The use of hydroperoxide allows for the time to the onset of the gel state to be controlled based on the concentration of added hydroperoxide gel modifier. In general, the gel time (e.g., as tracked by the time of the exotherm) can be controllably delayed by about 2 minutes or up to about 12 hours. In more specific aspects, the gel time (or time to exotherm) may be delayed for about 10 minutes up to about 6 hours, or, even more particularly, from about 20 minutes up to about 2 hours. The time to the onset of the gel state is impacted by the choice of olefin, catalyst, olefin/catalyst ratio and temperature among other factors. The desired time to the onset of the gel state is frequently dependent on the manufacturing type conditions. Under some conditions, delaying the onset of the gel state by 10-60 minutes, so the resin can be poured without trapped air or other defects, is typically sufficient. In other applications, such as the vacuum assisted resin transfer molding of large parts, delaying the onset of the gel state by 6-12 hours may be desirable.

Cyclic Olefin

In addition to the adhesion promoter and/or hydroperoxide compound, described hereinabove, resin compositions disclosed herein include one or more cyclic olefins. In general, any cyclic olefin suitable for the metathesis reactions disclosed herein may be used. Such cyclic olefins may be optionally substituted, optionally heteroatom-containing, optionally functionalized, mono-unsaturated, di-unsaturated, or poly-unsaturated $C_5$ to $C_{24}$ hydrocarbons that may be mono-, di-, or poly-cyclic. The cyclic olefin may generally be any strained or unstrained cyclic olefin, provided the cyclic olefin is able to participate in a ROMP reaction either individually or as part of a ROMP cyclic olefin composition. While certain unstrained cyclic olefins such as cyclohexene are generally understood to not undergo ROMP reactions by themselves, under appropriate circumstances, such unstrained cyclic olefins may nonetheless be ROMP active. For example, when present as a comonomer in a ROMP composition, unstrained cyclic olefins may be ROMP active. Accordingly, as used herein and as would be appreciated by the skilled artisan, the term "unstrained cyclic olefin" is intended to refer to those unstrained cyclic olefins that may undergo a ROMP reaction under any conditions, or in any ROMP composition, provided the unstrained cyclic olefin is ROMP active.

In general, the cyclic olefin may be represented by the structure of formula (A)

(A)

wherein J and $R^A$ are as follows:

$R^A$ is selected from the group consisting of hydrogen, hydrocarbyl (e.g., $C_1$-$C_{20}$ alkyl, $C_5$-$C_{20}$ aryl, $C_5$-$C_{30}$ aralkyl, or $C_5$-$C_{30}$ alkaryl), substituted hydrocarbyl (e.g., substituted $C_1$-$C_{20}$ alkyl, $C_5$-$C_{20}$ aryl, $C_5$-$C_{30}$ aralkyl, or $C_5$-$C_{30}$ alkaryl), heteroatom-containing hydrocarbyl (e.g., $C_1$-$C_{20}$ heteroalkyl, $C_5$-$C_{20}$ heteroaryl, heteroatom-containing $C_5$-$C_{30}$ aralkyl, or heteroatom-containing $C_5$-$C_{30}$ alkaryl), and substituted heteroatom-containing hydrocarbyl (e.g., substituted $C_1$-$C_{20}$ heteroalkyl, $C_5$-$C_{20}$ heteroaryl, heteroatom-containing $C_5$-$C_{30}$ aralkyl, or heteroatom-containing $C_5$-$C_{30}$ alkaryl) and, if substituted hydrocarbyl or substituted heteroatom-containing hydrocarbyl, wherein the substituents may be functional groups ("Fn") such as phosphonato, phosphoryl, phosphanyl, phosphino, sulfonato, $C_1$-$C_{20}$ alkylsulfanyl, $C_5$-$C_{20}$ aryl sulfanyl, $C_1$-$C_{20}$ alkylsulfonyl, $C_5$-$C_{20}$ arylsulfonyl, $C_1$-$C_{20}$ alkylsulfinyl, $C_5$-$C_{20}$ arylsulfinyl, sulfonamido, amino, amido, imino, nitro, nitroso, hydroxyl, $C_1$-$C_{20}$ alkoxy, $C_5$-$C_{20}$ aryloxy, $C_2$-$C_{20}$ alkoxycarbonyl, $C_5$-$C_{20}$ aryloxycarbonyl, carboxyl, carboxylato, mercapto, formyl, $C_1$-$C_{20}$ thioester, cyano, cyanato, carbamoyl, epoxy, styrenyl, silyl, silyloxy, silanyl, siloxazanyl, boronato, boryl, or halogen, or a metal-containing or metalloid-containing group (wherein the metal may be, for example, Sn or Ge). $R^A$ may itself be one of the aforementioned groups, such that the Fn moiety is directly bound to the olefinic carbon atom indicated in the structure. In the latter case, however, the functional group will generally not be directly bound to the olefinic carbon through a heteroatom containing one or more lone pairs of electrons, e.g., an oxygen, sulfur, nitrogen, or phosphorus atom, or through an electron-rich metal or metalloid such as Ge, Sn, As, Sb, Se, Te, etc. With such functional groups, there will normally be an intervening linkage $Z^*$, such that $R^A$ then has the structure —$(Z^*)_n$-Fn wherein n is 1, Fn is the functional group, and $Z^*$ is a hydrocarbylene linking group such as an alkylene, substituted alkylene, heteroalkylene, substituted heteroalkene, arylene, substituted arylene, heteroarylene, or substituted heteroarylene linkage. Additionally, functional groups ("Fn") may be thiocyanato, isocyanate, or thioisocyanate.

J is a saturated or unsaturated hydrocarbylene, substituted hydrocarbylene, heteroatom-containing hydrocarbylene, or substituted heteroatom-containing hydrocarbylene linkage, wherein when J is substituted hydrocarbylene or substituted heteroatom-containing hydrocarbylene, the substituents may include one or more —$(Z^*)_n$-Fn groups, wherein n is zero or 1, and Fn and $Z^*$ are as defined previously. Additionally, two or more substituents attached to ring carbon (or other) atoms within J may be linked to form a bicyclic or polycyclic olefin. J will generally contain in the range of approximately 5 to 14 ring atoms, typically 5 to 8 ring atoms, for a monocyclic olefin, and, for bicyclic and polycyclic olefins, each ring will generally contain 4 to 8, typically 5 to 7, ring atoms.

Mono-unsaturated cyclic olefin reactants encompassed by structure (A) may be represented by the structure (B)

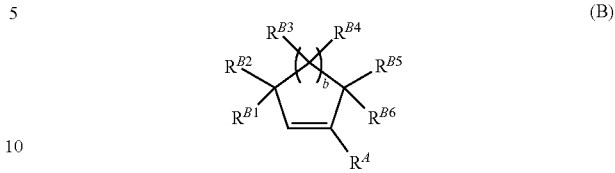

(B)

wherein b is an integer generally although not necessarily in the range of 1 to 10, typically 1 to 5, $R^A$ is as defined above, and $R^{B1}$, $R^{B2}$, $R^{B3}$, $R^{B4}$, $R^{B5}$, and $R^{B6}$ are independently selected from the group consisting of hydrogen, hydrocarbyl, substituted hydrocarbyl, heteroatom-containing hydrocarbyl, substituted heteroatom-containing hydrocarbyl and —$(Z^*)_n$-Fn where n, $Z^*$ and Fn are as defined previously, and wherein if any of the $R^{B1}$ through $R^{B6}$ moieties is substituted hydrocarbyl or substituted heteroatom-containing hydrocarbyl, the substituents may include one or more —$(Z^*)_n$-Fn groups. Accordingly, $R^{B1}$, $R^{B2}$, $R^{B3}$, $R^{B4}$, $R^{B5}$, and $R^{B6}$ may be, for example, hydrogen, hydroxyl, $C_1$-$C_{20}$ alkyl, $C_5$-$C_{20}$ aryl, $C_1$-$C_{20}$ alkoxy, $C_5$-$C_{20}$ aryloxy, $C_2$-$C_{20}$ alkoxycarbonyl, $C_5$-$C_{20}$ aryloxycarbonyl, amino, amido, nitro, etc. Furthermore, any of the $R^{B1}$, $R^{B2}$, $R^{B3}$, $R^{B4}$, $R^{B5}$, and $R^{B6}$ moieties can be linked to any other of the $R^{B1}$, $R^{B2}$, $R^{B3}$, $R^{B4}$, $R^{B5}$, and $R^{B6}$ moieties to provide a bicyclic or polycyclic olefin, and the linkage may include heteroatoms or functional groups, e.g., the linkage may include an ether, ester, thioether, amino, alkylamino, imino, or anhydride moiety.

Examples of monounsaturated, monocyclic olefins encompassed by structure (B) include, without limitation, cyclopentene, cyclohexene, cycloheptene, cyclooctene, cyclononene, cyclodecene, cycloundecene, cyclododecene, tricyclodecene, tetracyclodecene, octacyclodecene, and cycloeicosene, and substituted versions thereof such as 1-methylcyclopentene, 1-ethylcyclopentene, 1-isopropylcyclohexene, 1-chloropentene, 1-fluorocyclopentene, 4-methylcyclopentene, 4-methoxy-cyclopentene, 4-ethoxy-cyclopentene, cyclopent-3-ene-thiol, cyclopent-3-ene, 4-methylsulfanyl-cyclopentene, 3-methylcyclohexene, 1-methylcyclooctene, 1,5-dimethylcyclooctene, etc.

Monocyclic diene reactants encompassed by structure (A) may be generally represented by the structure (C)

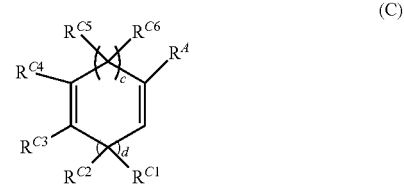

(C)

wherein c and d are independently integers in the range of 1 to about 8, typically 2 to 4, preferably 2 (such that the reactant is a cyclooctadiene), $R^A$ is as defined above, and $R^{C1}$, $R^{C2}$, $R^{C3}$, $R^{C4}$, $R^{C5}$, and $R^{C6}$ are defined as for $R^{B1}$ through $R^{B6}$. In this case, it is preferred that $R^{C3}$ and $R^{C4}$ be non-hydrogen substituents, in which case the second olefinic moiety is tetrasubstituted. Examples of monocyclic diene reactants include, without limitation, 1,3-cyclopentadiene, 1,3-cyclohexadiene, 5-ethyl-1,3-cyclohexadiene, 1,3-cycloheptadiene, cyclohexadiene, 1,5-cyclooctadiene, 1,3-cyclooctadiene, and substituted analogs thereof. Triene reactants are analogous to the diene structure (C), and will generally contain at least one methylene linkage between any two olefinic segments.

Bicyclic and polycyclic olefinic reactants encompassed by structure (A) may be generally represented by the structure (D)

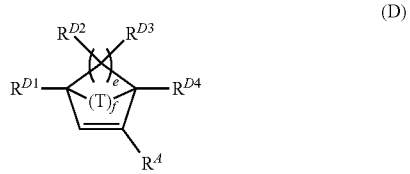

(D)

wherein e is an integer in the range of 1 to 8, typically 2 to 4, f is generally 1 or 2, T is lower alkylene, lower alkenylene, generally substituted or unsubstituted methyl or ethyl, or heteroatom, generally oxygen, sulfur, or nitrogen optionally substituted by lower alkyl or lower alkylene, $R^A$ is as defined above, and $R^{D1}$, $R^{D2}$, $R^{D3}$, and $R^{D4}$ are as defined for $R^{B1}$ through $R^{B6}$. Preferred olefinic reactants within this group are in the norbornene and oxanorbornane families, having the structure (E) and (F), respectively

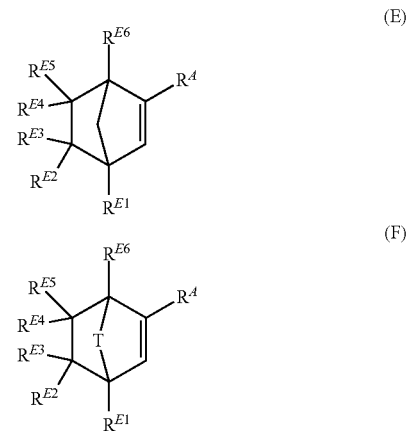

(E)

(F)

wherein $R^A$ and T are as defined above, $R^{E1}$, $R^{E2}$, $R^{E3}$, and $R^{E6}$ have the same definitions as $R^{B1}$ through $R^{B6}$, and $R^{E4}$ and $R^{E5}$ are defined as for $R^{E2}$ and $R^{E3}$, respectively. Additionally, any of the $R^{E1}$, $R^{E2}$, $R^{E3}$, $R^{E4}$, $R^{E5}$, and $R^{E6}$ moieties can be linked to any other of the $R^{E1}$, $R^{E2}$, $R^{E3}$, $R^{E4}$, $R^{E5}$, $R^{E6}$ moieties to provide a bicyclic or polycyclic olefin, and the linkage may include heteroatoms or functional groups e.g., the linkage may include without limitation an ether, ester, thioether, amino, alkylamino, imino, or anhydride moiety.

Examples of bicyclic and polycyclic olefinic reactants thus include, without limitation, dicyclopentadiene, tricyclopentadiene, dicyclohexadiene, norbornene, 5-methyl-2-norbornene, 5-ethyl-2-norbornene, 5-isobutyl-2-norbornene, 5,6-dimethyl-2-norbornene, 5-phenylnorbornene, 5-benzylnorbornene, 5-acetylnorbornene, 5-methoxycarbonylnorbornene, 5-ethoxycarbony-1-norbornene, 5-methyl-5-methoxy-carbonylnorbornene, 5-cyanonorbornene, 5,5,6-trimethyl-2-norbornene, cyclo-hexenylnorbornene, endo, exo-5,6-dimethoxynorbornene, endo, endo-5,6-dime-thoxynorbornene, endo,exo-5,6-dimethoxycarbonylnorbornene, endo, endo-5,6-dimethoxycarbonylnorbornene, 2,3-dimethoxynorbornene, norbornadiene, tricycloundecene, tetracyclododecene, 8-methyltetracyclododecene, 8-ethyl-tetracyclododecene, 8-methoxycarbonyltetracyclododecene, 8-methyl-8-tetracyclo-dodecene, 8-cyanotetracyclododecene, pentacyclopentadecene, pentacyclohexadecene, and the like. Additional examples of bicyclic and polycyclic olefins include, without limitation, higher order oligomers of cyclopentadiene such as cyclopentadiene tetramer, cyclopentadiene pentamer, and the like; and $C_2$-$C_{12}$ hydrocarbyl substituted norbornenes such as 5-butyl-2-norbornene, 5-hexyl-2-norbornene, 5-octyl-2-norbornene, 5-decyl-2-norbornene, 5-dodecyl-2-norbornene, 5-vinyl-2-norbornene, 5-ethylidene-2-norbornene, 5-isopropenyl-2-norbornene, 5-propenyl-2-norbornene, and 5-butenyl-2-norbornene, and the like.

Preferred cyclic olefins include $C_5$ to $C_{24}$ unsaturated hydrocarbons. Also preferred are $C_5$ to $C_{24}$ cyclic hydrocarbons that contain one or more (typically 2 to 12) heteroatoms such as O, N, S, or P. For example, crown ether cyclic olefins may include numerous O heteroatoms throughout the cycle, and these are within the scope of the invention. In addition, preferred cyclic olefins are $C_5$ to $C_{24}$ hydrocarbons that contain one or more (typically 2 or 3) olefins. For example, the cyclic olefin may be mono-, di-, or tri-unsaturated. Examples of cyclic olefins include cyclooctene, cyclododecene, and (c,t,t)-1,5,9-cyclododecatriene.

The cyclic olefins may also comprise multiple (typically 2 or 3) rings. For example, the cyclic olefin may be mono-, di-, or tri-cyclic. When the cyclic olefin comprises more than one ring, the rings may or may not be fused. Preferred examples of cyclic olefins that comprise multiple rings include norbornene, dicyclopentadiene, and 5-ethylidene-2-norbornene.

The cyclic olefin may also be substituted, for example, a $C_5$ to $C_{24}$ cyclic hydrocarbon wherein one or more (typically 2, 3, 4, or 5) of the hydrogens are replaced with non-hydrogen substituents. Suitable non-hydrogen substituents may be chosen from the substituents described hereinabove. For example, functionalized cyclic olefins, i.e., $C_5$ to $C_{24}$ cyclic hydrocarbons wherein one or more (typically 2, 3, 4, or 5) of the hydrogens are replaced with functional groups, are within the scope of the invention. Suitable functional groups may be chosen from the functional groups described hereinabove. For example, a cyclic olefin functionalized with an alcohol group may be used to prepare a telechelic polymer comprising pendent alcohol groups. Functional groups on the cyclic olefin may be protected in cases where the functional group interferes with the metathesis catalyst, and any of the protecting groups commonly used in the art may be employed. Acceptable protecting groups may be found, for example, in Greene et al., Protective Groups in Organic Synthesis, 3rd Ed. (New York: Wiley, 1999). Examples of functionalized cyclic olefins include 2-hydroxymethyl-5-norbornene, 2-[(2-hydroxyethyl)carboxylate]-5-norbornene, cydecanol, 5-n-hexyl-2-norbornene, 5-n-butyl-2-norbornene.

Cyclic olefins incorporating any combination of the abovementioned features (i.e., heteroatoms, substituents, multiple olefins, multiple rings) are suitable for the invention disclosed herein.

The cyclic olefins useful in the invention disclosed herein may be strained or unstrained. It will be appreciated that the amount of ring strain varies for each cyclic olefin compound, and depends upon a number of factors including the size of the ring, the presence, and identity of substituents, and the presence of multiple rings. Ring strain is one factor in determining the reactivity of a molecule towards ring-opening olefin metathesis reactions. Highly strained cyclic olefins, such as certain bicyclic compounds, readily undergo ring opening reactions with olefin metathesis catalysts. Less strained cyclic olefins, such as certain unsubstituted hydrocarbon monocyclic olefins, are generally less reactive. In some cases, ring opening reactions of relatively unstrained (and therefore relatively unreactive) cyclic olefins may become possible when performed in the presence of the olefinic compounds disclosed herein.

A plurality of cyclic olefins may be used to prepare metathesis polymers from the olefinic compound. For example, two cyclic olefins selected from the cyclic olefins described hereinabove may be employed in order to form metathesis products that incorporate both cyclic olefins. Where two or more cyclic olefins are used, one example of a second cyclic olefin is a cyclic alkenol, i.e., a $C_5$-$C_{24}$ cyclic hydrocarbon wherein at least one of the hydrogen substituents is replaced with an alcohol or protected alcohol moiety to yield a functionalized cyclic olefin.

The use of a plurality of cyclic olefins, and in particular when at least one of the cyclic olefins is functionalized, allows for further control over the positioning of functional groups within the products. For example, the density of cross-linking points can be controlled in polymers and macromonomers prepared using the methods disclosed herein. Control over the quantity and density of substituents and functional groups also allows for control over the physical properties (e.g., melting point, tensile strength, glass transition temperature, etc.) of the products. Control over these and other properties is possible for reactions using only a single cyclic olefin, but it will be appreciated that the use of a plurality of cyclic olefins further enhances the range of possible metathesis products and polymers formed.

Further preferred cyclic olefins encompassed by structure (D) that are in the norbornene family may be generally represented by the structure (G):

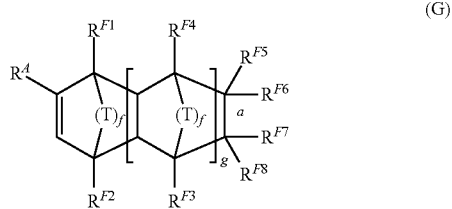

(G)

wherein $R^A$ and T are as defined above, $R^{F1}$, $R^{F2}$, $R^{F3}$, $R^{F4}$, $R^{F5}$, $R^{F6}$, $R^{F7}$, and $R^{F8}$ are as defined for $R^{B1}$ through $R^{B6}$, and "a" represents a single bond or a double bond, f is generally 1 or 2, g is an integer from 0 to 5, and when "a" is a double bond one of $R^{F5}$, $R^{F6}$ and one of $R^{F7}$, $R^{F8}$ is not present. Furthermore, any of the $R^{F5}$, $R^{F6}$, $R^{F7}$, and $R^{F8}$ moieties can be linked to any of the other $R^{F5}$, $R^{F6}$, $R^{F7}$, and $R^{F8}$ moieties to provide a substituted or unsubstituted alicyclic group containing 4 to 30 ring carbon atoms or a substituted or unsubstituted aryl group containing 6 to 18 ring carbon atoms or combinations thereof and the linkage may include heteroatoms or functional groups, e.g., the linkage may include without limitation an ether, ester, thioether, amino, alkyl amino, imino, or anhydride moiety. The cyclic group can be monocyclic, bicyclic, or polycyclic. When unsaturated the cyclic group can contain monounsaturation or multiunsaturation, with monounsaturated cyclic groups being preferred. When substituted, the rings contain monosubstitution or multisubstitution wherein the substituents are independently selected from hydrogen, hydrocarbyl, substituted hydrocarbyl, functional groups (Fn), heteroatom-containing hydrocarbyl, substituted heteroatom-containing hydrocarbyl, and —(Z*)$_n$-Fn where n is zero or 1, Z*, and Fn are as defined above.

More preferred cyclic olefins possessing at least one norbornene moiety have the structure (H)

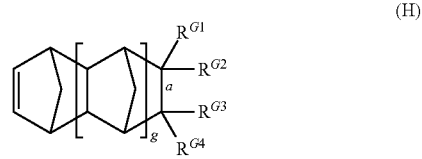

(H)

wherein, $R^{G1}$, $R^{G2}$, $R^{G3}$, and $R^{G4}$ are as defined for $R^{B1}$ through $R^{B6}$ and "a" represents a single bond or a double bond, g is an integer from 0 to 5, and when "a" is a double bond one of $R^{G1}$, $R^{G2}$ and one of $R^{G3}$, $R^{G4}$ is not present. Furthermore any of the $R^{G1}$, $R^{G2}$, $R^{G3}$, and $R^{G4}$ moieties can be linked to any of the other $R^{G1}$, $R^{G2}$, $R^{G3}$, and $R^{G4}$ moieties to provide a substituted or unsubstituted alicyclic group containing 4 to 30 carbon atoms or a substituted or unsubstituted aryl group containing 6 to 18 ring carbon atoms or combinations thereof and the linkage may include heteroatoms or functional groups, e.g., the linkage may include without limitation an ether, ester, thioether, amino, alkylamino, imino, or anhydride moiety. The alicyclic group can be monocyclic, bicyclic, or polycyclic. When unsaturated the cyclic group can contain monounsaturation or multiunsaturation, with monounsaturated cyclic groups being preferred. When substituted, the rings contain monosubstitution or multisubstitution wherein the substituents are independently selected from hydrogen, hydrocarbyl, substituted hydrocarbyl, functional groups (Fn), heteroatom-containing hydrocarbyl, substituted heteroatom-containing hydrocarbyl, and —(Z*)$_n$-Fn where n is zero or 1, Z*, and Fn are as defined above.

One route for the preparation of hydrocarbyl substituted and functionally substituted norbornenes employs the Diels-Alder cycloaddition reaction in which cyclopentadiene or substituted cyclopentadiene is reacted with a suitable dienophile at elevated temperatures to form the substituted norbornene adduct generally shown by the following reaction Scheme 1:

SCHEME 1

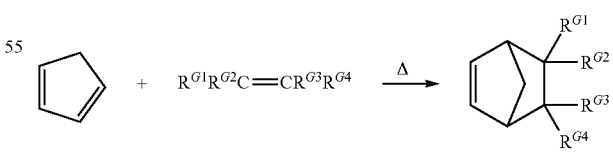

wherein $R^{G1}$ to $R^{G4}$ are as defined above.

Other norbornene adducts can be prepared by the thermal pyrolysis of dicyclopentadiene in the presence of a suitable dienophile. The reaction proceeds by the initial pyrolysis of dicyclopentadiene to cyclopentadiene followed by the Diels-Alder cycloaddition of cyclopentadiene and the dienophile to give the adduct shown below in Scheme 2:

SCHEME 2

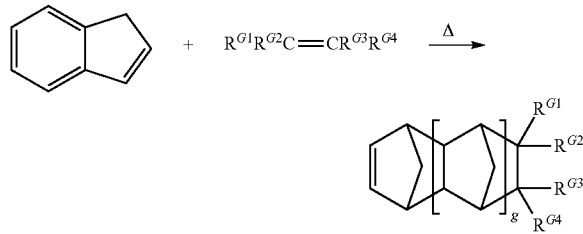

wherein g is an integer from 0 to 5, and $R^{G1}$ to $R^{G4}$ are as defined above.

Norbornadiene and higher Diels-Alder adducts thereof similarly can be prepared by the thermal reaction of cyclopentadiene and dicyclopentadiene in the presence of an acetylenic reactant as shown below is Scheme 3:

SCHEME 3

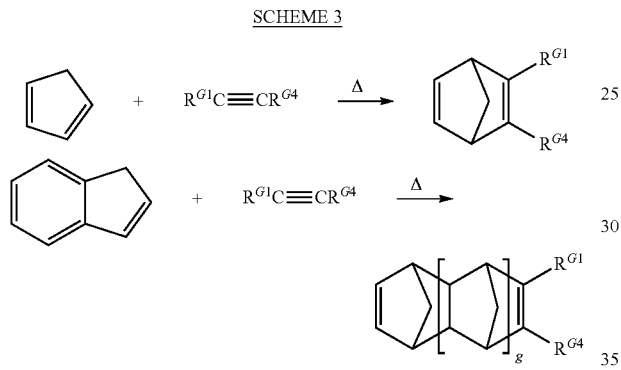

wherein g is an integer from 0 to 5, $R^{G1}$ and $R^{G4}$ are as defined above.

More preferred cyclic olefins include dicyclopentadiene, tricyclopentadiene, dicyclohexadiene, norbornene, 5-methyl-2-norbornene, 5-ethyl-2-norbornene, 5-isobutyl-2-norbornene, 5,6-dimethyl-2-norbornene, 5-phenylnorbornene, 5-benzylnorbornene, 5-acetylnorbornene, 5-methoxycarbonylnorbornene, 5-ethoxycarbony-1-norbornene, 5-methyl-5-methoxy-carbonylnorbornene, 5-cyanonorbornene, 5,5,6-trimethyl-2-norbornene, cyclo-hexenylnorbornene, endo, exo-5,6-dimethoxynorbornene, endo, endo-5,6-dimethoxynorbornene, endo,exo-5,6-dimethoxycarbonylnorbornene, endo, endo-5,6-dimethoxycarbonylnorbornene, 2,3-dimethoxynorbornene, norbornadiene, tricycloundecene, tetracyclododecene, 8-methyltetracyclododecene, 8-ethyl-tetracyclododecene, 8-methoxycarbonyltetracyclododecene, 8-methyl-8-tetracyclo-dodecene, 8-cyanotetracyclododecene, pentacyclopentadecene, pentacyclohexadecene, higher order oligomers of cyclopentadiene such as cyclopentadiene tetramer, cyclopentadiene pentamer, and the like; and $C_2$-$C_{12}$ hydrocarbyl substituted norbornenes such as 5-butyl-2-norbornene, 5-hexyl-2-norbornene, 5-octyl-2-norbornene, 5-decyl-2-norbornene, 5-dodecyl-2-norbornene, 5-vinyl-2-norbornene, 5-ethylidene-2-norbornene, 5-isopropenyl-2-norbornene, 5-propenyl-2-norbornene, 5-butenyl-2-norbornene, and the like. Even more preferred cyclic olefins include dicyclopentadiene, tricyclopentadiene, and higher order oligomers of cyclopentadiene, such as cyclopentadiene tetramer, cyclopentadiene pentamer, and the like, tetracyclododecene, norbornene, and $C_2$-$C_{12}$ hydrocarbyl substituted norbornenes, such as 5-butyl-2-norbornene, 5-hexyl-2-norbornene, 5-octyl-2-norbornene, 5-decyl-2-norbornene, 5-dodecyl-2-norbornene, 5-vinyl-2-norbornene, 5-ethylidene-2-norbornene, 5-isopropenyl-2-norbornene, 5-propenyl-2-norbornene, 5-butenyl-2-norbornene, and the like.

Olefin Metathesis Catalyst

The olefin metathesis catalyst complex according to the invention is preferably a Group 8 transition metal complex having the structure of formula (I)

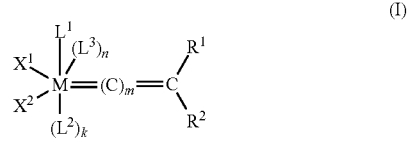

(I)

in which:
M is a Group 8 transition metal;
$L^1$, $L^2$, and $L^3$ are neutral electron donor ligands;
n is 0 or 1, such that $L^3$ may or may not be present;
m is 0, 1, or 2;
k is 0 or 1;
$X^1$ and $X^2$ are anionic ligands; and
$R^1$ and $R^2$ are independently selected from hydrogen, hydrocarbyl, substituted hydrocarbyl, heteroatom-containing hydrocarbyl, substituted heteroatom-containing hydrocarbyl, and functional groups,
wherein any two or more of $X^1$, $X^2$, $L^1$, $L^2$, $L^3$, $R^1$, and $R^2$ can be taken together to form one or more cyclic groups, and further wherein any one or more of $X^1$, $X^2$, $L^1$, $L^2$, $L^3$, $R^1$, and $R^2$ may be attached to a support.

Additionally, in formula (I), one or both of $R^1$ and $R^2$ may have the structure —$(W)_n$—$U^+V^-$, in which W is selected from hydrocarbylene, substituted hydrocarbylene, heteroatom-containing hydrocarbylene, or substituted heteroatom-containing hydrocarbylene; U is a positively charged Group 15 or Group 16 element substituted with hydrogen, hydrocarbyl, substituted hydrocarbyl, heteroatom-containing hydrocarbyl, or substituted heteroatom-containing hydrocarbyl; V is a negatively charged counterion; and n is zero or 1. Furthermore, $R^1$ and $R^2$ may be taken together to form an indenylidene moiety.

Preferred catalysts contain Ru or Os as the Group 8 transition metal, with Ru particularly preferred.

Numerous embodiments of the catalysts useful in the reactions disclosed herein are described in more detail infra. For the sake of convenience, the catalysts are described in groups, but it should be emphasized that these groups are not meant to be limiting in any way. That is, any of the catalysts useful in the invention may fit the description of more than one of the groups described herein.

A first group of catalysts, then, are commonly referred to as First Generation Grubbs-type catalysts, and have the structure of formula (I). For the first group of catalysts, M and m are as described above, and n, $X^1$, $X^2$, $L^1$, $L^2$, $L^3$, $R^1$, and $R^2$ are described as follows.

For the first group of catalysts, n is 0, and $L^1$ and $L^2$ are independently selected from phosphine, sulfonated phosphine, phosphite, phosphinite, phosphonite, arsine, stibine, ether, amine, amide, imine, sulfoxide, carboxyl, nitrosyl, pyridine, substituted pyridine, imidazole, substituted imidazole, pyrazine, and thioether. Exemplary ligands are trisubstituted phosphines. Preferred trisubstituted phosphines are of the formula $PR^{H1}R^{H2}R^{H3}$, where $R^{H1}$, $R^{H2}$, $R^{H3}$ are each independently substituted or unsubstituted aryl or $C_1$-$C_{10}$ alkyl, particularly primary alkyl, secondary alkyl, or cycloalkyl. In the most preferred, $L^1$ and $L^2$ are independently selected from the group consisting of trimethylphosphine ($PMe_3$), triethylphosphine ($PEt_3$), tri-n-butylphosphine ($PnBu_3$), tri(ortho-tolyl)phosphine (P-o-tolyl$_3$), tri-tert-butylphosphine (P-tert-Bu$_3$), tricyclopentylphosphine (PCyclopentyl$_3$), tricyclohexylphosphine (PCy$_3$), triisopropylphosphine (P-i-Pr$_3$), triisobutylphosphine (P-i-Bu$_3$), trioctylphosphine (POct$_3$), triphenylphosphine (PPh$_3$), tri(pentafluorophenyl)phosphine (P($C_6F_5$)$_3$), methyldiphenylphosphine (PMePh$_2$), dimethylphenylphosphine (PMe$_2$Ph), and diethylphenylphosphine (PEt$_2$Ph). Alternatively, $L^1$ and $L^2$ are independently selected from phosphbicycloalkane (e.g. monosubstituted 9-phosphabicyclo-[3.3.1]nonane, or monosubstituted 9-phosphabicyclo[4.2.1]nonane such as cyclohexylphoban, isopropylphoban, ethylphoban, methylphoban, butylphoban, pentylphoban, and the like.

$X^1$ and $X^2$ are anionic ligands, and may be the same or different, or are linked together to form a cyclic group, typically although not necessarily a five- to eight-membered ring. In preferred embodiments, $X^1$ and $X^2$ are each independently hydrogen, halide, or one of the following groups: $C_1$-$C_{20}$ alkyl, $C_5$-$C_{24}$ aryl, $C_1$-$C_{20}$ alkoxy, $C_5$-$C_{24}$ aryloxy, $C_2$-$C_{20}$ alkoxycarbonyl, $C_6$-$C_{24}$ aryloxycarbonyl, $C_2$-$C_{24}$ acyl, $C_2$-$C_{24}$ acyloxy, $C_1$-$C_{20}$ alkylsulfonato, $C_5$-$C_{24}$ arylsulfonato, $C_1$-$C_{20}$ alkylsulfanyl, $C_5$-$C_{24}$ arylsulfanyl, $C_1$-$C_{20}$ alkylsulfinyl, or $C_5$-$C_{24}$ arylsulfinyl. Optionally, $X^1$ and $X^2$ may be substituted with one or more moieties selected from $C_1$-$C_{12}$ alkyl, $C_1$-$C_{12}$ alkoxy, $C_5$-$C_{24}$ aryl, and halide, which may, in turn, with the exception of halide, be further substituted with one or more groups selected from halide, $C_1$-$C_6$ alkyl, $C_1$-$C_6$ alkoxy, and phenyl. In more preferred embodiments, $X^1$ and $X^2$ are halide, benzoate, $C_2$-$C_6$ acyl, $C_2$-$C_6$ alkoxycarbonyl, $C_1$-$C_6$ alkyl, phenoxy, $C_1$-$C_6$ alkoxy, $C_1$-$C_6$ alkylsulfanyl, aryl, or $C_1$-$C_6$ alkylsulfonyl. In even more preferred embodiments, $X^1$ and $X^2$ are each halide, $CF_3CO_2$, $CH_3CO_2$, $CFH_2CO_2$, $(CH_3)_3CO$, $(CF_3)_2(CH_3)CO$, $(CF_3)(CH_3)_2CO$, PhO, MeO, EtO, tosylate, mesylate, or trifluoromethane-sulfonate. In the most preferred embodiments, $X^1$ and $X^2$ are each chloride. Alternatively $X^1$ and $X^2$ are independently $NO_3$, —N=C=O, or —N=C=S.

$R^1$ and $R^2$ are independently selected from hydrogen, hydrocarbyl (e.g., $C_1$-$C_{20}$ alkyl, $C_2$-$C_{20}$ alkenyl, $C_2$-$C_{20}$ alkynyl, $C_5$-$C_{24}$ aryl, $C_6$-$C_{24}$ alkaryl, $C_6$-$C_{24}$ aralkyl, etc.), substituted hydrocarbyl (e.g., substituted $C_1$-$C_{20}$ alkyl, $C_2$-$C_{20}$ alkenyl, $C_2$-$C_{20}$ alkynyl, $C_5$-$C_{24}$ aryl, $C_6$-$C_{24}$ alkaryl, $C_6$-$C_{24}$ aralkyl, etc.), heteroatom-containing hydrocarbyl (e.g., heteroatom-containing $C_1$-$C_{20}$ alkyl, $C_2$-$C_{20}$ alkenyl, $C_2$-$C_{20}$ alkynyl, $C_5$-$C_{24}$ aryl, $C_6$-$C_{24}$ alkaryl, $C_6$-$C_{24}$ aralkyl, etc.), and substituted heteroatom-containing hydrocarbyl (e.g., substituted heteroatom-containing $C_1$-$C_{20}$ alkyl, $C_2$-$C_{20}$ alkenyl, $C_2$-$C_{20}$ alkynyl, $C_5$-$C_{24}$ aryl, $C_6$-$C_{24}$ alkaryl, $C_6$-$C_{24}$ aralkyl, etc.), and functional groups. $R^1$ and $R^2$ may also be linked to form a cyclic group, which may be aliphatic or aromatic, and may contain substituents and/or heteroatoms. Generally, such a cyclic group will contain 4 to 12, preferably 5, 6, 7, or 8 ring atoms.

In preferred catalysts, $R^1$ is hydrogen and $R^2$ is selected from $C_1$-$C_{20}$ alkyl, $C_2$-$C_{20}$ alkenyl, and $C_5$-$C_{24}$ aryl, more preferably $C_1$-$C_6$ alkyl, $C_2$-$C_6$ alkenyl, and $C_5$-$C_{14}$ aryl. Still more preferably, $R^2$ is phenyl, vinyl, methyl, isopropyl, or t-butyl, optionally substituted with one or more moieties selected from $C_1$-$C_6$ alkyl, $C_1$-$C_6$ alkoxy, phenyl, and a functional group Fn as defined earlier herein. Most preferably, $R^2$ is phenyl or vinyl substituted with one or more moieties selected from methyl, ethyl, chloro, bromo, iodo, fluoro, nitro, dimethylamino, methyl, methoxy, and phenyl. Optimally, $R^2$ is phenyl or —C=C(CH$_3$)$_2$.

Any two or more (typically two, three, or four) of $X^1$, $X^2$, $L^1$, $L^2$, $L^3$, $R^1$, and $R^2$ can be taken together to form a cyclic group, including bidentate or multidentate ligands, as disclosed, for example, in U.S. Pat. No. 5,312,940, the disclosure of which is incorporated herein by reference. When any of $X^1$, $X^2$, $L^1$, $L^2$, $L^3$, $R^1$, and $R^2$ are linked to form cyclic groups, those cyclic groups may contain 4 to 12, preferably 4, 5, 6, 7 or 8 atoms, or may comprise two or three of such rings, which may be either fused or linked. The cyclic groups may be aliphatic or aromatic, and may be heteroatom-containing and/or substituted. The cyclic group may, in some cases, form a bidentate ligand or a tridentate ligand. Examples of bidentate ligands include, but are not limited to, bisphosphines, dialkoxides, alkyldiketonates, and aryldiketonates.

A second group of catalysts, commonly referred to as Second Generation Grubbs-type catalysts, have the structure of formula (I), wherein $L^1$ is a carbene ligand having the structure of formula (II)

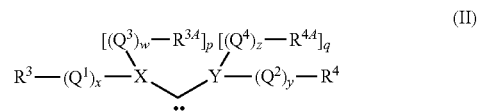

such that the complex may have the structure of formula (III)

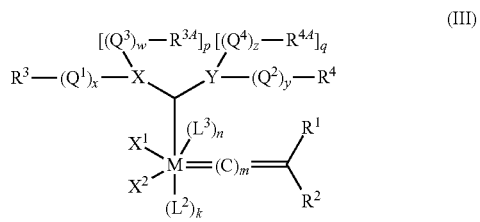

wherein M, m, n, $X^1$, $X^2$, $L^2$, $L^3$, $R^1$, and $R^2$ are as defined for the first group of catalysts, and the remaining substituents are as follows;

X and Y are heteroatoms typically selected from N, O, S, and P. Since O and S are divalent, p is necessarily zero when X is O or S, q is necessarily zero when Y is O or S, and k is zero or 1. However, when X is N or P, then p is 1, and when Y is N or P, then q is 1. In a preferred embodiment, both X and Y are N;

$Q^1$, $Q^2$, $Q^3$, and $Q^4$ are linkers, e.g., hydrocarbylene (including substituted hydrocarbylene, heteroatom-containing hydrocarbylene, and substituted heteroatom-containing hydrocarbylene, such as substituted and/or heteroatom-containing alkylene) or —(CO)—, and w, x, y, and z are independently zero or 1, meaning that each linker is optional. Preferably, w, x, y, and z are all zero. Further, two or more substituents on adjacent atoms within $Q^1$, $Q^2$, $Q^3$, and $Q^4$ may be linked to form an additional cyclic group; and $R^3$, $R^{3A}$, $R^4$, and $R^{4A}$ are independently selected from hydrogen, hydrocarbyl, substituted hydrocarbyl, heteroatom-containing hydrocarbyl, and substituted heteroatom-containing hydrocarbyl. In addition, X and Y may be independently selected from carbon and one of the heteroatoms mentioned above. Also, $L^2$ and $L^3$ may be taken together to form a single bidentate electron-donating heterocyclic ligand. Furthermore, $R^1$ and $R^2$ may be taken together to form a indenylidene moiety. Moreover, $X^1$, $X^2$, $L^2$, $L^3$, X, and Y is further coordinated to boron or to a carboxylate.

In addition, any two or more of $X^1$, $X^2$, $L^1$, $L^2$, $L^3$, $R^1$, $R^2$, $R^3$, $R^{3A}$, $R^4$, $R^{4A}$, $Q^1$, $Q^2$, $Q^3$, and $Q^4$ can be taken together to form a cyclic group, and any one or more of $X^1$, $X^2$, $L^2$, $L^3$, $Q^1$, $Q^2$, $Q^3$, $Q^4$, $R^1$, $R^2$, $R^3$, $R^{3A}$, $R^4$, and $R^{4A}$ may be attached to a support. Any two or more of $X^1$, $X^2$, $L^1$, $L^2$, $L^3$, $R^1$, $R^2$, $R^3$, $R^{3A}$, $R^4$, and $R^{4A}$ can also be taken to be -A-Fn, wherein "A" is a divalent hydrocarbon moiety selected from alkylene and arylalkylene, wherein the alkyl portion of the alkylene and arylalkylene groups can be linear or branched, saturated or unsaturated, cyclic or acyclic, and substituted or unsubstituted, wherein the aryl portion of the of arylalkylene can be substituted or unsubstituted, and wherein hetero atoms and/or functional groups may be present in either the aryl or the alkyl portions of the alkylene and arylalkylene groups, and Fn is a functional group, or together to form a cyclic group, and any one or more of $X^1$, $X^2$, $L^2$, $L^3$, $Q^1$, $Q^2$, $Q^3$, $Q^4$, $R^1$, $R^2$, $R^3$, $R^{3A}$, $R^4$, and $R^{4A}$ may be attached to a support.

Preferably, $R^{3A}$ and $R^{4A}$ are linked to form a cyclic group so that the carbene ligand has the structure of formula (IV)

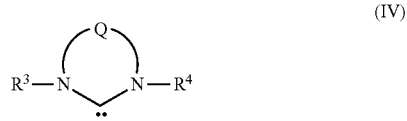

(IV)

wherein $R^3$ and $R^4$ are defined above, with preferably at least one of $R^3$ and $R^4$, and more preferably both $R^3$ and $R^4$, being alicyclic or aromatic of one to about five rings, and optionally containing one or more heteroatoms and/or substituents. Q is a linker, typically a hydrocarbylene linker, including substituted hydrocarbylene, heteroatom-containing hydrocarbylene, and substituted heteroatom-containing hydrocarbylene linkers, wherein two or more substituents on adjacent atoms within Q may also be linked to form an additional cyclic structure, which may be similarly substituted to provide a fused polycyclic structure of two to about five cyclic groups. Q is often, although not necessarily, a two-atom linkage or a three-atom linkage.

Examples of N-heterocyclic carbene (NHC) ligands and acyclic diaminocarbene ligands suitable as $L^1$ thus include, but are not limited to, the following where DIPP is diisopropylphenyl and Mes is 2,4,6-trimethylphenyl:

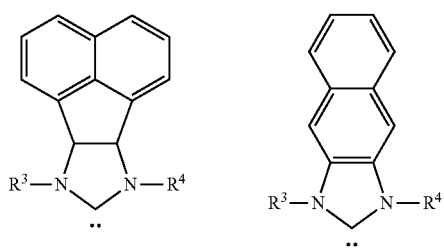

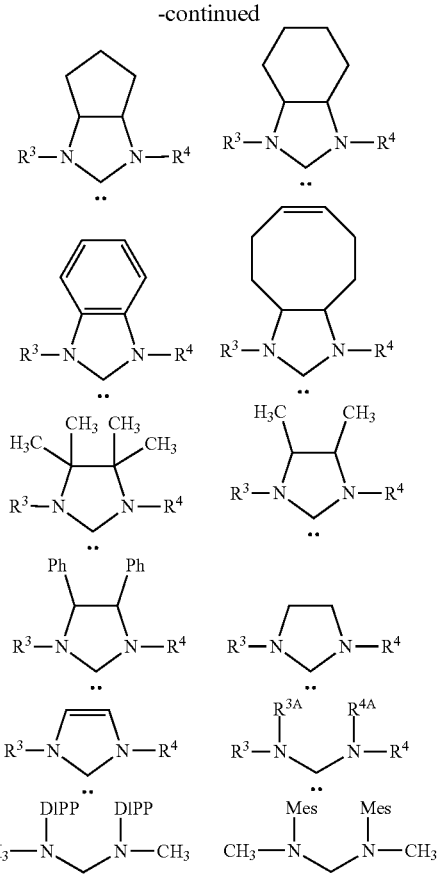

Additional examples of NHC ligands and acyclic diaminocarbene ligands suitable as $L^1$ thus include, but are not limited to the following:

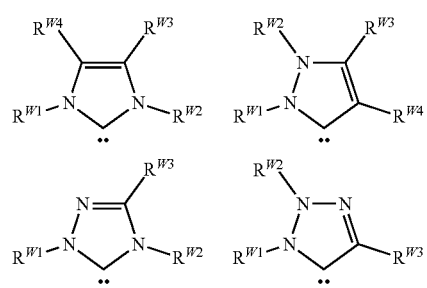

wherein $R^{W1}$, $R^{W2}$, $R^{W3}$, $R^{W4}$ are independently hydrogen, unsubstituted hydrocarbyl, substituted hydrocarbyl, or heteroatom containing hydrocarbyl, and where one or both of $R^{W3}$ and $R^{W4}$ may be in independently selected from halogen, nitro, amido, carboxyl, alkoxy, aryloxy, sulfonyl, carbonyl, thio, or nitroso groups.

Additional examples of NHC ligands suitable as $L^1$ are further described in U.S. Pat. Nos. 7,378,528; 7,652,145; 7,294,717; 6,787,620; 6,635,768; and 6,552,139 the disclosures of which are incorporated herein by reference.

Additionally, thermally activated N-Heterocyclic Carbene Precursors as disclosed in U.S. Pat. No. 6,838,489, the contents of which are incorporated herein by reference, may also be used with the present invention.

When M is ruthenium, then, the preferred complexes have the structure of formula

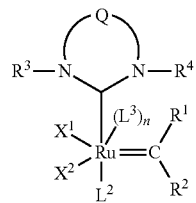

(V)

In a more preferred embodiment, Q is a two-atom linkage having the structure —CR$^{11}$R$^{12}$—CR$^{13}$R$^{14}$— or —CR$^{11}$=CR$^{13}$—, preferably —CR$^{11}$R$^{12}$—CR$^{13}$R$^{14}$—, wherein R$^{11}$, R$^{12}$, R$^{13}$, and R$^{14}$ are independently selected from hydrogen, hydrocarbyl, substituted hydrocarbyl, heteroatom-containing hydrocarbyl, substituted heteroatom-containing hydrocarbyl, and functional groups. Examples of functional groups here include carboxyl, C$_1$-C$_{20}$ alkoxy, C$_5$-C$_{24}$ aryloxy, C$_2$-C$_{20}$ alkoxycarbonyl, C$_5$-C$_{24}$ alkoxycarbonyl, C$_2$-C$_{24}$ acyloxy, C$_1$-C$_{20}$ alkylthio, C$_5$-C$_{24}$ arylthio, C$_1$-C$_{20}$ alkylsulfonyl, and C$_1$-C$_{20}$ alkylsulfinyl, optionally substituted with one or more moieties selected from C$_1$-C$_{12}$ alkyl, C$_1$-C$_{12}$ alkoxy, C$_5$-C$_{14}$ aryl, hydroxyl, sulfhydryl, formyl, and halide. R$^{11}$, R$^{12}$, R$^{13}$, and R$^{14}$ are preferably independently selected from hydrogen, C$_1$-C$_{12}$ alkyl, substituted C$_1$-C$_{12}$ alkyl, C$_1$-C$_{12}$ heteroalkyl, substituted C$_1$-C$_{12}$ heteroalkyl, phenyl, and substituted phenyl. Alternatively, any two of R$^{11}$, R$^{12}$, R$^{13}$, and R$^{14}$ may be linked together to form a substituted or unsubstituted, saturated or unsaturated ring structure, e.g., a C$_4$-C$_{12}$ alicyclic group or a C$_5$ or C$_6$ aryl group, which may itself be substituted, e.g., with linked or fused alicyclic or aromatic groups, or with other substituents. In one further aspect, any one or more of R$^{11}$, R$^{12}$, R$^{13}$, and R$^{14}$ comprises one or more of the linkers. Additionally, L$^2$ may be L$^2_{(k)}$, wherein k is zero or 1. R$^3$ and R$^4$ may be unsubstituted phenyl or phenyl substituted with one or more substituents selected from C$_1$-C$_{20}$ alkyl, substituted C$_1$-C$_{20}$ alkyl, C$_1$-C$_{20}$ heteroalkyl, substituted C$_1$-C$_{20}$ heteroalkyl, C$_5$-C$_{24}$ aryl, substituted C$_5$-C$_{24}$ aryl, C$_5$-C$_{24}$ heteroaryl, C$_6$-C$_{24}$ aralkyl, C$_6$-C$_{24}$ alkaryl, or halide. Furthermore, X$^1$ and X$^2$ may be halogen.

When R$^3$ and R$^4$ are aromatic, they are typically although not necessarily composed of one or two aromatic rings, which may or may not be substituted, e.g., R$^3$ and R$^4$ may be phenyl, substituted phenyl, biphenyl, substituted biphenyl, or the like. In one preferred embodiment, R$^3$ and R$^4$ are the same and are each unsubstituted phenyl or phenyl substituted with up to three substituents selected from C$_1$-C$_{20}$ alkyl, substituted C$_1$-C$_{20}$ alkyl, C$_1$-C$_{20}$ heteroalkyl, substituted C$_1$-C$_{20}$ heteroalkyl, C$_5$-C$_{24}$ aryl, substituted C$_5$-C$_{24}$ aryl, C$_5$-C$_{24}$ heteroaryl, C$_6$-C$_{24}$ aralkyl, C$_6$-C$_{24}$ alkaryl, or halide. Preferably, any substituents present are hydrogen, C$_1$-C$_{12}$ alkyl, C$_1$-C$_{12}$ alkoxy, C$_5$-C$_{14}$ aryl, substituted C$_5$-C$_{14}$ aryl, or halide. As an example, R$^3$ and R$^4$ are mesityl (i.e., Mes as defined herein).

In a third group of catalysts having the structure of formula (I), M, m, n, X$^1$, X$^2$, R$^1$, and R$^2$ are as defined for the first group of catalysts, L$^1$ is a strongly coordinating neutral electron donor ligand such as any of those described for the first and second group of catalysts, and L$^2$ and L$^3$ are weakly coordinating neutral electron donor ligands in the form of optionally substituted heterocyclic groups. Again, n is zero or 1, such that L$^3$ may or may not be present.

Generally, in the third group of catalysts, L$^2$ and L$^3$ are optionally substituted five- or six-membered monocyclic groups containing 1 to 4, preferably 1 to 3, most preferably 1 to 2 heteroatoms, or are optionally substituted bicyclic or polycyclic structures composed of 2 to 5 such five- or six-membered monocyclic groups. If the heterocyclic group is substituted, it should not be substituted on a coordinating heteroatom, and any one cyclic moiety within a heterocyclic group will generally not be substituted with more than 3 substituents.

For the third group of catalysts, examples of L$^2$ and L$^3$ include, without limitation, heterocycles containing nitrogen, sulfur, oxygen, or a mixture thereof.

Examples of nitrogen-containing heterocycles appropriate for L$^2$ and L$^3$ include pyridine, bipyridine, pyridazine, pyrimidine, bipyridamine, pyrazine, 1,3,5-triazine, 1,2,4-triazine, 1,2,3-triazine, pyrrole, 2H-pyrrole, 3H-pyrrole, pyrazole, 2H-imidazole, 1,2,3-triazole, 1,2,4-triazole, indole, 3H-indole, 1H-isoindole, cyclopenta(b)pyridine, indazole, quinoline, bisquinoline, isoquinoline, bisisoquinoline, cinnoline, quinazoline, naphthyridine, piperidine, piperazine, pyrrolidine, pyrazolidine, quinuclidine, imidazolidine, picolylimine, purine, benzimidazole, bisimidazole, phenazine, acridine, and carbazole. The nitrogen-containing heterocycles may be optionally substituted on a non-coordinating heteroatom with a non-hydrogen substituent.

Examples of sulfur-containing heterocycles appropriate for L$^2$ and L$^3$ include thiophene, 1,2-dithiole, 1,3-dithiole, thiepin, benzo(b)thiophene, benzo(c)thiophene, thionaphthene, dibenzothiophene, 2H-thiopyran, 4H-thiopyran, and thioanthrene.

Examples of oxygen-containing heterocycles appropriate for L$^2$ and L$^3$ include 2H-pyran, 4H-pyran, 2-pyrone, 4-pyrone, 1,2-dioxin, 1,3-dioxin, oxepin, furan, 2H-1-benzopyran, coumarin, coumarone, chromene, chroman-4-one, isochromen-1-one, isochromen-3-one, xanthene, tetrahydrofuran, 1,4-dioxan, and dibenzofuran.

Examples of mixed heterocycles appropriate for L$^2$ and L$^3$ include isoxazole, oxazole, thiazole, isothiazole, 1,2,3-oxadiazole, 1,2,4-oxadiazole, 1,3,4-oxadiazole, 1,2,3,4-oxatriazole, 1,2,3,5-oxatriazole, 3H-1,2,3-dioxazole, 3H-1,2-oxathiole, 1,3-oxathiole, 4H-1,2-oxazine, 2H-1,3-oxazine, 1,4-oxazine, 1,2,5-oxathiazine, o-isooxazine, phenoxazine, phenothiazine, pyrano[3,4-b]pyrrole, indoxazine, benzoxazole, anthranil, and morpholine.

Preferred L$^2$ and L$^3$ ligands are aromatic nitrogen-containing and oxygen-containing heterocycles, and particularly preferred L$^2$ and L$^3$ ligands are monocyclic N-heteroaryl ligands that are optionally substituted with 1 to 3, preferably 1 or 2, substituents. Specific examples of particularly preferred L$^2$ and L$^3$ ligands are pyridine and substituted pyridines, such as 3-bromopyridine, 4-bromopyridine, 3,5-dibromopyridine, 2,4,6-tribromopyridine, 2,6-dibromopyridine, 3-chloropyridine, 4-chloropyridine, 3,5-dichloropyridine, 2,4,6-trichloropyridine, 2,6-dichloropyridine, 4-iodopyridine, 3,5-diiodopyridine, 3,5-dibromo-4-methylpyridine, 3,5-dichloro-4-methylpyridine, 3,5-dimethyl-4-bromopyridine, 3,5-dimethylpyridine, 4-methylpyridine, 3,5-diisopropylpyridine, 2,4,6-trimethylpyridine, 2,4,6-triisopropylpyridine, 4-(tert-butyl)pyridine, 4-phenylpyridine, 3,5-diphenylpyridine, 3,5-dichloro-4-phenylpyridine, and the like.

In general, any substituents present on L$^2$ and/or L$^3$ are selected from halo, C$_1$-C$_{20}$ alkyl, substituted C$_1$-C$_{20}$ alkyl, C$_1$-C$_{20}$ heteroalkyl, substituted C$_1$-C$_{20}$ heteroalkyl, C$_5$-C$_{24}$ aryl, substituted C$_5$-C$_{24}$ aryl, C$_5$-C$_{24}$ heteroaryl, substituted C$_5$-C$_{24}$ heteroaryl, C$_6$-C$_{24}$ alkaryl, substituted C$_6$-C$_{24}$ alkaryl, $C_6$-$C_{24}$ heteroalkaryl, substituted $C_6$-$C_{24}$ heteroalkaryl, $C_6$-$C_{24}$ aralkyl, substituted $C_6$-$C_{24}$ aralkyl, $C_6$-$C_{24}$ heteroaralkyl, substituted $C_6$-$C_{24}$ heteroaralkyl, and functional groups, with suitable functional groups including, without limitation, $C_1$-$C_{20}$ alkoxy, $C_5$-$C_{24}$ aryloxy, $C_2$-$C_{20}$ alkylcarbonyl, $C_6$-$C_{24}$ arylcarbonyl, $C_2$-$C_{20}$ alkylcarbonyloxy, $C_6$-$C_{24}$ arylcarbonyloxy, $C_2$-$C_{20}$ alkoxycarbonyl, $C_6$-$C_{24}$ aryloxycarbonyl, halocarbonyl, $C_2$-$C_{20}$ alkylcarbonato, $C_6$-$C_{24}$ arylcarbonato, carboxy, carboxylato, carbamoyl, mono-($C_1$-$C_{20}$ alkyl)-substituted carbamoyl, di-($C_1$-$C_{20}$ alkyl)-substituted carbamoyl, di-N—($C_1$-$C_{20}$ alkyl), N—($C_5$-$C_{24}$ aryl)-substituted carbamoyl, mono-($C_5$-$C_{24}$ aryl)-substituted carbamoyl, di-($C_6$-$C_{24}$ aryl)-substituted carbamoyl, thiocarbamoyl, mono-($C_1$-$C_{20}$ alkyl)-substituted thiocarbamoyl, di-($C_1$-$C_{20}$ alkyl)-substituted thiocarbamoyl, di-N—($C_1$-$C_{20}$ alkyl)-N—($C_6$-$C_{24}$ aryl)-substituted thiocarbamoyl, mono-($C_6$-$C_{24}$ aryl)-substituted thiocarbamoyl, di-($C_6$-$C_{24}$ aryl)-substituted thiocarbamoyl, carbamido, formyl, thioformyl, amino, mono-($C_1$-$C_{20}$ alkyl)-substituted amino, di-($C_1$-$C_{20}$ alkyl)-substituted amino, mono-($C_5$-$C_{24}$ aryl)-substituted amino, di-($C_5$-$C_{24}$ aryl)-substituted amino, di-N—($C_1$-$C_{20}$ alkyl), N—($C_5$-$C_{24}$ aryl)-substituted amino, $C_2$-$C_{20}$ alkylamido, $C_6$-$C_{24}$ arylamido, imino, $C_1$-$C_{20}$ alkylimino, $C_5$-$C_{24}$ arylimino, nitro, and nitroso. In addition, two adjacent substituents may be taken together to form a ring, generally a five- or six-membered alicyclic or aryl ring, optionally containing 1 to 3 heteroatoms and 1 to 3 substituents as above.

Preferred substituents on $L^2$ and $L^3$ include, without limitation, halo, $C_1$-$C_{12}$ alkyl, substituted $C_1$-$C_{12}$ alkyl, $C_1$-$C_{12}$ heteroalkyl, substituted $C_1$-$C_{12}$ heteroalkyl, $C_5$-$C_{14}$ aryl, substituted $C_5$-$C_{14}$ aryl, $C_5$-$C_{14}$ heteroaryl, substituted $C_5$-$C_{14}$ heteroaryl, $C_6$-$C_{16}$ alkaryl, substituted $C_6$-$C_{16}$ alkaryl, $C_6$-$C_{16}$ heteroalkaryl, substituted $C_6$-$C_{16}$ heteroalkaryl, $C_6$-$C_{16}$ aralkyl, substituted $C_6$-$C_{16}$ aralkyl, $C_6$-$C_{16}$ heteroaralkyl, substituted $C_6$-$C_{16}$ heteroaralkyl, $C_1$-$C_{12}$ alkoxy, $C_5$-$C_{14}$ aryloxy, $C_2$-$C_{12}$ alkylcarbonyl, $C_6$-$C_{14}$ arylcarbonyl, $C_2$-$C_{12}$ alkylcarbonyloxy, $C_6$-$C_{14}$ arylcarbonyloxy, $C_2$-$C_{12}$ alkoxycarbonyl, $C_6$-$C_{14}$ aryloxycarbonyl, halocarbonyl, formyl, amino, mono-($C_1$-$C_{12}$ alkyl)-substituted amino, di-($C_1$-$C_{12}$ alkyl)-substituted amino, mono-($C_5$-$C_{14}$ aryl)-substituted amino, di-($C_5$-$C_{14}$ aryl)-substituted amino, and nitro.

Of the foregoing, the most preferred substituents are halo, $C_1$-$C_6$ alkyl, $C_1$-$C_6$ haloalkyl, $C_1$-$C_6$ alkoxy, phenyl, substituted phenyl, formyl, N,N-di($C_1$-$C_6$ alkyl)amino, nitro, and nitrogen heterocycles as described above (including, for example, pyrrolidine, piperidine, piperazine, pyrazine, pyrimidine, pyridine, pyridazine, etc.).

In certain embodiments, $L^2$ and $L^3$ may also be taken together to form a bidentate or multidentate ligand containing two or more, generally two, coordinating heteroatoms such as N, O, S, or P, with preferred such ligands being diimine ligands of the Brookhart type. One representative bidentate ligand has the structure of formula (VI)

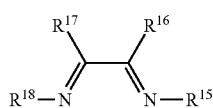

(VI)

wherein $R^{15}$, $R^{16}$, $R^{17}$, and $R^{18}$ hydrocarbyl (e.g., $C_1$-$C_{20}$ alkyl, $C_2$-$C_{20}$ alkenyl, $C_2$-$C_{20}$ alkynyl, $C_5$-$C_{24}$ aryl, $C_6$-$C_{24}$ alkaryl, or $C_6$-$C_{24}$ aralkyl), substituted hydrocarbyl (e.g., substituted $C_1$-$C_{20}$ alkyl, $C_2$-$C_{20}$ alkenyl, $C_2$-$C_{20}$ alkynyl, $C_5$-$C_{24}$ aryl, $C_6$-$C_{24}$ alkaryl, or $C_6$-$C_{24}$ aralkyl), heteroatom-containing hydrocarbyl (e.g., $C_1$-$C_2$M heteroalkyl, $C_5$-$C_{24}$ heteroaryl, heteroatom-containing $C_6$-$C_{24}$ aralkyl, or heteroatom-containing $C_6$-$C_{24}$ alkaryl), or substituted heteroatom-containing hydrocarbyl (e.g., substituted $C_1$-$C_{20}$ heteroalkyl, $C_5$-$C_{24}$ heteroaryl, heteroatom-containing $C_6$-$C_{24}$ aralkyl, or heteroatom-containing $C_6$-$C_{24}$ alkaryl), or (1) $R^{15}$ and $R^{16}$, (2) $R^{17}$ and $R^{18}$, (3) $R^{16}$ and $R^{17}$, or (4) both $R^{15}$ and $R^{16}$, and $R^{17}$ and $R^{18}$, may be taken together to form a ring, i.e., an N-heterocycle. Preferred cyclic groups in such a case are five- and six-membered rings, typically aromatic rings.

In a fourth group of catalysts that have the structure of formula (I), two of the substituents are taken together to form a bidentate ligand or a tridentate ligand. Examples of bidentate ligands include, but are not limited to, bisphosphines, dialkoxides, alkyldiketonates, and aryldiketonates. Specific examples include —P(Ph)$_2$CH$_2$CH$_2$P(Ph)$_2$-, —As(Ph)$_2$CH$_2$CH$_2$As(Ph$_2$)-, —P(Ph)$_2$CH$_2$CH$_2$C(CF$_3$)$_2$O—, binaphtholate dianions, pinacolate dianions, —P(CH$_3$)$_2$(CH$_2$)$_2$P(CH$_3$)$_2$—, and —OC(CH$_3$)$_2$(CH$_3$)$_2$CO—. Preferred bidentate ligands are —P(Ph)$_2$ CH$_2$CH$_2$P(Ph)$_2$- and —P(CH$_3$)$_2$(CH$_2$)$_2$P(CH$_3$)$_2$—. Tridentate ligands include, but are not limited to, (CH$_3$)$_2$NCH$_2$CH$_2$P(Ph)CH$_2$CH$_2$N(CH$_3$)$_2$. Other preferred tridentate ligands are those in which any three of $X^1$, $X^2$, $L^1$, $L^2$, $L^3$, $R^1$, and $R^2$ (e.g., $X^1$, $L^1$, and $L^2$) are taken together to be cyclopentadienyl, indenyl, or fluorenyl, each optionally substituted with $C_2$-$C_{20}$ alkenyl, $C_2$-$C_{20}$ alkynyl, $C_1$-$C_{20}$ alkyl, $C_5$-$C_{20}$ aryl, $C_1$-$C_{20}$ alkoxy, $C_2$-$C_{20}$ alkenyloxy, $C_2$-$C_{20}$ alkynyloxy, $C_5$-$C_{20}$ aryloxy, $C_2$-$C_{20}$ alkoxycarbonyl, $C_1$-$C_{20}$ alkylthio, $C_1$-$C_{20}$ alkylsulfonyl, or $C_1$-$C_{20}$ alkylsulfinyl, each of which may be further substituted with $C_1$-$C_6$ alkyl, halide, $C_1$-$C_6$ alkoxy or with a phenyl group optionally substituted with halide, $C_1$-$C_6$ alkyl, or $C_1$-$C_6$ alkoxy. More preferably, in compounds of this type, X, $L^1$, and $L^2$ are taken together to be cyclopentadienyl or indenyl, each optionally substituted with vinyl, $C_1$-$C_{10}$ alkyl, $C_5$-$C_{20}$ aryl, $C_1$-$C_{10}$ carboxylate, $C_2$-$C_{10}$ alkoxycarbonyl, $C_1$-$C_{10}$ alkoxy, or $C_5$-$C_{20}$ aryloxy, each optionally substituted with $C_1$-$C_6$ alkyl, halide, $C_1$-$C_6$ alkoxy or with a phenyl group optionally substituted with halide, $C_1$-$C_6$ alkyl or $C_1$-$C_6$ alkoxy. Most preferably, X, $L^1$ and $L^2$ may be taken together to be cyclopentadienyl, optionally substituted with vinyl, hydrogen, methyl, or phenyl. Tetradentate ligands include, but are not limited to O$_2$C(CH$_2$)$_2$P(Ph)(CH$_2$)$_2$P(Ph)(CH$_2$)$_2$CO$_2$, phthalocyanines, and porphyrins.

Complexes wherein Y is coordinated to the metal are examples of a fifth group of catalysts, and are commonly called "Grubbs-Hoveyda" catalysts. Grubbs-Hoveyda metathesis-active metal carbene complexes may be described by the formula (VII)

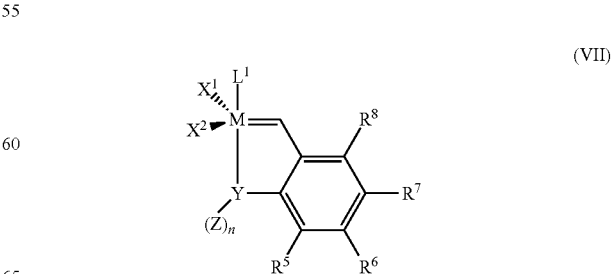

(VII)

wherein,
M is a Group 8 transition metal, particularly Ru or Os, or, more particularly, Ru;
$X^1$, $X^2$, and $L^1$ are as previously defined herein;
Y is a heteroatom selected from N, O, S, and P; preferably Y is O or N;
$R^5$, $R^6$, $R^7$, and $R^8$ are each, independently, selected from the group consisting of hydrogen, halogen, alkyl, alkenyl, alkynyl, aryl, heteroalkyl, heteroatom containing alkenyl, heteroalkenyl, heteroaryl, alkoxy, alkenyloxy, aryloxy, alkoxycarbonyl, carbonyl, alkylamino, alkylthio, aminosulfonyl, monoalkylaminosulfonyl, dialkylaminosulfonyl, alkylsulfonyl, nitrile, nitro, alkylsulfinyl, trihaloalkyl, perfluoroalkyl, carboxylic acid, ketone, aldehyde, nitrate, cyano, isocyanate, hydroxyl, ester, ether, amine, imine, amide, halogen-substituted amide, trifluoroamide, sulfide, disulfide, sulfonate, carbamate, silane, siloxane, phosphine, phosphate, borate, or -A-Fn, wherein "A" and Fn have been defined above; and any combination of Y, Z, $R^5$, $R^6$, $R^7$, and $R^8$ can be linked to form one or more cyclic groups;
n is 0, 1, or 2, such that n is 1 for the divalent heteroatoms O or S, and n is 2 for the trivalent heteroatoms N or P; and
Z is a group selected from hydrogen, alkyl, aryl, functionalized alkyl, functionalized aryl where the functional group(s) may independently be one or more or the following: alkoxy, aryloxy, halogen, carboxylic acid, ketone, aldehyde, nitrate, cyano, isocyanate, hydroxyl, ester, ether, amine, imine, amide, trifluoroamide, sulfide, disulfide, carbamate, silane, siloxane, phosphine, phosphate, or borate; methyl, isopropyl, sec-butyl, t-butyl, neopentyl, benzyl, phenyl and trimethylsilyl; and wherein any combination or combinations of $X^1$, $X^2$, $L^1$, Y, Z, $R^5$, $R^6$, $R^7$, and $R^8$ may be linked to a support. Additionally, $R^5$, $R^6$, $R^7$, and $R^8$ may independently be thioisocyanate, cyanato, or thiocyanato. Additionally, Z may independently be thioisocyanate, cyanato, or thiocyanato.

In general, Grubbs-Hoveyda complexes useful in the invention contain a chelating alkylidene moiety of the formula (VIII)

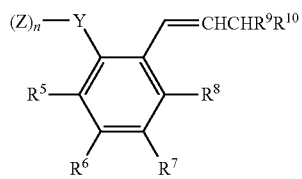

(VIII)

wherein Y, n, Z, $R^5$, $R^6$, $R^7$, and $R^8$ are as previously defined herein;
Y, Z, and $R^5$ can optionally be linked to form a cyclic structure; and
$R^9$ and $R^{10}$ are each, independently, selected from hydrogen or a substituent group selected from alkyl, aryl, alkoxy, aryloxy, $C_2$-$C_{20}$ alkoxycarbonyl, or $C_1$-$C_{20}$ trialkylsilyl, wherein each of the substituent groups is substituted or unsubstituted; and wherein any combination or combinations of Z, Y, $R^5$, $R^6$, $R^7$, $R^8$, $R^9$, and $R^{10}$ may be linked to a support. The chelating alkylidene moiety may be derived from a ligand precursor having the formula

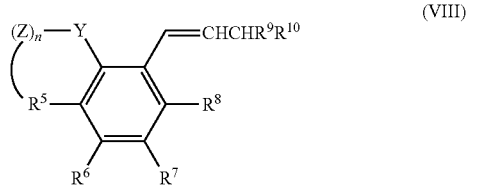

Examples of complexes comprising Grubbs-Hoveyda ligands suitable in the invention include:

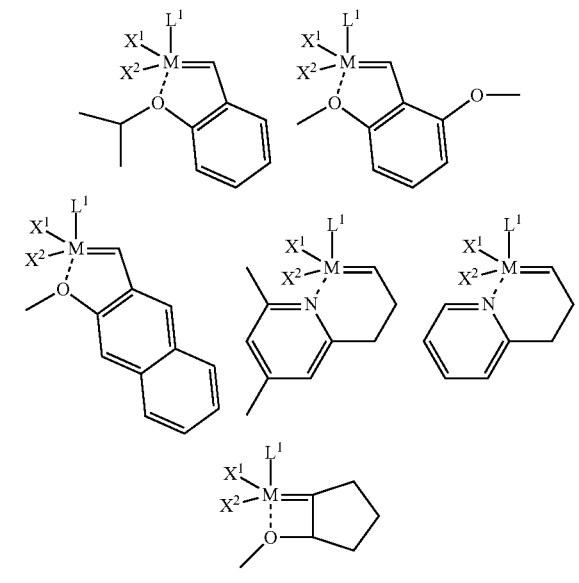

wherein, $L^1$, $X^1$, $X^2$, and M are as described for any of the other groups of catalysts. Suitable chelating carbenes and carbene precursors are further described by Pederson et al. (U.S. Pat. Nos. 7,026,495 and 6,620,955, the disclosures of both of which are incorporated herein by reference) and Hoveyda et al. (U.S. Pat. No. 6,921,735 and WO0214376, the disclosures of both of which are incorporated herein by reference).

Other useful complexes include structures wherein $L^2$ and $R^2$ according to formulae (I), (III), or (V) are linked, such as styrenic compounds that also include a functional group for attachment to a support. Examples in which the functional group is a trialkoxysilyl functionalized moiety include, but are not limited to, the following:

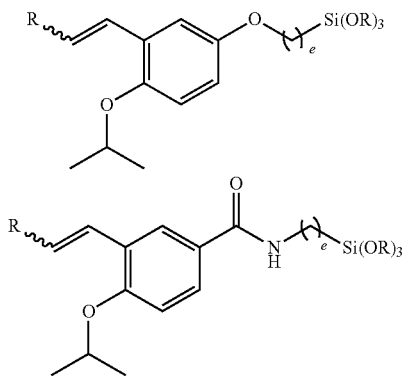

35

-continued

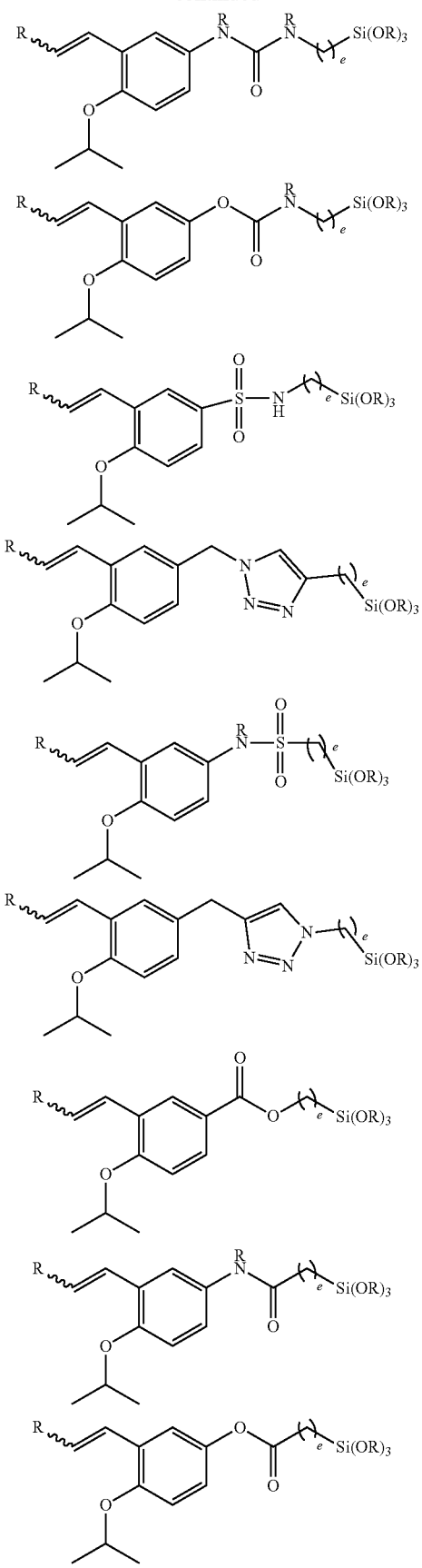

36

-continued

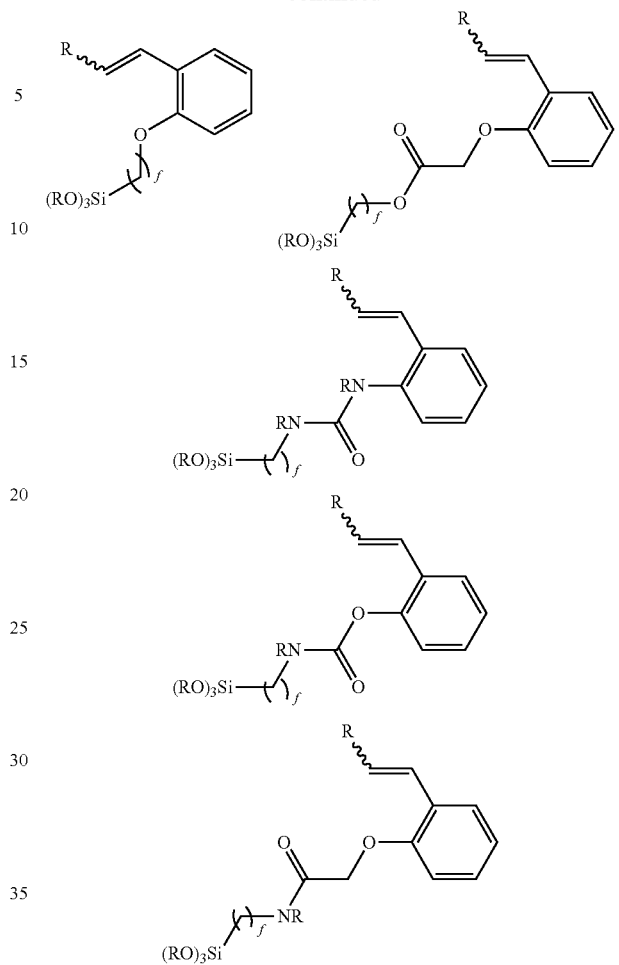

Further examples of complexes having linked ligands include those having linkages between a neutral NHC ligand and an anionic ligand, a neutral NHC ligand and an alkylidine ligand, a neutral NHC ligand and an $L^2$ ligand, a neutral NHC ligand and an $L^3$ ligand, an anionic ligand and an alkylidine ligand, and any combination thereof. While the possible structures are too numerous to list herein, some suitable structures based on formula (III) include:

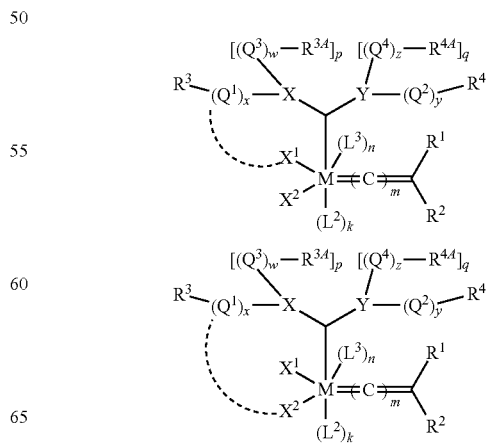

-continued

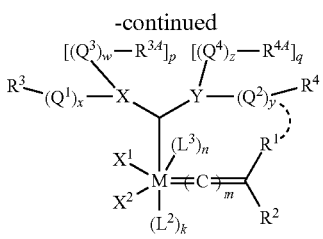

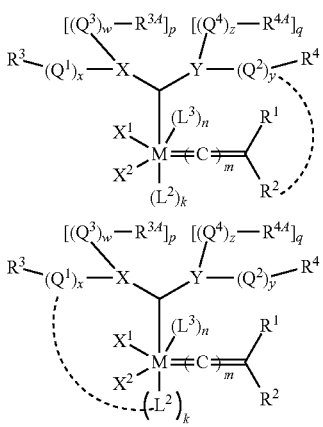

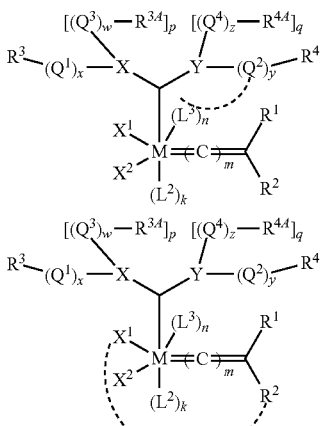

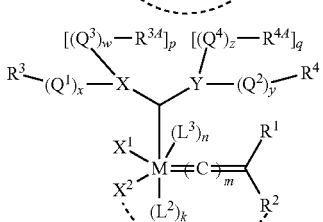

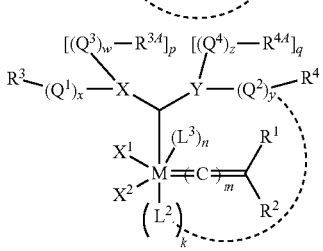

-continued

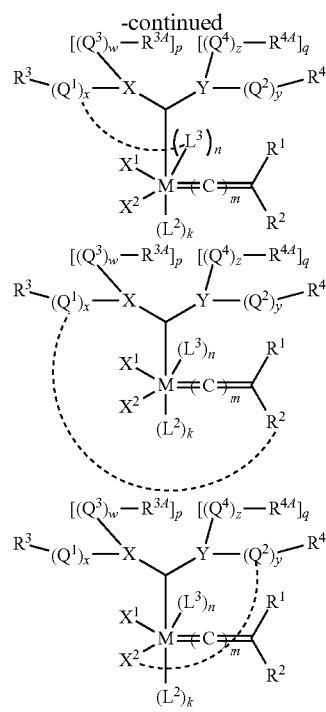

In addition to the catalysts that have the structure of formula (I), as described above, other transition metal carbene complexes include, but are not limited to:

neutral ruthenium or osmium metal carbene complexes containing metal centers that are formally in the +2 oxidation state, have an electron count of 16, are penta-coordinated, and are of the general formula (IX);

neutral ruthenium or osmium metal carbene complexes containing metal centers that are formally in the +2 oxidation state, have an electron count of 18, are hexa-coordinated, and are of the general formula (X);

cationic ruthenium or osmium metal carbene complexes containing metal centers that are formally in the +2 oxidation state, have an electron count of 14, are tetra-coordinated, and are of the general formula (XI); and cationic ruthenium or osmium metal carbene complexes containing metal centers that are formally in the +2 oxidation state, have an electron count of 14 or 16, are tetra-coordinated or penta-coordinated, respectively, and are of the general formula (XII)

(IX)

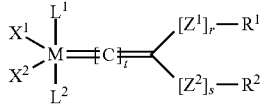

(X)

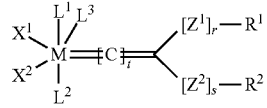

(XI)

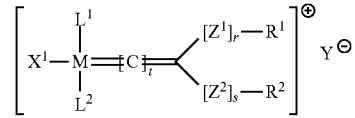

-continued

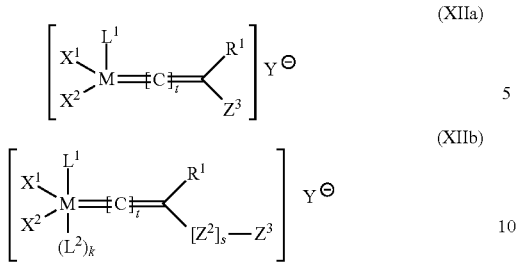

wherein:
M, $X^1$, $X^2$, $L^1$, $L^2$, $L^3$, $R^1$, and $R^2$ are as defined for any of the previously defined groups of catalysts;
r and s are independently zero or 1;
t is an integer in the range of zero to 5;
k is an integer in the range of zero to 1;
Y is any non-coordinating anion (e.g., a halide ion, $BF_4^-$, etc.);
$Z^1$ and $Z^2$ are independently selected from —O—, —S—, —$NR^2$—, —$PR^2$—, —P(=O)$R^2$—, —P(O$R^2$)—, —P(=O)(O$R^2$)—, —C(=O)—, —C(=O)O—, —OC (=O)—, —OC(=O)O—, —S(=O)—, and —S(=O)$_2$—;
$Z^3$ is any cationic moiety such as —P($R^2$)$_3^+$ or —N($R^2$)$_3^+$; and
any two or more of $X^1$, $X^2$, $L^1$, $L^2$, $L^3$, $Z^1$, $Z^2$, $Z^3$, $R^1$, and $R^2$ may be taken together to form a cyclic group, e.g., a multidentate ligand, and wherein any one or more of $X^1$, $X^2$, $L^1$, $L^2$, $L^3$, $Z^1$, $Z^2$, $Z^3$, $R^1$, and $R^2$ may be attached to a support. Additionally, $Z^1$ and $Z^2$ may also be an optionally substituted and/or optionally heteroatom-containing $C_1$-$C_{20}$ hydrocarbylene linkage.

Additionally, another group of olefin metathesis catalysts that may be used in the invention disclosed herein, is a Group 8 transition metal complex having the structure of formula (XIII):

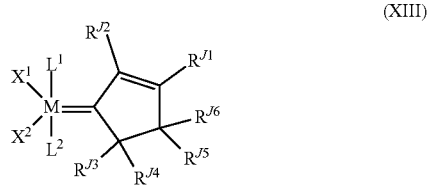

wherein M is a Group 8 transition metal, particularly ruthenium or osmium, or more particularly ruthenium;
$X^1$, $X^2$, $L^1$, and $L^2$ are as defined for the first and second groups of catalysts defined above; and
$R^{J1}$, $R^{J2}$, $R^{J3}$, $R^{J4}$, $R^{J5}$, and $R^{J6}$ are each independently selected from the group consisting of hydrogen, halogen, alkyl, alkenyl, alkynyl, aryl, heteroalkyl, heteroatom containing alkenyl, heteroalkenyl, heteroaryl, alkoxy, alkenyloxy, aryloxy, alkoxycarbonyl, carbonyl, alkylamino, alkylthio, aminosulfonyl, monoalkylaminosulfonyl, dialkylaminosulfonyl, alkylsulfonyl, nitrile, nitro, alkylsulfinyl, trihaloalkyl, perfluoroalkyl, carboxylic acid, ketone, aldehyde, nitrate, cyano, isocyanate, thioisocyanate, cyanato, thiocyanato, hydroxyl, ester, ether, thioether, amine, alkylamine, imine, amide, halogen-substituted amide, trifluoroamide, sulfide, disulfide, sulfonate, carbamate, silane, siloxane, phosphine, phosphate, borate, or -A-Fn, wherein "A" is a divalent hydrocarbon moiety selected from alkylene and arylalkylene, wherein the alkyl portion of the alkylene and arylalkylene groups can be linear or branched, saturated or unsaturated, cyclic or acyclic, and substituted or unsubstituted, wherein the aryl portion of the arylalkylene can be substituted or unsubstituted, and wherein hetero atoms and/or functional groups may be present in either the aryl or the alkyl portions of the alkylene and arylalkylene groups, and Fn is a functional group, or any one or more of the $R^{J1}$, $R^{J2}$, $R^{J3}$, $R^{J4}$, $R^{J5}$, and $R^{J6}$ may be linked together to form a cyclic group, or any one or more of the $R^{J1}$, $R^{J2}$, $R^{J3}$, $R^{J4}$, $R^{J5}$, and $R^{J6}$ may be attached to a support.

Additionally, one preferred embodiment of the Group 8 transition metal complex of formula (XIII) is a Group 8 transition metal complex of formula (XIV):

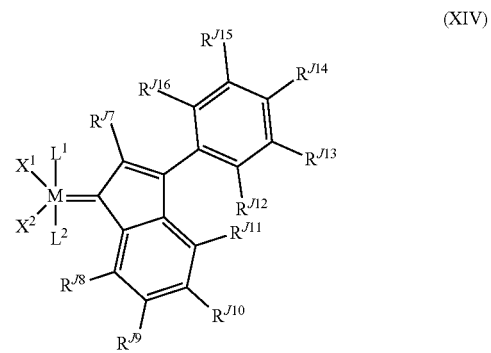

wherein M, $X^1$, $X^2$, $L^1$, $L^2$, are as defined above for Group 8 transition metal complex of formula XIII; and
$R^{J7}$, $R^{J8}$, $R^{J9}$, $R^{J10}$, $R^{J11}$, $R^{J12}$, $R^{J13}$, $R^{J14}$, $R^{J15}$ and $R^{J16}$ are as defined above for $R^{J1}$, $R^{J2}$, $R^{J3}$, $R^{J4}$, $R^{J5}$, and $R^{J6}$ for Group 8 transition metal complex of formula XIII or any one or more of the $R^{J7}$, $R^{J8}$, $R^{J9}$, $R^{J10}$, $R^{J11}$, $R^{J12}$, $R^{J13}$, $R^{J14}$, $R^{J15}$ and $R^{J16}$ may be linked together to form a cyclic group, or any one or more of the $R^{J7}$, $R^{J8}$, $R^{J9}$, $R^{J10}$, $R^{J11}$, $R^{J12}$, $R^{J13}$, $R^{J14}$, $R^{J15}$ and $R^{J16}$ may be attached to a support.

Additionally, another preferred embodiment of the Group 8 transition metal complex of formula (XIII) is a Group 8 transition metal complex of formula (XV):

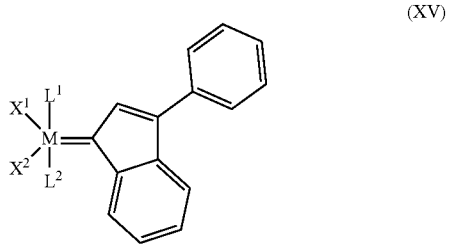

wherein M, $X^1$, $X^2$, $L^1$, $L^2$, are as defined above for Group 8 transition metal complex of formula (XIII).

Additionally, another group of olefin metathesis catalysts that may be used in the invention disclosed herein, is a Group 8 transition metal complex comprising a Schiff base ligand having the structure of formula (XVI):

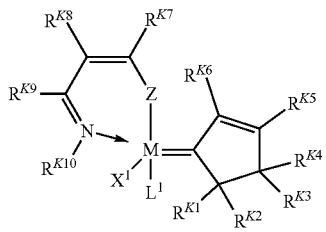

(XVI)

wherein M is a Group 8 transition metal, particularly ruthenium or osmium, or more particularly, ruthenium;

$X^1$ and $L^1$ are as defined for the first and second groups of catalysts defined above;

Z is selected from the group consisting of oxygen, sulfur, selenium, $NR^{K11}$, $PR^{K11}$, $AsR^{K11}$, and $SbR^{K11}$; and $R^{K1}$, $R^{K2}$, $R^{K3}$, $R^{K4}$, $R^{K5}$, $R^{K6}$, $R^{K7}$, $R^{K8}$, $R^{K9}$, $R^{K10}$, and $R^{K11}$ are each independently selected from the group consisting of hydrogen, halogen, alkyl, alkenyl, alkynyl, aryl, heteroalkyl, heteroatom containing alkenyl, heteroalkenyl, heteroaryl, alkoxy, alkenyloxy, aryloxy, alkoxycarbonyl, carbonyl, alkylamino, alkylthio, aminosulfonyl, monoalkylaminosulfonyl, dialkylaminosulfonyl, alkylsulfonyl, nitrile, nitro, alkylsulfinyl, trihaloalkyl, perfluoroalkyl, carboxylic acid, ketone, aldehyde, nitrate, cyano, isocyanate, thioisocyanate, cyanato, thiocyanato, hydroxyl, ester, ether, thioether, amine, alkylamine, imine, amide, halogen-substituted amide, trifluoroamide, sulfide, disulfide, sulfonate, carbamate, silane, siloxane, phosphine, phosphate, borate, or -A-Fn, wherein "A" is a divalent hydrocarbon moiety selected from alkylene and arylalkylene, wherein the alkyl portion of the alkylene and arylalkylene groups can be linear or branched, saturated or unsaturated, cyclic or acyclic, and substituted or unsubstituted, wherein the aryl portion of the arylalkylene can be substituted or unsubstituted, and wherein hetero atoms and/or functional groups may be present in either the aryl or the alkyl portions of the alkylene and arylalkylene groups, and Fn is a functional group, or any one or more of the $R^{K1}$, $R^{K2}$, $R^{K3}$, $R^{K4}$, $R^{K5}$, $R^{K6}$, $R^{K7}$, $R^{K8}$, $R^{K9}$, $R^{K10}$, and $R^{K11}$ may be linked together to form a cyclic group, or any one or more of the $R^{K1}$, $R^{K2}$, $R^{K3}$, $R^{K4}$, $R^{K5}$, $R^{K6}$, $R^{K7}$, $R^{K8}$, $R^{K9}$, $R^{K10}$, and $R^{K11}$ may be attached to a support.

Additionally, one preferred embodiment of the Group 8 transition metal complex of formula (XVI) is a Group 8 transition metal complex comprising a Schiff base ligand having the structure of formula (XVII):

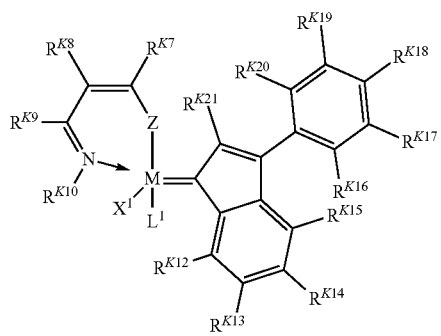

(XVII)

wherein M, $X^1$, $L^1$, Z, $R^{K7}$, $R^{K8}$, $R^{K9}$, $R^{K10}$, and $R^{K11}$ are as defined above for Group 8 transition metal complex of formula XVI; and $R^{K12}$, $R^{K13}$, $R^{K14}$, $R^{K15}$, $R^{K16}$, $R^{K17}$, $R^{K18}$, $R^{K19}$, $R^{K20}$, and $R^{K21}$ are as defined above for $R^{K1}$, $R^{K2}$, $R^{K3}$, $R^{K4}$, $R^{K5}$, and $R^{K6}$ for Group 8 transition metal complex of formula XVI, or any one or more of the $R^{K7}$, $R^{K8}$, $R^{K9}$, $R^{K10}$, $R^{K11}$, $R^{K12}$, $R^{K13}$, $R^{K14}$, $R^{K15}$, $R^{K16}$, $R^{K17}$, $R^{K18}$, $R^{K19}$, $R^{K20}$, and $R^{K21}$ may be linked together to form a cyclic group, or any one or more of the $R^{K7}$, $R^{K8}$, $R^{K9}$, $R^{K10}$, $R^{K11}$, $R^{K12}$, $R^{K13}$, $R^{K14}$, $R^{K15}$, $R^{K16}$, $R^{K17}$, $R^{K18}$, $R^{K19}$, $R^{K20}$, and $R^{K21}$ may be attached to a support.

Additionally, another preferred embodiment of the Group 8 transition metal complex of formula (XVI) is a Group 8 transition metal complex comprising a Schiff base ligand having the structure of formula (XVIII):

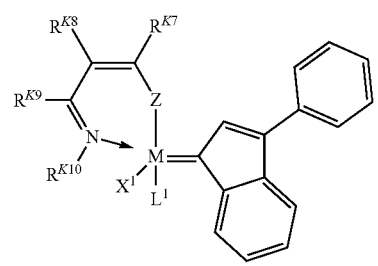

(XVIII)

wherein M, $X^1$, $L^1$, Z, $R^{K7}$, $R^{K8}$, $R^{K9}$, $R^{K10}$, and $R^{K11}$, are as defined above for Group 8 transition metal complex of formula XVI.

Additionally, another group of olefin metathesis catalysts that may be used in the invention disclosed herein, is a Group 8 transition metal complex comprising a Schiff base ligand having the structure of formula (XIX):

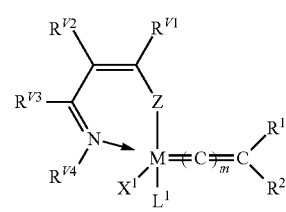

(XIX)

wherein M is a Group 8 transition metal, particularly ruthenium or osmium, or more particularly, ruthenium;

$X^1$, $L^1$, $R^1$, and $R^2$ are as defined for the first and second groups of catalysts defined above;

Z is selected from the group consisting of oxygen, sulfur, selenium, $NR^{V5}$, $PR^{V5}$, $AsR^{V5}$, and $SbR^{V5}$;

m is 0, 1, or 2; and $R^{V1}$, $R^{V2}$, $R^{V3}$, $R^{V4}$, and $R^{V5}$ are each independently selected from the group consisting of hydrogen, halogen, alkyl, alkenyl, alkynyl, aryl, heteroalkyl, heteroatom containing alkenyl, heteroalkenyl, heteroaryl, alkoxy, alkenyloxy, aryloxy, alkoxycarbonyl, carbonyl, alkylamino, alkylthio, aminosulfonyl, monoalkylaminosulfonyl, dialkylaminosulfonyl, alkylsulfonyl, nitrile, nitro, alkylsulfinyl, trihaloalkyl, perfluoroalkyl, carboxylic acid, ketone, aldehyde, nitrate, cyano, isocyanate, thioisocyanate, cyanato, thiocyanato, hydroxyl, ester, ether, thioether, amine, alkylamine, imine, amide, halogen-substituted amide, trifluoroamide, sulfide, disulfide, sulfonate, carbamate, silane, siloxane, phosphine, phosphate, borate, or -A-Fn, wherein "A" is a divalent hydrocarbon moiety selected from alkylene and arylalkylene, wherein the alkyl portion of the alkylene and arylalkylene groups can be linear or branched, saturated or unsaturated, cyclic or acyclic, and substituted or unsubstituted, wherein the aryl portion of the arylalkylene can be substituted or unsubstituted, and wherein hetero atoms and/or functional groups may be present in either the aryl or the alkyl portions of the alkylene and arylalkylene groups, and Fn is a functional group, or any one or more of the $R^{V1}$, $R^{V2}$, $R^{V3}$, $R^{V4}$, and $R^{V5}$ may be linked together to form a cyclic group, or any one or more of the $R^{V1}$, $R^{V2}$, $R^{V3}$, $R^{V4}$, and $R^{V5}$ may be attached to a support.

In addition, catalysts of formulas (XVI) to (XIX) may be optionally contacted with an activating compound, where at least partial cleavage of a bond between the Group 8 transition metal and at least one Schiff base ligand occurs, wherein the activating compound is either a metal or silicon compound selected from the group consisting of copper (I) halides; zinc compounds of the formula $Zn(R^{Y1})_2$, wherein $R^{Y1}$ is halogen, $C_{1-7}$ alkyl or aryl; tin compounds represented by the formula $SnR^{Y2}R^{Y3}R^{Y4}R^{Y5}$ wherein each of $R^{Y2}$, $R^{Y3}$, $R^{Y4}$ and $R^{Y5}$ is independently selected from the group consisting of halogen, $C_{1-20}$ alkyl, $C_3$-$C_{10}$ cycloalkyl, aryl, benzyl and $C_{2-7}$ alkenyl; and silicon compounds represented by the formula $SiR^{Y6}R^{Y7}R^{Y8}R^{Y9}$ wherein each of $R^{Y6}$, $R^{Y7}$, $R^{Y8}$, $R^{Y9}$ is independently selected from the group consisting of hydrogen, halogen, $C_{1-20}$ alkyl, halo, $C_{1-7}$ alkyl, aryl, heteroaryl, and vinyl. In addition, catalysts of formulas (XVI) to (XIX) may be optionally contacted with an activating compound where at least partial cleavage of a bond between the Group 8 transition metal and at least one Schiff base ligand occurs, wherein the activating compound is an inorganic acid such as hydrogen iodide, hydrogen bromide, hydrogen chloride, hydrogen fluoride, sulfuric acid, nitric acid, iodic acid, periodic acid, perchloric acid, $HOClO$, $HOClO_2$ and $HOIO_3$. In addition, catalysts of formulas (XVI) to (XIX) may be optionally contacted with an activating compound where at least partial cleavage of a bond between the Group 8 transition metal and at least one Schiff base ligand occurs, wherein the activating compound is an organic acid such as sulfonic acids including but not limited to methanesulfonic acid, aminobenzenesulfonic acid, benzenesulfonic acid, naphthalenesulfonic acid, sulfanilic acid and trifluoromethanesulfonic acid; monocarboxylic acids including but not limited to acetoacetic acid, barbituric acid, bromoacetic acid, bromobenzoic acid, chloroacetic acid, chlorobenzoic acid, chlorophenoxyacetic acid, chloropropionic acid, cis-cinnamic acid, cyanoacetic acid, cyanobutyric acid, cyanophenoxyacetic acid, cyanopropionic acid, dichloroacetic acid, dichloroacetylacetic acid, dihydroxybenzoic acid, dihydroxymalic acid, dihydroxytartaric acid, dinicotinic acid, diphenylacetic acid, fluorobenzoic acid, formic acid, furancarboxylic acid, furoic acid, glycolic acid, hippuric acid, iodoacetic acid, iodobenzoic acid, lactic acid, lutidinic acid, mandelic acid, α-naphtoic acid, nitrobenzoic acid, nitrophenylacetic acid, o-phenylbenzoic acid, thioacetic acid, thiophene-carboxylic acid, trichloroacetic acid, and trihydroxybenzoic acid; and other acidic substances such as but not limited to picric acid and uric acid.

In addition, other examples of catalysts that may be used with the present invention are located in the following disclosures, each of which is incorporated herein by reference, U.S. Pat. Nos. 7,687,635; 7,671,224; 6,284,852; 6,486,279; and 5,977,393; International Publication Number WO2010/037550; and U.S. patent application Ser. Nos. 12/303,615; 10/590,380; 11/465,651 (Publication No. U.S. 2007/0043188); and Ser. No. 11/465,651 (Publication No. U.S. 2008/0293905 Corrected Publication); and European Pat. Nos. EP1757613B1 and EP1577282B1.

Non-limiting examples of catalysts that may be used to prepare supported complexes and in the reactions disclosed herein include the following, some of which for convenience are identified throughout this disclosure by reference to their molecular weight:

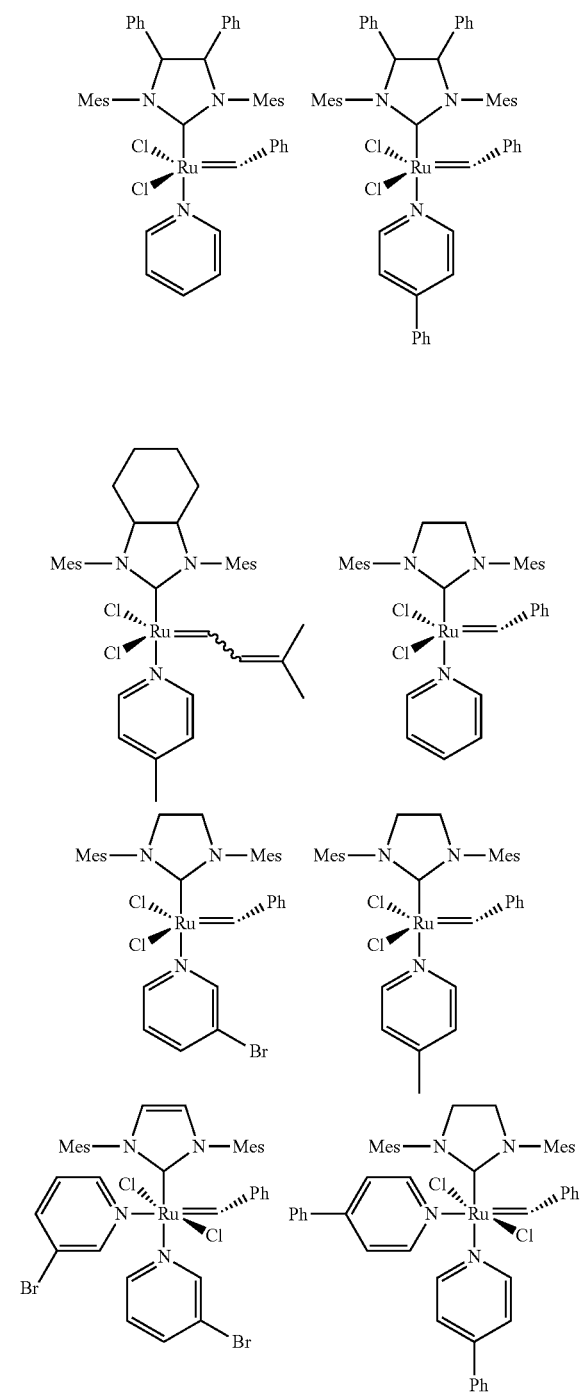

-continued
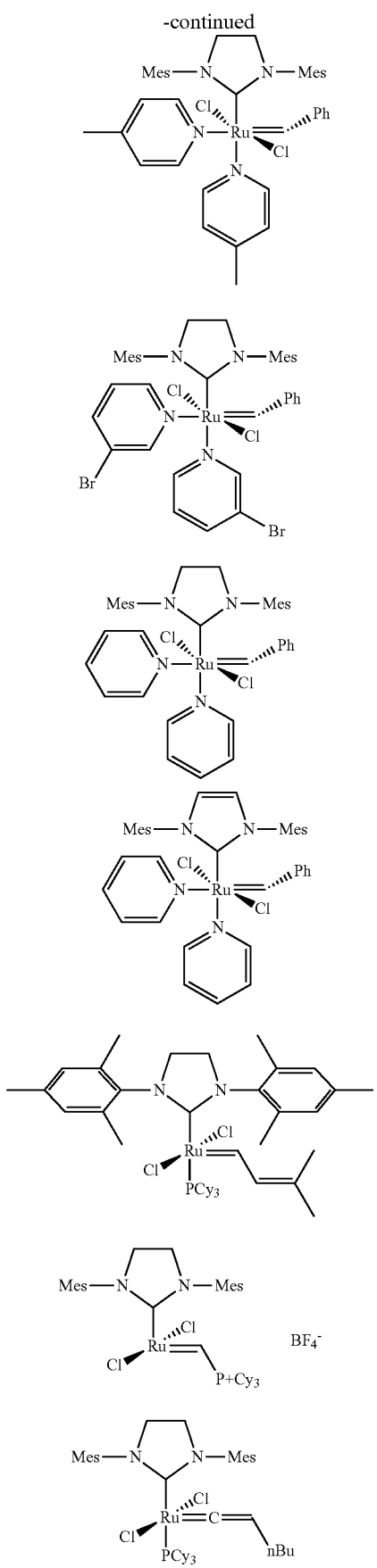
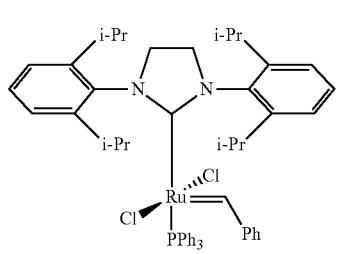
C916
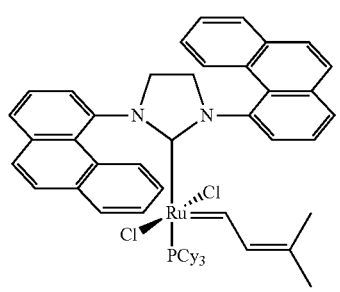
C965-p
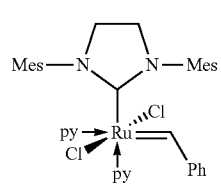
C727
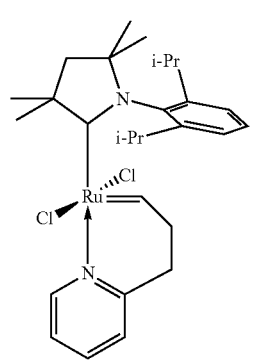
C577
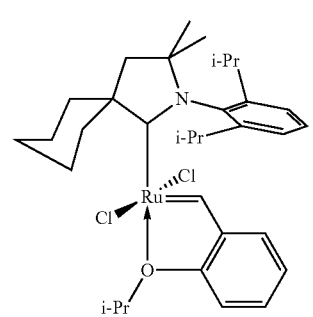
C646
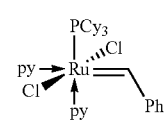
C701

-continued
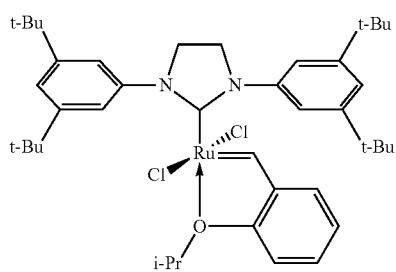
C767-m
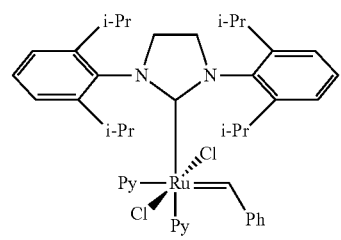
C811
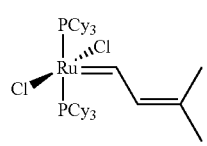
C801
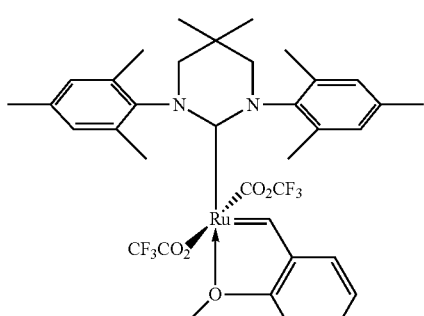
C824
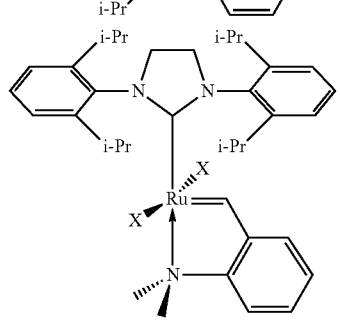
C697 (X = Cl)
C785 (X = Br)
C879 (X = I)
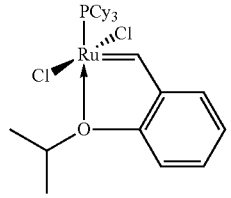
C601
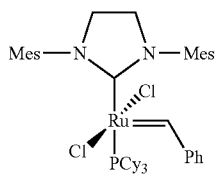
C848
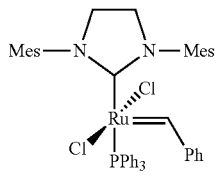
C831
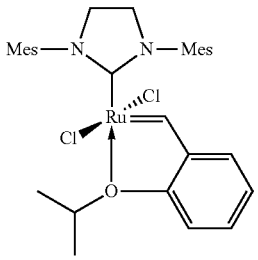
C627
C838
C712
C933

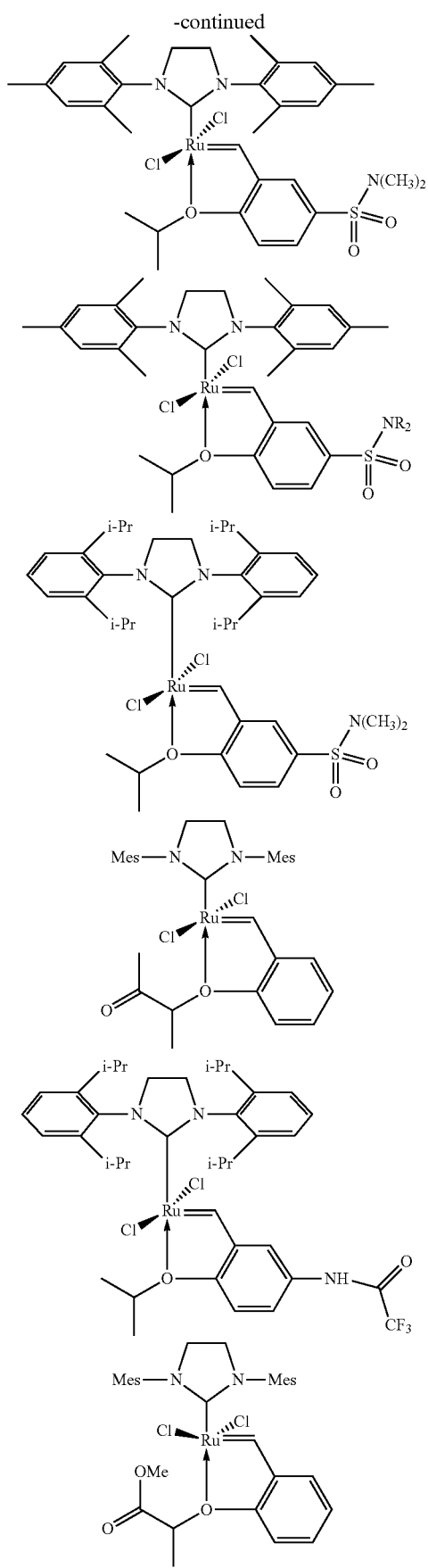
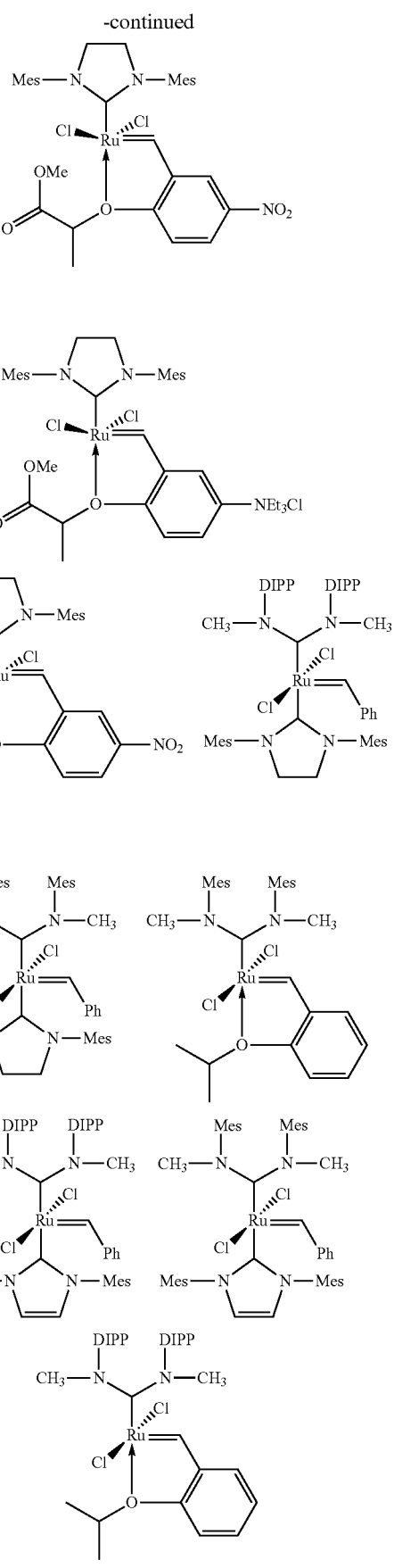

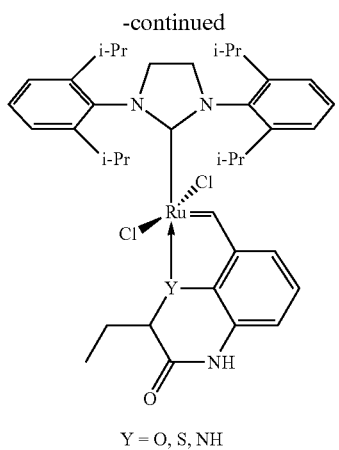

Y = O, S, NH

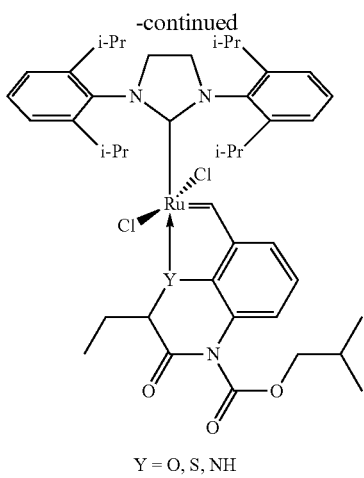

Y = O, S, NH

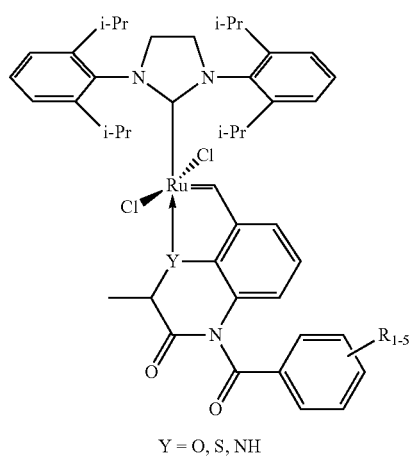

Y = O, S, NH

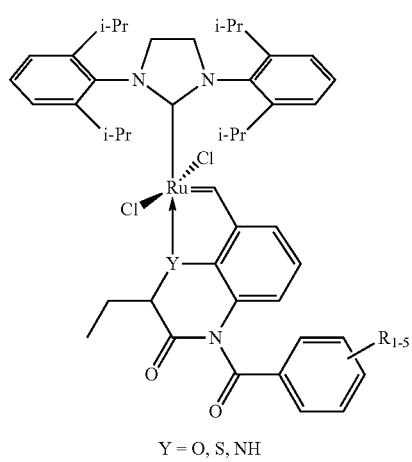

Y = O, S, NH

Additional non-limiting examples of catalysts that may be used to prepare supported complexes and in the reactions disclosed herein include the following,

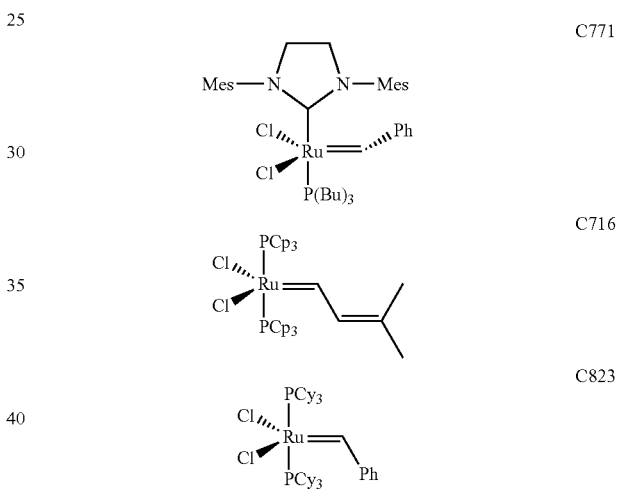

In the foregoing molecular structures and formulae, Ph represents phenyl, Cy represents cyclohexyl, Me represents methyl, Bu represents n-butyl, i-Pr represents isopropyl, py represents pyridine (coordinated through the N atom), Mes represents mesityl (i.e., 2,4,6-trimethylphenyl), DiPP and DIPP represents 2,6-diisopropylphenyl, MiPP represents 2-isopropylphenyl. Additionally, t-Bu represents tert-butyl, and Cp represents cyclopentyl.

Further examples of catalysts useful to prepare supported complexes and in the reactions disclosed herein include the following: ruthenium (II) dichloro (3-methyl-2-butenylidene) bis(tricyclopentylphosphine) (C716); ruthenium (II) dichloro (3-methyl-2-butenylidene) bis(tricyclohexylphosphine) (C801); ruthenium (II) dichloro(phenylmethylene) bis(tricyclohexylphosphine) (C823); ruthenium (II) (1,3-bis-(2,4,6-trimethylphenyl)-2-imidazolidinylidene) dichloro (phenylmethylene) (triphenylphosphine) (C830), and ruthenium (II) dichloro (phenylvinylidene) bis(tricyclohexylphosphine) (C835); ruthenium (II) dichloro (tricyclohexylphosphine) (o-isopropoxyphenylmethylene) (C601), and ruthenium (II) (1, 3-bis-(2, 4, 6-trimethylphenyl)-2-imidazolidinylidene) dichloro (phenylmethylene) bis-(3-bromopyridine) (C884)).

Still further catalysts useful in ROMP reactions, and/or in other metathesis reactions, such as ring-closing metathesis, cross metathesis, ring-opening cross metathesis, self-metathesis, ethenolysis, alkenolysis, acyclic diene metathesis polymerization, and combinations thereof, include the following structures:

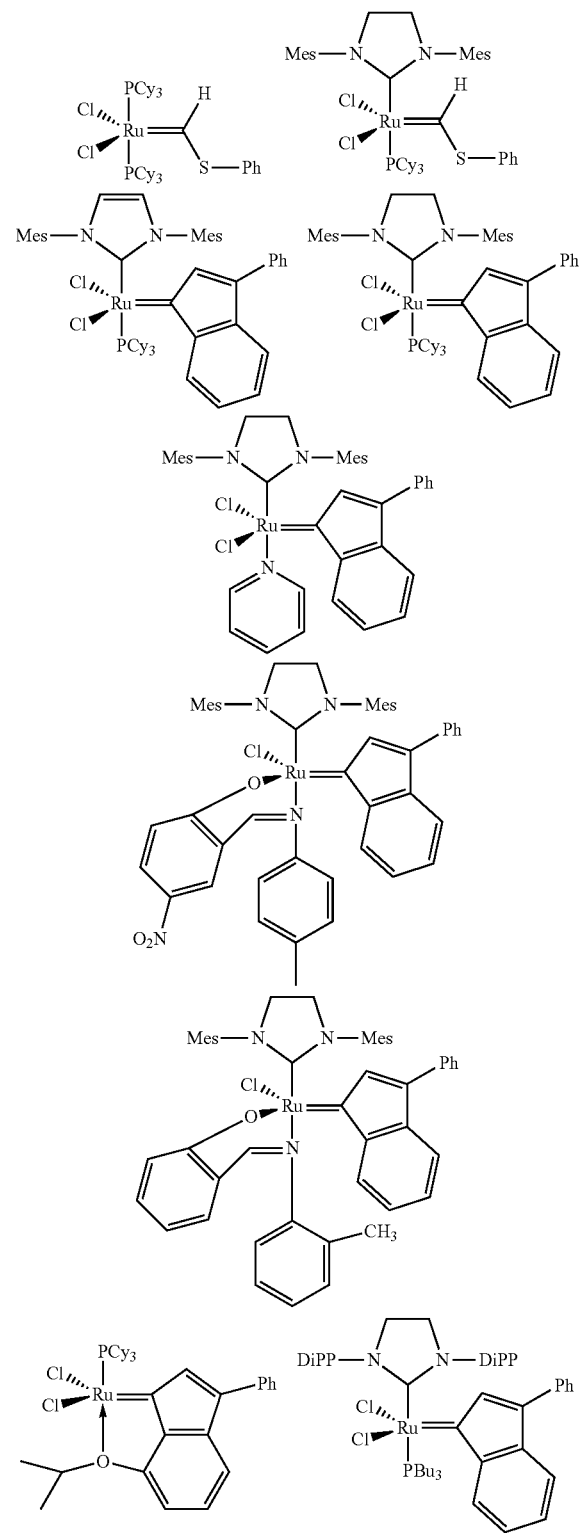

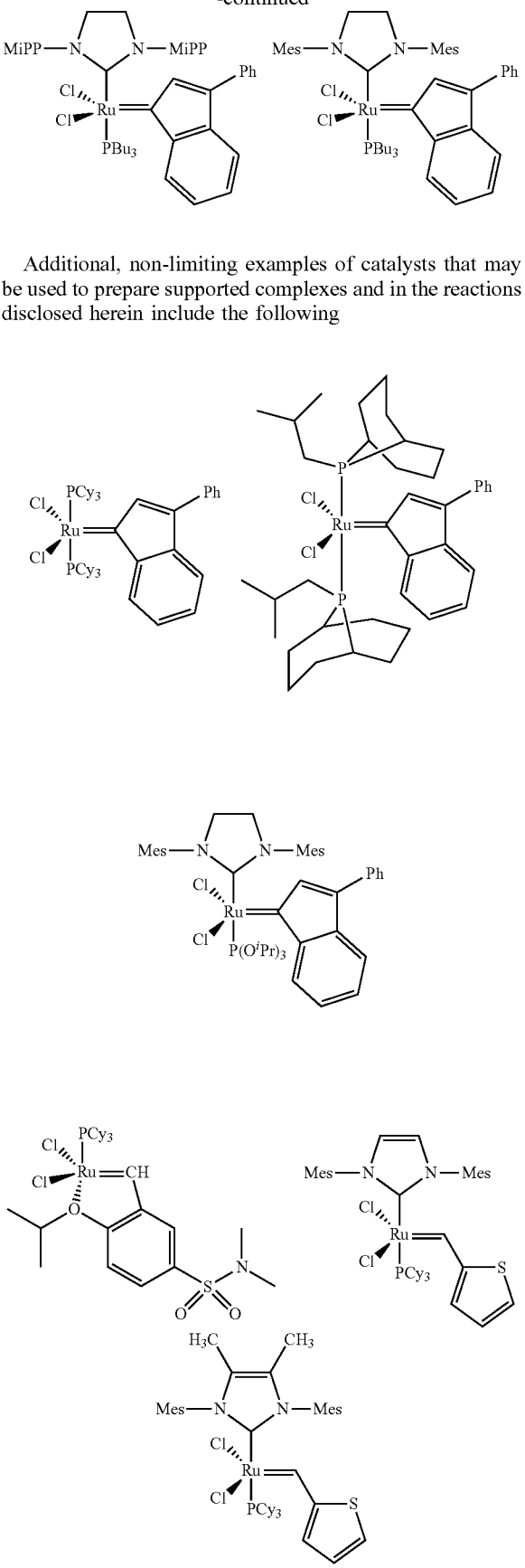

Additional, non-limiting examples of catalysts that may be used to prepare supported complexes and in the reactions disclosed herein include the following -continued

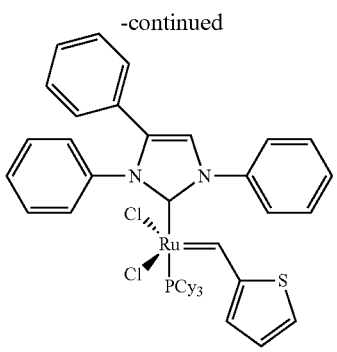

In general, the transition metal complexes used as catalysts herein can be prepared by several different methods, such as those described by Schwab et al. (1996) *J. Am. Chem. Soc.* 118:100-110, Scholl et al. (1999) *Org. Lett.* 6:953-956, Sanford et al. (2001) *J. Am. Chem. Soc.* 123: 749-750, U.S. Pat. Nos. 5,312,940, and 5,342,909, the disclosures of each of which are incorporated herein by reference. Also see U.S. Pat. Pub. No. 2003/0055262 to Grubbs et al., filed Apr. 16, 2002, for "Group 8 Transition Metal Carbene Complexes as Enantioselective Olefin Metathesis Catalysts," International Patent Publication No. WO 02/079208, and U.S. Pat. No. 6,613,910 to Grubbs et al., filed Apr. 2, 2002, for "One-Pot Synthesis of Group 8 Transition Metal Carbene Complexes Useful as Olefin Metathesis Catalysts," the disclosures of each of which are incorporated herein by reference. Preferred synthetic methods are described in International Patent Publication No. WO 03/11455A1 to Grubbs et al. for "Hexacoordinated Ruthenium or Osmium Metal Carbene Metathesis Catalysts," published Feb. 13, 2003, the disclosure of which is incorporated herein by reference.

Preferred olefin metathesis catalysts are Group 8 transition metal complexes having the structure of formula (I) commonly called "First Generation Grubbs" catalysts, formula (II) commonly called "Second Generation Grubbs" catalysts, or formula (VII) commonly called "Grubbs-Hoveyda" catalysts.

More preferred olefin metathesis catalyst has the structure of formula (I)

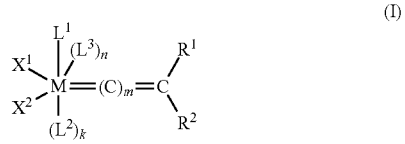

(I)

in which:
M is a Group 8 transition metal;
$L^1$, $L^2$, and $L^3$ are neutral electron donor ligands;
n is 0 or 1;
m is 0, 1, or 2;
k is 0 or 1;
$X^1$ and $X^2$ are anionic ligands; and
$R^1$ and $R^2$ are independently selected from hydrogen, hydrocarbyl, substituted hydrocarbyl, heteroatom-containing hydrocarbyl, substituted heteroatom-containing hydrocarbyl, and functional groups,
wherein any two or more of $X^1$, $X^2$, $L^1$, $L^2$, $L^3$, $R^1$, and $R^2$ can be taken together to form one or more cyclic groups, and further wherein any one or more of $X^1$, $X^2$, $L^1$, $L^2$, $L^3$, $R^1$, and $R^2$ may be attached to a support.

Most preferred olefin metathesis catalyst has the structure of formula (I)

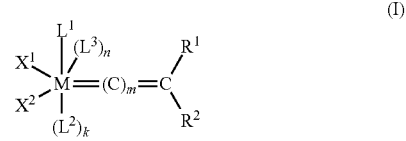

(I)

in which:
M is ruthenium;
n is 0;
m is 0;
k is 1;
$L^1$ and $L^2$ are trisubstituted phosphines independently selected from the group consisting of tri-n-butylphosphine (Pn-Bu$_3$), tricyclopentylphosphine (PCp$_3$), tricyclohexylphosphine (PCy$_3$), triisopropylphosphine (P-i-Pr$_3$), triphenylphosphine (PPh$_3$), methyldiphenylphosphine (PMePh$_2$), dimethylphenylphosphine (PMe$_2$Ph), and diethylphenylphosphine (PEt$_2$Ph); or $L^1$ is an N-heterocyclic carbene selected from the group consisting of 1,3-bis(2,4,6-trimethylphenyl)-4,5-dihydroimidazol-2-ylidene, 1,3-bis(2,4,6-trimethylphenyl)-2-imidazolidinylidene, 1,3-bis(2,6-di-isopropylphenyl)-4,5-dihydroimidazol-2-ylidene, and 1,3-bis(2,6-di-isopropylphenyl)-2-imidazolidinylidene and $L^2$ is a trisubstituted phosphine selected from the group consisting of tri-n-butylphosphine (Pn-Bu$_3$), tricyclopentylphosphine (PCp$_3$), tricyclohexylphosphine (PCy$_3$), triisopropylphosphine (P-i-Pr$_3$), triphenylphosphine (PPh$_3$), methyldiphenylphosphine (PMePh$_2$), dimethylphenylphosphine (PMe$_2$Ph), and diethylphenylphosphine (PEt$_2$Ph);
$X^1$ and $X^2$ are chloride; and
$R^1$ is hydrogen and $R^2$ is phenyl or —C=C(CH$_3$)$_2$ or thienyl; or $R^1$ and $R^2$ are taken together to form 3-phenyl-1H-indene.

Suitable supports for any of the catalysts described herein may be of synthetic, semi-synthetic, or naturally occurring materials, which may be organic or inorganic, e.g., polymeric, ceramic, or metallic. Attachment to the support will generally, although not necessarily, be covalent, and the covalent linkage may be direct or indirect. Indirect covalent linkages are typically, though not necessarily, through a functional group on a support surface. Ionic attachments are also suitable, including combinations of one or more anionic groups on the metal complexes coupled with supports containing cationic groups, or combinations of one or more cationic groups on the metal complexes coupled with supports containing anionic groups.

When utilized, suitable supports may be selected from silicas, silicates, aluminas, aluminum oxides, silica-aluminas, aluminosilicates, zeolites, titanias, titanium dioxide, magnetite, magnesium oxides, boron oxides, clays, zirconias, zirconium dioxide, carbon, polymers, cellulose, cellulosic polymers amylose, amylosic polymers, or a combination thereof. The support preferably comprises silica, a silicate, or a combination thereof.

In certain embodiments, it is also possible to use a support that has been treated to include functional groups, inert moieties, and/or excess ligands. Any of the functional groups described herein are suitable for incorporation on the support, and may be generally accomplished through techniques known in the art. Inert moieties may also be incorporated on the support to generally reduce the available attachment sites on the support, e.g., in order to control the placement, or amount, of a complex linked to the support.

The metathesis catalysts that are described infra may be utilized in olefin metathesis reactions according to techniques known in the art. The catalyst is typically added to the reaction medium as a solid, or as a suspension wherein the catalyst is suspended in an appropriate liquid. It will be appreciated that the amount of catalyst that is used (i.e., the "catalyst loading") in the reaction is dependent upon a variety of factors such as the identity of the reactants and the reaction conditions that are employed. It is therefore understood that catalyst loading may be optimally and independently chosen for each reaction. In general, however, the catalyst will be present in an amount that ranges from a low of about 0.1 ppm, 1 ppm, or 5 ppm, to a high of about 10 ppm, 15 ppm, 25 ppm, 50 ppm, 100 ppm, 200 ppm, 500 ppm, or 1000 ppm relative to the amount of an olefinic substrate. Additionally, the catalyst may be added to the reaction medium or resin composition as a solution. Additionally, when the catalyst is added to the reaction medium or resin composition as a suspension, the catalyst is suspended in an appropriate liquid, such as a dispersing carrier such as mineral oil, paraffin oil, soybean oil, triisopropylbenzene, or any hydrophobic liquid which has a sufficiently high viscosity so as to permit effective dispersion of the catalyst, and which is sufficiently inert and which has a sufficiently high boiling point so that it does not act as a low-boiling impurity in the olefin metathesis reaction.

The catalyst will generally be present in an amount that ranges from a low of about 0.00001 mol %, 0.0001 mol %, or 0.0005 mol %, to a high of about 0.001 mol %, 0.0015 mol %, 0.0025 mol %, 0.005 mol %, 0.01 mol %, 0.02 mol %, 0.05 mol %, or 0.1 mol % relative to the olefinic substrate.

When expressed as the molar ratio of monomer to catalyst, the catalyst (the "monomer to catalyst ratio"), loading will generally be present in an amount that ranges from a low of about 10,000,000:1, 1,000,000:1, or 200,00:1, to a high of about 100,000:1 66,667:1, 40,000:1, 20,000:1, 10,000:1, 5,000:1, or 1,000:1.

Cyclic Olefin (Resin) Compositions and Articles

Cyclic olefin resin, particularly ROMP, compositions according to the invention, generally comprise one or more cyclic olefins, an olefin metathesis catalyst, an adhesion promoter, and a substrate material, such as, for example, a glass substrate material; one or more cyclic olefins, an olefin metathesis catalyst, an adhesion promoter, and a hydroperoxide gel modifier; or one or more cyclic olefins, an olefin metathesis catalyst, and a hydroperoxide gel modifier. In another embodiment, cyclic olefin resin, particularly ROMP, compositions according to the invention, generally comprise one or more cyclic olefins, an olefin metathesis catalyst, an adhesion promoter, and a heteroatom-functionalized substrate. The cyclic olefins described hereinabove are suitable for use and may be functionalized or unfunctionalized, and may be substituted or unsubstituted. In general, particularly advantageous results may be obtained for ROMP resin compositions wherein the adhesion promoter is present in an amount effective to increase the adhesion of the ROMP composition to a substrate material when the ROMP composition is subjected to metathesis catalysis conditions in the presence of a substrate material. Additionally, cyclic olefin resin compositions according to the invention may also comprise one or more cyclic olefins and an adhesion promoter, where the resin composition is combined with an olefin metathesis catalyst, and the resulting resin composition is applied to a substrate, such as, for example, a glass substrate. Additionally, cyclic olefin resin compositions according to the invention may also comprise one or more cyclic olefins and an adhesion promoter, where the resin composition is combined with an olefin metathesis catalyst, and the resulting resin composition is applied to a substrate, wherein the substrate may be a functionalized substrate, such as, for example, a heteroatom-functionalized substrate, such as, for example, an amino-functionalized substrate. Furthermore, cyclic olefin resin compositions according to the invention may also comprise one or more cyclic olefins, an adhesion promoter, and a hydroperoxide gel modifier, where the resin composition is combined with an olefin metathesis catalyst, and the resulting resin composition is applied to a substrate. In addition, cyclic olefin resin compositions according to the invention may also comprise one or more cyclic olefins and a hydroperoxide gel modifier, where the resin composition is combined with an olefin metathesis catalyst, and the resulting resin composition is applied to a substrate.

The amounts of the adhesion promoter in the resin composition may vary over a wide range and may vary depending on the manufacturing operation or the particular end-use application. Generally, any level of adhesion promoter which produces a desired increase in mechanical properties is of particular interest. When formulated or combined with a resin composition, the concentration of the adhesion promoter typically ranges from 0.05-10 phr, more particularly, from 0.5-4.0 phr. In a preferred aspect of the invention, increased mechanical properties may be obtained for resin compositions comprising the adhesion promoter and substrate materials, or resin compositions comprising the adhesion promoter that are applied to substrate materials, compared to resin compositions without the adhesion promoter. For example, the inclusion of the adhesion promoter in resin compositions according to the invention may provide an improvement in mechanical properties, such as interlaminar shear strength (ILSS), of at least about 10% compared to the same resin composition that does not contain the adhesion promoter. Preferably, the use of the adhesion promoter provides at least a 2% improvement in an adhesion property (e.g., ILSS, as described in the examples), more particularly at least a 5%, or 10%, or 15%, or 20%, or 30%, or 40%, or 50%, or 80% improvement in the adhesion property compared to the adhesion property value (e.g., ILSS) obtained for the same resin composition that does not include the adhesion promoter. In particular aspects of the invention, substrate materials may advantageously comprise an aminosilane-treated substrate.

The amounts of hydroperoxide gel modifier in the resin composition may vary over a wide range and may vary depending on the manufacturing operation or the particular end-use application. Generally, any level of hydroperoxide gel modifier which delays the onset of the gel-state of a particular metathesis polymerization is of particular interest. When formulated or combined with a resin composition, the concentration of the hydroperoxide gel modifier typically ranges between 0.01 and 1000 equivalents with respect to catalyst, such as, for example, between 0.05 and 100 equivalents with respect to catalyst, such as, for example, between 0.1 and 50 equivalents with respect to catalyst, such as, for example, between 0.1 and 20 equivalents with respect to catalyst.

Resin compositions of the invention may be optionally formulated with additives. The amount of additives present in the resin compositions may vary depending on the particular type of additive used. The concentration of the additives in the resin compositions typically ranges from, for example, 0.001-85 percent by weight, particularly, from 0.1-75 percent by weight, or, even more particularly, from 2-60 percent by weight. Suitable additives include, but are not limited to, additional gel modifiers, hardness modulators, antioxidants, stabilizers, fillers, binders, plasticizers, pigments, flame retardants, dyes, fibers and reinforcement materials, including sized reinforcements and substrates, such as those treated with finishes, coatings, coupling agents, film formers, and/or lubricants.

Resin compositions of the invention may be optionally formulated without a crosslinker, for example, a crosslinker selected from dialkyl peroxides, diacyl peroxides, and peroxyacids.

Additionally, suitable impact modifiers or elastomers include without limitation natural rubber, butyl rubber, polyisoprene, polybutadiene, polyisobutylene, ethylene-propylene copolymer, styrene-butadiene-styrene triblock rubber, random styrene-butadiene rubber, styrene-isoprene-styrene triblock rubber, styrene-ethylene/butylene-styrene copolymer, styrene-ethylene/propylene-styrene copolymer, ethylene-propylene-diene terpolymers, ethylene-vinyl acetate, and nitrile rubbers. Preferred impact modifiers or elastomers are polybutadiene Diene 55AC10 (Firestone), polybutadiene Diene 55AM5 (Firestone), EPDM Royalene 301T, EPDM Buna T9650 (Bayer), styrene-ethylene/butylene-styrene copolymer Kraton G1651H, Polysar Butyl 301 (Bayer), polybutadiene Taktene 710 (Bayer), styrene-ethylene/butylene-styrene Kraton G1726M, Ethylene-Octene Engage 8150 (DuPont-Dow), styrene-butadiene Kraton D1184, EPDM Nordel 1070 (DuPont-Dow), and polyisobutylene Vistanex MML-140 (Exxon). Such materials are normally employed in the resin composition at levels of about 0.10 phr to 10 phr, but more preferably at levels of about 0.1 phr to 5 phr. Various polar impact modifiers or elastomers can also be used.

Additionally, antioxidants and antiozonants include any antioxidant or antiozonant used in the rubber or plastics industry. An "Index of Commercial Antioxidants and Antiozonants, Fourth Edition" is available from Goodyear Chemicals, The Goodyear Tire and Rubber Company, Akron, Ohio 44316. Suitable stabilizers (i.e. antioxidants or antiozonants) include without limitation: 2,6-di-tert-butyl-4-methylphenol (BHT); styrenated phenol, such as Wingstay S (Goodyear); 2- and 3-tert-butyl-4-methoxyphenol; alkylated hindered phenols, such as Wingstay C (Goodyear); 4-hydroxymethyl-2,6-di-tert-butylphenol; 2,6-di-tert-butyl-4-sec-butylphenol; 2,2'-methylenebis(4-methyl-6-tert-butylphenol); 2,2'-methylenebis(4-ethyl-6-tert-butylphenol); 4,4'-methylenebis(2,6-di-tert-butylphenol); miscellaneous bisphenols, such as Cyanox 53 and Permanax WSO; 2,2'-ethylidenebis(4,6-di-tert-butylphenol); 2,2'-methylenebis(4-methyl-6-(1-methylcyclohexyl)phenol); 4,4'-butylidenebis(6-tert-butyl-3-methylphenol); polybutylated Bisphenol A; 4,4'-thiobis(6-tert-butyl-3-methylphenol); 4,4'-methylenebis(2,6-dimethylphenol); 1,1'-thiobis(2-naphthol); methylene bridged polyaklylphenol, such as Ethyl antioxidant 738; 2,2'-thiobis(4-methyl-6-tert-butylphenol); 2,2'-isobutylidenebis(4,6-dimethylphenol); 2,2'-methylenebis(4-methyl-6-cyclohexylphenol); butylated reaction product of p-cresol and dicyclopentadiene, such as Wingstay L; tetrakis(methylene-3,5-di-tert-butyl-4-hydroxyhydrocinnamate)methane, i.e., Irganox 1010; 1,3,5-trimethyl-2,4,6-tris(3,5-di-tert-butyl-4-hydroxybenzyl)benzene, e.g., Ethanox 330; 4,4'-methylenebis (2,6-di-tertiary-butylphenol), e.g. Ethanox 4702 or Ethanox 4710; 1,3,5-tris(3,5-di-tert-butyl-4-hydroxybenzyl)isocyanurate, i.e., Good-rite 3114, 2,5-di-tert-amylhydroquinone, tert-butylhydroquinone, tris(nonylphenylphosphite), bis(2,4-di-tert-butyl)pentaerythritol) diphosphite, distearyl pentaerythritol diphosphite, phosphited phenols and bisphenols, such as Naugard 492, phosphite/phenolic antioxidant blends, such as Irganox B215; di-n-octadecyl(3,5-di-tert-butyl-4-hydroxybenzyl) phosphonate, such as Irganox 1093; 1,6-hexamethylene bis (3-(3,5-di-tert-butyl-4-hydroxyphenylpropionate), such as Irganox 259, and octadecyl-3,5-di-tert-butyl-4-hydroxyhydrocinnamate, i.e., Irganox 1076, tetrakis(2,4-di-tert-butylphenyl)4,4'-biphenylylenediphosp honite, diphenylamine, and 4,4'-diemthoxydiphenylamine. Such materials are normally employed in the resin composition at levels of about 0.10 phr to 10 phr, but more preferably at levels of about 0.1 phr to 5 phr.

Suitable reinforcing materials include those that add to the strength or stiffness of a polymer composite when incorporated with the polymer. Reinforcing materials can be in the form of filaments, fibers, rovings, mats, weaves, fabrics, knitted material, cloth, or other known structures. Suitable reinforcement materials include glass fibers and fabrics, carbon fibers and fabrics, aramid fibers and fabrics, polyolefin fibers or fabrics (including ultrahigh molecular weight polyethylene fabrics such as those produced by Honeywell under the Spectra trade name), and polyoxazole fibers or fabrics (such as those produced by the Toyobo Corporation under the Zylon® trade name). Reinforcing materials containing surface finishes, sizings, or coatings are particularly suitable for the described invention including Ahlstrom glass roving (R338-2400), Johns Manville glass roving (Star ROV®-086), Owens Corning rovings (OCV 366-AG-207, R25H-X14-2400, SE1200-207, SE1500-2400, SE2350-250), PPG glass rovings (Hybon® 2002, Hybon® 2026), Toho Tenax® carbon fiber tow (HTR-40), and Zoltek carbon fiber tow (Panex® 35). Furthermore, any fabrics prepared using reinforcing materials containing surface finishes, sizings or coatings are suitable for the invention. Advantageously, the invention does not require the expensive process of removing of surface finishes, sizings, or coatings from the reinforcing materials. Additionally, glass fibers or fabrics may include without limitation A-glass, E-glass or S-glass, S-2 glass, C-glass, R-glass, ECR-glass, M-glass, D-glass, and quartz, and silica/quartz. Preferred glass fiber reinforcements are those with finishes formulated for use with epoxy, vinyl ester, and/or polyurethane resins. When formulated for use with a combination of these resin types, the reinforcements are sometimes described as "multi-compatible." Such reinforcements are generally treated during their manufacture with organosilane coupling agents comprising vinyl, amino, glycidoxy, or methacryloxy functional groups (or various combinations thereof) and are coated with a finish to protect the fiber surface and facilitate handling and processing (e.g., spooling and weaving). Finishes typically comprise a mixture of chemical and polymeric compounds such as film formers, surfactants, and lubricants. Especially preferred glass reinforcements are those containing some amount of amino-functionalized silane coupling agent. Especially preferred finishes are those comprising and epoxy-based and/or polyurethane-based film formers. Examples of preferred glass-fiber reinforcements are those based on Hybon® 2026, 2002, and 2001 (PPG) multi-compatible rovings; Ahlstrom R338 epoxysilane-sized rovings; StarRov® 086 (Johns Manville) soft silane sized multi-compatible rovings; OCV™ 366, SE 1200, and R25H (Owens Corning) multi-compatible rovings; OCV™ SE 1500 and 2350 (Owens Corning) epoxy-compatible rovings; and Jushi Group multi-compatible glass rovings (752 type, 396 type, 312 type, 386 type). Additional suitable polymer fibers and fabrics may include without limitation one or more of polyester, polyamide (for example, NYLON polamide available from E.I. DuPont, aromatic polyamide (such as KEVLAR aromatic polyamide available from E.I. DuPont, or P84 aromatic polyamide available from Lenzing Aktiengesellschaft), polyimide (for example KAPTON polyimide available from E.I. DuPont, polyethylene (for example, DYNEEMA polyethylene from Toyobo Co., Ltd.). Additional suitable carbon fibers may include without limitation AS2C, AS4, AS4C, AS4D, AS7, IM6, IM7, IM9, and PV42/850 from Hexcel Corporation; TORAYCA T300, T300J, T400H, T600S, T700S, T700G, T800H, T800S, T1000G, M35J, M40J, M46J, M50J, M55J, M60J, M30S, M30G and M40 from Toray Industries, Inc.; HTS12K/24K, G30-500 3k/6K/12K, G30-500 12K, G30-700 12K, G30-7000 24K $F_{402}$, G40-800 24K, STS 24K, HTR 40 F22 24K 1550tex from Toho Tenax, Inc.; 34-700, 34-700WD, 34-600, 34-600WD, and 34-600 unsized from Grafil Inc.; T-300, T-650/35, T-300C, and T-650/35C from Cytec Industries.

Other suitable fillers include, for example, metallic density modulators, microparticulate density modulators, such as, for example, microspheres, and macroparticulate density modulators, such as, for example, glass or ceramic beads. Metallic density modulators include, but are not limited to, powdered, sintered, shaved, flaked, filed, particulated, or granulated metals, metal oxides, metal nitrides, and/or metal carbides, and the like. Preferred metallic density modulators include, among others, tungsten, tungsten carbide, aluminum, titanium, iron, lead, silicon oxide, aluminum oxide, boron carbide, and silicon carbide. Microparticulate density modulators include, but are not limited to, glass, metal, thermoplastic (either expandable or pre-expanded) or thermoset, and/or ceramic/silicate microspheres. Macroparticulate density modulators include, but are not limited to, glass, plastic, or ceramic beads; metal rods, chunks, pieces, or shot; hollow glass, ceramic, plastic, or metallic spheres, balls, or tubes; and the like.

The invention is also directed to articles manufactured from a resin composition comprising a cyclic olefin, an olefin metathesis catalyst, such as a ROMP catalyst, the adhesion promoter, and a substrate material, such as, for example, a glass substrate material; a cyclic olefin, an olefin metathesis catalyst, such as a ROMP catalyst, the adhesion promoter, and the hydroperoxide gel modifier; and a cyclic olefin, an olefin metathesis catalyst, such as a ROMP catalyst, and the hydroperoxide gel modifier. Articles may include, but are not limited to, those formed by standard manufacturing techniques including casting, centrifugal casting, pultrusion, molding, rotational molding, open molding, reaction injection molding (RIM), resin transfer molding (RTM), pouring, vacuum impregnation, surface coating, filament winding and other methods known to be useful for production of polymer articles. Molded parts include but are not limited to reaction injection molding, resin transfer molding, and vacuum assisted resin transfer molding. Furthermore, the compositions and articles of manufacture of the invention are not limited to a single polymer-surface interface but include also multilayers and laminates containing multiple polymer-surface interfaces. The invention is also suitable for manufacture of articles by the infusion of the resin into a porous material. Such porous materials include but are not limited to wood, cement, concrete, open-cell and reticulated foams and sponges, papers, cardboards, felts, ropes or braids of natural or synthetic fibers, and various sintered materials. Additionally, other manufacturing techniques include without limitation cell casting, dip casting, continuous casting, embedding, potting, encapsulation, film casting or solvent casting, gated casting, mold casting, slush casting, extrusion, mechanical foaming, chemical foaming, physical foaming, compression molding or matched die molding, spray up, Vacuum Assisted Resin Transfer Molding (VARTM), Seeman's Composite Resin Infusion Molding Process (SCRIMP), blow molding, in mold coating, in-mold painting or injection, vacuum forming, Reinforced Reaction Injection Molding (RRIM), Structural Reaction Injection Molding (SRIM), thermal expansion transfer molding (TERM), resin injection recirculation molding (RICM), controlled atmospheric pressure resin infusion (CAPRI), hand-layup. For manufacturing techniques requiring the use of a RIM or impingement style mixhead, including without limitation RIM, SRIM, and RRIM, articles of manufacture may be molded using a single mixhead or a plurality of mixheads as well as a plurality of material injection streams (e.g. two resin streams and one catalyst stream).

Additionally, the invention is also directed to articles manufactured from a resin composition comprising a cyclic olefin and an adhesion promoter, where the resin composition is combined with an olefin metathesis catalyst, and the resulting resin composition is applied to a substrate, which may be, for example, a functionalized substrate, such as, for example, a heteroatom-functionalized substrate, such as, for example, an amino-functionalized substrate.

Furthermore, the present invention also allows for the molding of articles of manufacture of any configuration, weight, size, thickness, or geometric shape. Examples of articles of manufacture include without limitation any molded or shaped article for use as an aerospace component, a marine component, an automotive component, a sporting goods component, an electrical component, an industrial component, medical component, or military component. In one embodiment an article may be a turbine component used on aircraft or general power generation. In one embodiment, turbine components may include without limitation one or more of an inlet, a pylon, a pylon fairing, an acoustic panel, a trust reverser panel, a fan blade, a fan containment case, a bypass duct, an aerodynamic cowl, or an airfoil component. In one embodiment, an article may be a turbine blade component or may be a turbine blade. In one embodiment, an article may be a wind rotor blade, tower, spar cap, tower, or nacelle for wind turbines. In one embodiment, an article may be an airframe component. Examples of aerospace components may include without limitation one or more of fuselage skin, wing, fairing, doors, access panel, aerodynamic control surface, or stiffner. In one embodiment an article may be an automotive component. Examples of automotive components may include without limitation one or more of body panel, fender, spoiler, truck bed, protective plate, hood, longitudinal rail, pillar, or door. Examples of industrial components may include without limitation one or more of risers platforms, impact protection structures for oil and gas; bridges, pipes, pressure vessels, power poles, coils, containers, reinforcement structures for concrete architectures and roads, or radiators. Examples of electrical components may include without limitation one or more wound articles, such as coils of electric motors. In one embodiment, an article may be an eddy-current shielding component of a magnetic resonance imaging system or shielding component for any electromagnetic radiation. In one embodiment, an article may be a military component including without limitation ballistics resistant armor for personnel or vehicles, or ballistics resistant structures for protecting personnel or equipment. In one embodiment, an article may be a sporting goods component including without limitation an arrow shaft, a tennis racket frame, a hockey stick, compound bow limbs, or a golf club shaft.

Resin compositions according to the invention may further comprise a sizing composition, or be used to provide improved adhesion to substrate materials that are sized with certain commercial silanes commonly used in the industry. As is known in the art, glass fibers are typically treated with a chemical solution (e.g., a sizing composition) soon after their formation to reinforce the glass fibers and protect the strands' mechanical integrity during processing and composite manufacture. Sizing treatments compatible with olefin metathesis catalysts and polydicyclopentadiene composites have been described in U.S. Pat. Nos. 6,890,650 and 6,436,476, the disclosures of both of which are incorporated herein by reference. However, these disclosures are based on the use of specialty silane treatments that are not commonly used in industrial glass manufacture. By comparison, the current invention may provide improved mechanical properties for polymer-glass composites that are sized with silanes commonly used in the industry.

Glass sizing formulations typically comprise at least one film former (typically a film forming polymer), at least one silane, and at least one lubricant. Any components of a sizing formulation that do not interfere with or substantially decrease the effectiveness of the metathesis catalyst or olefin polymerization reaction are considered to be compatible with the current invention and may generally be used herein.

Film formers that are compatible with ROMP catalysts include epoxies, polyesters, polyurethanes, polyolefins, and/or polyvinyl acetates. Other common film formers that do not adversely affect the performance of the olefin metathesis catalyst may also be used. Film formers are typically used as nonionic, aqueous emulsions. More than one film former may be used in a given sizing formulation, to achieve a desired balance of glass processability and composite mechanical properties.

More particularly, the film former may comprise a low molecular weight epoxy emulsion, defined as an epoxy monomer or oligomer with an average molecular weight per epoxide group (EEW) of less than 500, and/or a high molecular weight epoxy emulsion, defined as an epoxy monomer or oligomer with an average molecular weight per epoxide group (EEW) of greater than 500. Examples of suitable low molecular weight products include aqueous epoxy emulsions produced by Franklin International, including Franklin K8-0203 (EEW 190) and Franklin E-102 (EEW 225-275). Other examples of low molecular weight epoxy emulsions are available from Hexion, including EPI-REZ™ 3510-W-60 (EEW 185-215), and EPI-REZ™ 3515-W-60 (EEW 225-275). Further examples of low molecular weight epoxy emulsions are available from COIM, including Filco 309 (EEW 270) and Filco 306 (EEW 330). Further examples of low molecular weight epoxy emulsions are available from DSM, including Neoxil® 965 (EEW 220-280) and Neoxil® 4555 (EEW 220-260). Examples of suitable high molecular weight epoxy emulsion products include epoxy emulsions produced by Hexion, including EPI-REZ™ 3522-W-60 (EEW 615-715).

Aqueous emulsions of modified epoxies, polyesters, and polyurethanes may also be used in the film former. Examples of suitable modified epoxy products include emulsions produced by DSM, including Neoxil® 2626 (a plasticized epoxy with an EEW of 500-620), Neoxil® 962/D (an epoxy-ester with an EEW of 470-550), Neoxil® 3613 (an epoxy-ester with an EEW of 500-800), Neoxil® 5716 (an epoxy-novolac with an EEW of 210-290), Neoxil® 0035 (a plasticized epoxy-ester with an EEW of 2500), and Neoxil® 729 (a lubricated epoxy with an EEW of 200-800). Further examples of modified epoxy emulsions are available from COIM, including Filco 339 (an unsaturated polyester-epoxy with an EEW of 2000) and Filco 362 (an epoxy-ester with an EEW of 530). Examples of suitable polyester products include emulsions produced by DSM, including Neoxil® 954/D, Neoxil® 2635, and Neoxil® 4759 (unsaturated bisphenolic polyesters). Additional suitable products from DSM include Neoxil® 9166 and Neoxil® 968/60 (adipate polyesters). Further examples of suitable products include emulsions produced by COIM, including Filco 354/N (unsaturated bisphenolic polyester), Filco 350 (unsaturated polyester), and Filco 368 (saturated polyester). Examples of suitable polyurethane products include emulsions produced by Bayer Material Science, including Baybond® 330 and Baybond® 401.

The film former may also comprise polyolefins or polyolefin-acrylic copolymers, polyvinylacetates, modified polyvinylacetates, or polyolefin-acetate copolymers. Suitable polyolefins include, but are not limited to, polyethylenes, polypropylenes, polybutylenes, and copolymers thereof, and the polyolefins may be oxidized, maleated, or otherwise treated for effective film former use. Examples of suitable products include emulsions produced by Michelman, including Michem® Emulsion 91735, Michem® Emulsion 35160, Michem® Emulsion 42540, Michem® Emulsion 69230, Michem® Emulsion 34040M1, Michem® Prime 4983R, and Michem® Prime 4982SC. Examples of suitable products include emulsions produced by HB Fuller, including PD 708H, PD 707, and PD 0166. Additional suitable products include emulsions produced by Franklin International, including Duracet® 637. Additional suitable products include emulsions produced by Celanese, including Vinamul® 8823 (plasticized polyvinylacetate), Dur-O-Set® E-200 (ethylene-vinyl acetate copolymer), Dur-O-Set® TX840 (ethylene-vinyl acetate copolymer), and Resyn® 1971 (epoxy-modified polyvinylacetate).

While not limited thereto, preferred film formers include low- and high-molecular weight epoxies, saturated and unsaturated polyesters, and polyolefins, such as Franklin K80-203, Franklin E-102, Hexion 3510-W-60, Hexion 3515-W-60, and Michelman 35160.

Nonionic lubricants may also be added to the sizing composition. Suitable nonionic lubricants that are compatible with ROMP compositions include esters of polyethylene glycols and block copolymers of ethylene oxide and propylene oxide. More than one nonionic lubricant may be used in a given sizing formulation if desired, e.g., to achieve a desired balance of glass processability and composite mechanical properties.

Suitable lubricants may contain polyethylene glycol (PEG) units with an average molecular weight between 200 and 2000, preferably between 200-600. These PEG units can be esterified with one or more fatty acids, including oleate, tallate, laurate, stearate, and others. Particularly preferred lubricants include PEG 400 dilaurate, PEG 600 dilaurate, PEG 400 distearate, PEG 600 distearate, PEG 400 dioleate, and PEG 600 dioleate. Examples of suitable products include compounds produced by BASF, including MAPEG® 400 DO, MAPEG® 400 DOT, MAPEG® 600 DO, MAPEG® 600 DOT, and MAPEG® 600 DS. Additional suitable products include compounds produced by Zschimmer & Schwarz, including Mulsifan 200 DO, Mulsifan 400 DO, Mulsifan 600 DO, Mulsifan 200 DL, Mulsifan 400 DL, Mulsifan 600 DL, Mulsifan 200 DS, Mulsifan 400 DS, and Mulsifan 600 DS. Additional suitable products include compounds produced by Cognis, including Agnique® PEG 300 DO, Agnique® PEG 400 DO, and Agnique® PEG 600 DO.

Suitable nonionic lubricants also include block copolymers of ethylene oxide and propylene oxide. Examples of suitable products include compounds produced by BASF, including Pluronic® L62, Pluronic® L 101, Pluronic® P103, and Pluronic® P105.

Cationic lubricants may also be added to the sizing composition. Cationic lubricants that are compatible with ROMP include modified polyethyleneimines, such as Emery 6760L produced by Pulcra Chemicals.

Silane coupling agent may optionally be added to the sizing composition, non-limiting examples including, methacrylate, acrylate, amino, or epoxy functionalized silanes along with alkyl, alkenyl, and norbornenyl silanes.

Optionally, the sizing composition may contain one or more additives for modifying the pH of the sizing resin. One preferred pH modifier is acetic acid.

The sizing composition may optionally contain other additives useful in glass sizing compositions. Such additives may include emulsifiers, defoamers, cosolvents, biocides, antioxidants, and additives designed to improve the effectiveness of the sizing composition. The sizing composition can be prepared by any method and applied to substrate materials for use herein, such as glass fibers or fabric, by any technique or method.

In a preferred embodiment, the metathesis reactions disclosed herein are carried out under a dry, inert atmosphere. Such an atmosphere may be created using any inert gas, including such gases as nitrogen and argon. The use of an inert atmosphere is optimal in terms of promoting catalyst activity, and reactions performed under an inert atmosphere typically are performed with relatively low catalyst loading. The reactions disclosed herein may also be carried out in an oxygen-containing and/or a water-containing atmosphere, and in one embodiment, the reactions are carried out under ambient conditions. The presence of oxygen or water in the reaction may, however, necessitate the use of higher catalyst loadings as compared with reactions performed under an inert atmosphere. Where the vapor pressure of the reactants allows, the reactions disclosed herein may also be carried out under reduced pressure.

The reactions disclosed herein may be carried out in a solvent, and any solvent that is inert towards cross-metathesis may be employed. Generally, solvents that may be used in the metathesis reactions include organic, protic, or aqueous solvents, such as aromatic hydrocarbons, chlorinated hydrocarbons, ethers, aliphatic hydrocarbons, alcohols, water, or mixtures thereof. Example solvents include benzene, toluene, p-xylene, methylene chloride, 1,2-dichloroethane, dichlorobenzene, chlorobenzene, tetrahydrofuran, diethylether, pentane, methanol, ethanol, water, or mixtures thereof. In a preferred embodiment, the reactions disclosed herein are carried out neat, i.e., without the use of a solvent.

It will be appreciated that the temperature at which a metathesis reaction according to methods disclosed herein is conducted can be adjusted as needed, and may be at least about −78° C., −40° C., −10° C., 0° C., 10° C., 20° C., 25° C., 35° C., 50° C., 70° C., 100° C., or 150° C., or the temperature may be in a range that has any of these values as the upper or lower bounds. In a preferred embodiment, the reactions are carried out at a temperature of at least about 35° C., and in another preferred embodiment, the reactions are carried out at a temperature of at least about 50° C.

EXPERIMENTAL

In the following examples, efforts have been made to ensure accuracy with respect to numbers used (e.g., amounts, temperature, etc.) but some experimental error and deviation should be accounted for. Unless indicated otherwise, temperature is in degrees C. and pressure is at or near atmospheric.

The following examples are to be considered as not being limiting of the invention as described herein, and are instead provided as representative examples of the adhesion promoter and gel modification compositions of the invention and the methods for their use.

EXAMPLES

Materials and Methods

All glassware was oven dried and reactions were performed under ambient conditions unless otherwise noted. All solvents and reagents were purchased from commercial suppliers and used as received unless otherwise noted.

Dicyclopentadiene (Ultrene® 99) (DCPD) was obtained from Cymetech Corporation. A modified DCPD base resin containing 20-25% tricyclopentadiene (and small amounts of higher cyclopentadiene homologs) was prepared by heat treatment of Ultrene® 99 as generally described in U.S. Pat. No. 4,899,005.

Solid MDI (4,4'-methylene diphenyl diisocyanate) was used as received from Sigma Aldrich (98% purity). Liquid MDI (50/50 mixture of 4,4'-MDI and 2,4'-MDI) was used as received from Bayer Material Science (Mondur® ML). Hexamethylenediisocyanurate (hexamethylenediisocyanatetrimer, HDIt, CAS #3779-63-3) was used as received from Bayer Material Science (Desmodur® N3300A). HDI (hexamethylenediisocyanate or diisocyanatohexane, CAS #822-06-0) was used as received from Sigma Aldrich (98% purity), Acros Organics (99+% purity), TCI America (98% purity), or Bayer Material Science (Desmodur® H, 99.5% purity). Isophorone diisocyante (IPDI) was used as received from Sigma Aldrich (98% purity). Meta-tetramethylxylylene diisocyanate (TMXDI®) was used as received from Cytec. H12MDI (4,4'-Methylenebis(cyclohexyl isocyanate), was used as received from Sigma Aldrich (90% purity). Polymeric MDI (PM200) was used as received from Yantai Wanhua Polyurethane Company. Lupranate® 5080 (MDI prepolymer), Lupranate® MI (liquid MDI), and Lupranate® MM103 (liquid carbodiimide modified 4,4'-MDI) were used as received from BASF. Additionally, 4-Benzylphenyl isocyanate (CAS #1823-37-6, purity 97%) and 2-biphenylyl isocyanate (CAS #17337-13-2, purity 98%) were used as received from Sigma Aldrich.

NB-MeOH (5-Norbornene-2-methanol, CAS #95-12-5) was used as received from Sigma Aldrich or prepared by literature methods. HENB (2-hydroxyethyl bicyclo[2.2.1] hept-2-ene-5-carboxylate) was prepared by literature methods. Allyl alcohol, 2-ethyl hexanol, and 1-octanol were used as received from Sigma Aldrich. DCPD-OH (dicyclopentadiene alcohol) was used as received from Texmark.

Metathesis catalysts were prepared by standard methods and include [1,3-bis-(2,4,6-trimethylphenyl)-2-imidazolidinylidene]dichloro(3-methyl-2-butenylidene)(tricyclohexylphosphine) ruthenium (II) (C827), ruthenium (II) dichloro (3-methyl-2-butenylidene) bis(tricyclohexylphosphine)

(C801), ruthenium (II) dichloro (tricyclohexylphosphine) (o-isopropoxyphenylmethylene) (C601), [1,3-bis-(2,4,6-trimethylphenyl)-2-imidazolidinylidene]dichloro(benzylidene)(tri(n-butyl)phosphine) ruthenium (II) (C771), and [1,3-bis-(2,4,6-trimethylphenyl)-2-imidazolidinylidene]dichloro(phenylindenylidene)(tri(n-butyl)phosphine) ruthenium (II) (C871). Ethanox® 4702 antioxidant (4,4'methylenebis (2,6-di-tertiary-butylphenol), Albemarle Corporation) was used where indicated.

Cumene hydroperoxide (CHP) was used as received from Sigma Aldrich (88% purity, unless otherwise specified) or Syrgis Performance Initiators (Norox® CHP, 85%). CHP was added to resin formulations as a 1,000 ppm concentration stock solution in DCPD. tert-Butyl hydroperoxide was used as received from Sigma Aldrich (5.5M solution in decane). mCPBA (3-chloroperoxybenzoic acid), benzoyl peroxide (97% purity), di-tert-butyl peroxide (98% purity), and tri-n-butylphosphine (TNBP) were used as received from Sigma Aldrich. Triphenyl phosphine (TPP) was used as received from Arkema. Additionally, mineral oil used to prepare the catalyst suspensions was Crystal Plus 70FG.

Glass rovings and fabrics were used as supplied by Ahlstrom (R338-2400), Johns Manville (Star ROV®-086), Owens Corning (OCV 366-AG-207, R25H-X14-2400, SE1200-207, SE1500-2400, SE2350-250), and PPG (Hybon® 2002, Hybon® 2026). Toho Tenax® HTR40 carbon fiber roving was used as received.

Additives to the resin are reported as ppm, which is defined as the weight in grams of additive per million grams of resin, or as phr, which is defined as the weight in grams of the additive per hundred grams of resin.

Roving wrap composites were prepared using a small-scale variation of a hand layup technique. Glass roving was saturated with catalyzed dicyclopentadiene resin and layered into a ¼"×6" bar mold under moderate tension. The bar mold was compressed to achieve approximately 50% fiber volume at ⅛" thickness, and held with C-clamps during the oven cure process. Roving wrap composites were heated from room temperature to 120° C. at 1° C./min, and held at 120° C. for two hours.

Glass composite laminates were prepared using the VARTM process. The laminate was constructed by cutting and arranging plies of glass fabric on an aluminum tool to achieve approximately 50% fiber volume at ⅛" thickness. A rigid plate was placed on top of the ply stack to ensure that pressure was applied evenly across the surface. Using braided tubing, an infusion inlet and outlet vent were positioned appropriately near the glass fabric. A sheet of vacuum bagging film and tacky tape was used to create an air-tight cover on the glass and the tubing and evacuated to a vacuum level of between 25 inches-Hg to 28 inches-Hg. A mixture of resin and catalyst was degassed in vacuo for 15 minutes and then back-filled with argon. The mixture was then infused in to the glass fabric, driven by the pressure gradient between the ambient pressure and the evacuated glass fabric assembly. After the infusion was complete, the composite laminate was heated from room temperature to 75° C. at a heating rate of 1° C./min, and then the composite laminate was heated to 120° C. and held at that temperature for two hours.

Gel modifier ppm is defined as the grams of gel modifier per million grams of resin. Corrections for gel modifier purity were made. With regard to other formulation additives, PHR is defined as the weight of the additive per hundred grams of base resin.

Viscosity profiles were measured on a Brookfield LVDVII viscometer, and data was analyzed by Wingather V3.0-1 software. Measurements were made with Spindle #1 set to 50 RPM on 400 g samples equilibrated to 20-25° C. Data points were logged at two-second to two-minute intervals, depending on experimental timescale. Temperatures were measured using J-type thermocouples, sampling at five second intervals and collected by Omega 2.0 OM-CP series data logging software.

The mechanical properties were measured using standard techniques. All values reported are the average of 3 samples. Interlaminar shear strength (ILSS) at 10% strain was measured by the short-beam shear method according to ASTM D2344 on 1"×¼"×⅛" samples. The ILSS values were reported in units of pounds per square inch (psi). Interlaminar shear strength (ILSS) is a measure of the adhesion and/or compatibility between polymer matrix and fiber reinforcement in a composite. The following criteria, based on interlaminar shear strength values, was used to characterize the adhesion and/or compatibility between the polymer matrix and the glass or carbon fiber reinforcement materials. Composites having poor adhesion and/or compatibility between the polymer matrix and fiber reinforcement were characterized has having ILSS values less than about 3000 psi suggesting a lack of covalent adhesion between the polymer matrix and fiber reinforcement. Composites having moderate adhesion and/or compatibility between the polymer matrix and fiber reinforcement were characterized as having ILSS values from about 3000 psi to about 6000 psi suggesting minimal to no covalent adhesion between the polymer matrix and fiber reinforcement. Composites having superior adhesion and/or compatibility between the polymer matrix and fiber reinforcement were characterized as having ILSS values greater than about 6000 psi suggesting a higher degree of covalent adhesion between the polymer matrix and fiber reinforcement. Heat deflection temperature was measured according to ASTM D648 on 5"×½"×¼" samples. Flexural peak strength and flexural modulus were tested according to ASTM D790 using 5"×½"×¼" samples. Izod pendulum impact resistance was tested according to ASTM D526 using 2.5"×½"×¼" samples. All samples were stored and tested at ambient room conditions.

Synthesis of HENB (2-hydroxyethyl bicyclo[2.2.1]hept-2-ene-5-carboxylate)

HEA (2-hydroxyethyl acrylate) (640 g, 1.0 mol eq.) was added to a 3 L round bottom flask containing toluene (1 kg). DCPD (dicyclopentadiene) (1.5 kg) was added to a separate 3 L round bottom flask, and the 3 L flask containing DCPD was affixed with a Vigreaux column and distillation head connected to a condenser. The 3 L flask containing HEA and toluene was connected to the condenser. The DCPD was heated to >160° C. under an inert atmosphere to "crack" the DCPD and form CPD (cyclopentadiene). The CPD (740 g, 2.0 mol eq.) was added dropwise to the HEA/toluene mixture at 10-40° C. under an inert atmosphere. Conversion of HEA to HENB (2-hydroxyethyl bicyclo[2.2.1]hept-2-ene-5-carboxylate) was monitored by GC (gas chromatography). Toluene and reformed DCPD (364 g) were removed from the reaction mixture by vacuum distillation to give the desired HENB product as a colorless liquid (1004 g, quantitative yield, approx. 98% purity).

Examples 1(a-l)-4(a-l)

Roving Composites Prepared with Isocyanate Adhesion Agents

Resin was prepared using the modified DCPD (containing 20-25% tricyclopentadiene), 20 ppm CHP, 2 phr Ethanox®

4702 antioxidant, and 2 phr of the appropriate isocyanate adhesion promoter. The resin was catalyzed by the addition of C827 (monomer to catalyst ratio 30,000:1) in a suspension of mineral oil. Roving wrap composites based on glass roving (Examples 1(a-l) PPG2002; Examples 2(a-l) PPG2026; Examples 3(a-l) Ahlstrom R338-2400; Examples 4(a-l) Star ROV®-086) were saturated with the catalyzed dicyclopentadiene resin and layered into a ¼"×6" bar mold under moderate tension. The bar mold was compressed to achieve approximately 50% fiber volume at ⅛" thickness, and held with C-clamps during the oven cure process. Roving wrap composites were heated from room temperature to 120° C. at 1° C./min, and held at 120° C. for two hours. The ILSS of the resulting composites were measured (Table 1). Samples without adhesion promoter (Examples 1a, 2a, 3a, 4a) all had poor mechanical properties. Generally, all the tested adhesion promoters improved the mechanical properties of the PPG2026 composites. Several adhesion promoters improved the mechanical properties of all four composites testing: 4,4'-MDI (c), the 4,4'-MDI/2,4'-MDI mixture (b), and hexamethylenediisocyanurate (HDIt, d) (Table 1).

TABLE 1

ILSS for Roving Composites Prepared with Isocyanate Adhesion Promoter

| | | ILSS (psi) | | | |
|---|---|---|---|---|---|
| Example | Adhesion Promoter | 1 PPG-2002 | 2 PPG-2026 | 3 Ahlstrom R338-2400 | 4 Star ROV®-086 |
| a | None | 1376 | 3574 | 1464 | 1347 |
| b | 4,4'-MDI/2,4'-MDI | 6760 | 7886 | 6313 | 6499 |
| c | 4,4'-MDI | 7012 | 6890 | 6417 | 6279 |
| d | HDIt | 5461 | 6714 | 5129 | 4933 |
| e | H12MDI | not tested | 6931 | not tested | 1837 |
| f | HDI | 2604 | 7007 | 3719 | 2837 |
| g | IPDI | not tested | 6811 | 2730 | 2329 |
| h | TMXDI® | not tested | 5622 | 1888 | 1848 |
| i | PM200 PolyMDI | 7124 | 7985 | 7318 | 7052 |
| j | Lupranate® 5080 | 5075 | 7083 | 6105 | 4957 |
| k | Lupranate® MI | 6974 | 8683 | 7168 | 6484 |
| l | Lupranate® MM103 | 6822 | 7609 | 6948 | 6009 |

"Not tested" samples were damaged during fabrication so ILSS could not be evaluated.

Examples 5(a-h)-8(a-h)

Roving Composites Prepared with Isocyanate Adhesion Agents and HENB

Resin was prepared using the modified DCPD (containing 20-25% tricyclopentadiene), 20 ppm CHP, 2 phr Ethanox® 4702 antioxidant, 2 phr of the appropriate diisocyanate adhesion promoter, and 2 phr of HENB. The resin was catalyzed by the addition of C827 (monomer to catalyst ratio 30,000:1) in a suspension of mineral oil. Roving wrap composites based on glass rovings (Examples 5(a-h) PPG2002; Examples 6(a-h) PPG2026; Examples 7(a-h) Ahlstrom R338-2400; Examples 8(a-h) Star ROV®-086) were prepared as described in Example 1. The ILSS of the resulting composites were measured (Table 2). In most cases the addition of HENB further improved the mechanical properties of the resulting composites compared with those using the diisocyanate adhesion promoter alone (1b-1h, 2b-2h, 3b-3h, and 4b-4h from Table 1). HENB alone did not improve adhesion (5h-8h).

TABLE 2

ILSS for Roving Composites Prepared with Isocyanate Adhesion Promoter and HENB

| | | ILSS (psi) | | | |
|---|---|---|---|---|---|
| Example | Adhesion Promoter | 5 PPG-2002 | 6 PPG2026 | 7 Ahlstrom R338-2400 | 8 Star ROV®-086 |
| a | 4,4'-MDI/2,4'-MDI | 7895 | 8052 | 8330 | 8093 |
| b | 4,4'-MDI | 7334 | 6736 | 7596 | 7450 |
| c | HDIt | 7489 | 7525 | 7848 | 7143 |
| d | H12MDI | not tested | 6153 | not tested | 2524 |
| e | HDI | 6570 | 7307 | 7468 | 6966 |
| f | IPDI | 4367 | 7002 | 4912 | 4376 |
| g | TMXDI® | 2102 | 5809 | 3186 | 3160 |
| h | HENB with no adhesion promoter | 1047 | 2263 | not tested | 1269 |

Examples 10(a-f); 11(a-f)

Roving Composites Prepared with Isocyanate Adhesion Agents

Resin was prepared using the modified DCPD (containing 20-25% tricyclopentadiene), 20 ppm CHIP, 2 phr Ethanox® 4702 antioxidant, and either 2 phr of 4,4'-MDI/2,4'-MDI (Examples 10(a-f)) or HDIt (examples 11(a-f)) diisocyanate adhesion promoter. The resin was catalyzed by the addition of C827 (monomer to catalyst ratio 30,000:1) in a suspension of mineral oil. Roving wrap composites based on glass rovings were prepared as described in Example 1. The ILSS of the resulting composites were measured (Tables 3 and 4). 4,4'-MDI/2,4'-MDI and HDIt are effective adhesion promoters for all rovings tested, which were indicated for use with epoxy resins.

TABLE 3

ILSS for Glass Rovings Prepared with 4,4'-MDI/2,4'-MDI

| Example | Glass Roving | Adhesion promoter | ILSS |
|---|---|---|---|
| 1b | PPG 2002 | 4,4'-MDI/2,4'-MDI | 6760 |
| 2b | PPG 2026 | 4,4'-MDI/2,4'-MDI | 7886 |
| 3b | Ahlstrom R338-2400 | 4,4'-MDI/2,4'-MDI | 6313 |
| 4b | Star ROV®-086 | 4,4'-MDI/2,4'-MDI | 6499 |
| 10a | OCV 366-AG-207 | 4,4'-MDI/2,4'-MDI | 7462 |
| 10b | OCV R25H-X14-2400 | 4,4'-MDI/2,4'-MDI | 6004 |
| 10c | OCV SE1200-207 | 4,4'-MDI/2,4'-MDI | 7776 |
| 10d | OCV SE1500-2400 | 4,4'-MDI/2,4'-MDI | 8071 |
| 10e | OCV SE2350-250 | 4,4'-MDI/2,4'-MDI | 6611 |
| 10f | OCV SE8380-113 | 4,4'-MDI/2,4'-MDI | 2061 |

TABLE 4

ILSS for Glass Rovings Prepared with HDIt

| Example | Glass Roving | Adhesion promoter | ILSS |
|---|---|---|---|
| 1d | PPG 2002 | HDIt | 5461 |
| 2d | PPG 2026 | HDIt | 6714 |
| 3d | Ahlstrom | HBIt | 5129 |

TABLE 4-continued

ILSS for Glass Rovings Prepared with HDIt

| Example | Glass Roving | Adhesion promoter | ILSS |
|---|---|---|---|
| | R338-2400 | | |
| 4d | Star ROV®-086 | HDIt | 4933 |
| 11a | OCV 366-AG-207 | HDIt | 5039 |
| 11b | OCV R25H-X14-2400 | HDIt | 5666 |
| 11c | OCV SE1200-207 | HDIt | 4846 |
| 11d | OCV SE1500-2400 | HDIt | 4894 |
| 11e | OCV SE2350-250 | HDIt | 5360 |
| 11f | OCV SE8380-113 | HDIt | 1711 |

Examples 12(a-g)-15(a-g)

Roving Composites Prepared with HDIt Adhesion Promoter and Various Alcohols

Resin was prepared using the modified DCPD (containing 20-25% tricyclopentadiene), 20 ppm CHIP, 2 phr Ethanox® 4702 antioxidant, 2 phr of HDIt adhesion promoter, and 2 phr of various alcohols. The resin was catalyzed by the addition of C827 (monomer to catalyst ratio 30,000:1) in a suspension of mineral oil. Roving wrap composites based on glass rovings (Examples 12(a-g) PPG2002; Examples 13(a-g) PPG2026; Examples 14(a-g) Ahlstrom R338-2400; Examples 15(a-g) Star ROV®-086) were prepared as described in Example 1. The ILSS of the resulting composites were measured (Table 5).

TABLE 5

ILSS for Roving Composites prepared with HDIt Adhesion promoter and Various Alcohols

| | | ILSS (psi) | | | |
|---|---|---|---|---|---|
| Example | Alcohol | 12 PPG 2002 | 13 PPG2026 | 14 Ahlstrom R338-2400 | 15 Star ROV®-086 |
| a | None | 5461 | 6714 | 5129 | 4933 |
| b | HENB | 7489 | 7525 | 7848 | 7143 |
| c | NBMeOH | 6882 | 7011 | 7244 | 6658 |
| d | Allyl alcohol | 6487 | 4611 | 7344 | 6337 |
| e | DCPD-OH | 2902 | 6715 | 4104 | 2741 |
| f | 2-ethyl hexanol | 1630 | 4616 | 2000 | 1601 |
| g | 1-octanol | 1543 | 3272 | 1663 | 1419 |

Examples 16(a-f)-19(a-f)

Composite Rovings with 1 phr Adhesion Promoter

Resin was prepared using DCPD (containing 20-25% tricyclopentadiene), 20 ppm CHP, 2 phr Ethanox® 4702 antioxidant, 1 phr of the 4,4'-MDI/2,4'-MDI or HDIt adhesion promoter, and 1 phr of optional alcohol compounds. The resin was catalyzed by the addition of C827 (monomer to catalyst ratio 30,000:1) in a suspension of mineral oil. Roving wrap composites based on glass rovings (Examples 16(a-f) PPG2002; Examples 17(a-f) PPG2026; Examples 18(a-f) Ahlstrom R338-2400; Examples 19(a-f) Star ROV®-086) were prepared as described in Example 1. The ILSS of the resulting composites were measured (Table 6). At 1 phr, 4,4'-MDI/2,4'-MDI was an effective adhesion promoter, and the addition of 1 phr HENB or NBMeOH improved the performance of the adhesion promoter. HDIt improved the properties of the composite significantly for PPG 2026 and Ahlstrom R338-2400 and slightly for two rovings (PPG 2002 and Star-ROV-086). The addition of HENB and NBMeOH improved the efficacy of the adhesion promoter (Table 6).

TABLE 6

ILSS for Composite Rovings with 1 phr Adhesion Promoter

| | | | ILSS (psi) | | | |
|---|---|---|---|---|---|---|
| Example | Adhesion Promoter | Alcohol | 16 PPG 2002 | 17 PPG2026 | 18 Ahlstrom R338-2400 | 19 Star ROV®-086 |
| a | 4,4'-MDI/2,4'-MDI | None | 6760 | 6550 | 4912 | 5309 |
| b | 4,4'-MDI/2,4'-MDI | HENB | 7560 | 7065 | 6798 | 7431 |
| c | 4,4'-MDI/2,4'-MDI | NBMeOH | 7368 | 7089 | 6782 | 6857 |
| d | HDIt | None | 2767 | 6378 | 4687 | 2567 |
| e | HDIt | HENB | 6034 | 7030 | 6528 | 5546 |
| f | HDIt | NBMeOH | 5296 | 5585 | 6451 | 4514 |

Examples 20(a-k)-23(a-k)

Composite Rovings with Various Loadings of Adhesion Promoter and HENB

Resin was prepared using the modified DCPD (containing 20-25% tricyclopentadiene), 20 ppm CHP, 2 phr Ethanox® 4702 antioxidant, 0.1, 0.5, or 2 phr of the MDI adhesion promoter (4,4'-MDI/2,4'-MDI), and 0, 0.1, 0.5, 1, or 2 phr of HENB. The resin was catalyzed by the addition of C827 (monomer to catalyst ratio 30,000:1) in a suspension of mineral oil. Roving wrap composites based on glass rovings (Examples 20(a-k) PPG2002; Examples 21(a-k) PPG2026; Examples 22(a-k) Ahlstrom R338-2400; Examples 23(a-k) Star ROV®-086) were prepared using a small-scale variation of a hand layup technique. Glass roving was saturated with catalyzed dicyclopentadiene resin and layered into a ¼"×6" bar mold under moderate tension. The bar mold was compressed to achieve approximately 58% fiber volume at ⅛" thickness, and held with C-clamps during the oven cure process. Roving wrap composites were heated from room temperature to 120° C. at 1° C./min, and held at 120° C. for two hours. The ILSS of the resulting composites were measured (Table 7).

TABLE 7

ILSS for Composite Rovings with Various Adhesion Promoter and HENB Loadings

| Example | phr Adhesion Promoter (4,4'-MDI/2,4'-MDI) | phr HENB | 20 PPG 2002 | 21 PPG2026 | 22 Ahlstrom R338-2400 | 23 Star ROV®-086 |
|---|---|---|---|---|---|---|
| a | 0.1 | 0 | 1331 | 4556 | 1814 | 1370 |
| b | 0.1 | 0.1 | 1585 | 2452 | 3186 | 2232 |
| c | 0.1 | 2.0 | 2616 | 4476 | 4303 | 3245 |
| d | 0.5 | 0 | 3760 | 7086 | 3603 | 3205 |
| e | 0.5 | 0.5 | 5816 | 5523 | 6170 | 5087 |
| f | 0.5 | 2.0 | 6325 | 6755 | 6603 | 5969 |
| g | 2.0 | 0 | 6760 | 7886 | 6313 | 6499 |
| h | 2.0 | 0.1 | 7439 | 7561 | 7790 | 7466 |
| i | 2.0 | 0.5 | 7317 | 6948 | 7684 | 7692 |
| j | 2.0 | 1.0 | 7244 | 7487 | 7704 | 7392 |
| k | 2.0 | 2.0 | 7895 | 8052 | 8330 | 8093 |

Examples 24(a-d)-26(a-d)

VARTM with Adhesion Promoter and Commercial Fabrics

The modified DCPD (containing 20-25% tricyclopentadiene) was formulated with 20 ppm CHP, 2 phr Ethanox®4702 antioxidant, 2 phr 4,4'-MDI/2,4'-MDI, and with and without 2 phr HENB (24(a,b), 25(a,b), 26(a,b)). The resin was catalyzed by the addition of C827 (monomer to catalyst ratio 30,000:1) in a suspension of mineral oil. VARTM samples were prepared using commercial unidirectional fabrics including Vectorply ELR 2410 fabric (made from PPG 2026 roving), fabric based on Ahlstrom R338, and fabric based on OC SE-1500. The composite laminates were cured for 120° C. for 2 hours. The ILSS of the resulting composites were measured (Table 8). The modified DCPD (containing 20-25% tricyclopentadiene) was formulated with 20 ppm CHP, 2 phr Ethanox® 4702 antioxidant, and 2 phr 2-biphenylyl isocyanate (24 (c)) or 2 phr 4-benzylphenyl isocyanate (24 (d)). The resin was catalyzed by the addition of C827 (monomer to catalyst ratio 30,000:1) in a suspension of mineral oil. VARTM samples were prepared using commercial unidirectional fabric Vectorply ELR 2410 fabric (made from PPG 2026 roving). The ILSS of the resulting composites were measured (Table 8). The diisocyanate containing compositions (24(a,b), 25(a,b), 26(a,b)) showed superior adhesion, while the compositions containing the monoisocyanates (24c, 24d) demonstrated poor adhesion.

TABLE 8

ILSS for VARTM with Adhesion Promoter and Commercial Fabrics

| | | ILSS (psi) | | |
|---|---|---|---|---|
| Example | Adhesion promoter | 24 PPG 2026 Fabric | 25 Ahlsrom R338 Fabric | 26 OC SE 1500 Fabric |
| a | 4,4'-MDI/2,4'-MDI | 8452 | 8468 | 8538 |
| b | 4,4'-MDI/2,4'-MDI and HENB | 8512 | 8429 | 8819 |
| c | 2-biphenylyl isocyanate | 3494 | not tested | not tested |
| d | 4-benzylphenyl isocyanate | 3806 | not tested | not tested |

Example 27(a-c)

Unidirectional Composite Wraps with Carbon Fiber

Resin was prepared using the modified DCPD (containing 20-25% tricyclopentadiene), 20 ppm CHP, and 2 phr Ethanox® 4702 antioxidant. Samples with no adhesion promoter (a), 2 phr 4,4'-MDI/2,4'-MDI (b), and 2 phr 4,4'-MDI/2,4'-MDI and 2 phr HENB (c) were prepared. The resin was catalyzed by the addition of C827 (monomer to catalyst ratio 30,000:1) in a suspension of mineral oil. Carbon-fiber tow composites based on Toho Tenax® HTR40 were prepared as described in Example 1. The ILSS of the resulting composites were measured (Table 9). The isocyanate adhesion promoter is effective for carbon rovings.

TABLE 9

ILSS for Carbon Roving Composites

| Example | Adhesion promoter | ILSS (psi) |
|---|---|---|
| a | None | 1844 |
| b | 4,4'-MDI/2,4'-MDI | 5399 |

TABLE 9-continued

ILSS for Carbon Roving Composites

| Example | Adhesion promoter | ILSS (psi) |
|---|---|---|
| c | 4,4'-MDI/2,4'-MDI and HENB | 7907 |

Example 28(a-e)

VARTM with Adhesion Promoter and a Range of Catalysts

The modified DCPD (containing 20-25% tricyclopentadiene) was formulated with 2 phr 4702 Ethanox®, 2 phr 4,4'-MDI/2,4'-MDI, and with the inhibitor described in Table 10. The resin was catalyzed by the addition of the catalyst listed in Table 10 (monomer to catalyst ratio between 5,000:1 and 45,000:1 as listed in Table 10) in a suspension of mineral oil. VARTM samples were prepared using commercial fabric Vectorply ELR 2410 (made from PPG 2026 roving). The ILSS of the resulting composites were measured (Table 10). For a range of catalysts, the adhesion promoter improves the physical properties of the composites when compared to Example 2(a).

TABLE 10

ILSS for VARTM with MDI and Various Catalysts

| Example | Catalyst | Monomer to Catalyst Ratio | Inhibitor | ILSS (psi) |
|---|---|---|---|---|
| a | C771 | 30,000:1 | none | 8755 |
| b | C801 | 5,000:1 | TPP (0.1 phr) | 7104 |
| c | C871 | 45,000:1 | none | 8168 |
| d | C601 | 5,000:1 | none | 4715 |
| e | C827 | 30,000:1 | CHP (20 ppm) | 8452 |

Example 29 (a-h)

VARTM with Adhesion Promoter and Carbon Fabric

Resin was prepared using the modified DCPD (containing 20-25% tricyclopentadiene), 20 ppm CHP, and 2 phr Ethanox® 4702 antioxidant. Samples with varying isocyanate adhesion promoter compositions were prepared. The resin was catalyzed by the addition of C827 (monomer to catalyst ratio 30,000:1) in a suspension of mineral oil. VARTM samples were prepared using Zoltek UD500 carbon fabric. The ILSS of the resulting composites were measured (Table 11).

TABLE 11

ILSS for Zoltek UD500 Carbon Fabric Composites

| Example | Adhesion promoter | HENB | ILSS (psi) |
|---|---|---|---|
| a | None | None | 1634 |
| b | 2 phr 4,4'-MDI/2,4'-MDI | None | 4945 |
| c | 4 phr 4,4'-MDI/2,4'-MDI | None | 5615 |
| d | None | 2 phr | 1563 |
| e | 2 phr 4,4'-MDI/2,4'-MDI | 2 phr | 8664 |
| f | 4 phr 4,4'-MDI/2,4'-MDI | 2 phr | 8807 |

TABLE 11-continued

ILSS for Zoltek UD500 Carbon Fabric Composites

| Example | Adhesion promoter | HENB | ILSS (psi) |
|---|---|---|---|
| g | 2 phr HDIt | None | 4639 |
| h | 2 phr HDIt | 2 phr | 7156 |

Examples 30(a-f)-32(a-f)

Roving Composites Prepared with 4,4'-MDI/2,4'-MDI Adhesion Promoter and Various Alcohols Resin was prepared using the modified DCPD (containing 20-25% tricyclopentadiene), 20 ppm CHP, 2 phr Ethanox® 4702 antioxidant, 2 phr of 4,4'-MDI/2,4'-MDI adhesion promoter, and 2 phr of various alcohols. The resin was catalyzed by the addition of C827 (monomer to catalyst ratio 30,000:1) in a suspension of mineral oil. Roving wrap composites based on glass rovings (Examples 30(a-f) PPG2002; Examples 31(a-f) PPG2026; Examples 32(a-f) Star ROV®-086) were prepared as described in Example 1. The ILSS of the resulting composites were measured (Table 12).

TABLE 12

ILSS for Roving Composites prepared with 4,4'-MDI/2,4'-MDI Adhesion promoter and Various Alcohols

| | | ILSS (psi) | | |
|---|---|---|---|---|
| Example | Alcohol | 30 PPG 2002 | 31 PPG2026 | 32 Star ROV®-086 |
| a | None | 6760 | 7886 | 6499 |
| b | HENB | 7093 | 7392 | 7460 |
| c | NBMeOH | 5804 | 5603 | 6280 |
| d | Allyl alcohol | 2407 | 2270 | 2454 |
| e | DCPD-OH | 2736 | 4367 | 2698 |
| f | 1-octanol | 1966 | 2244 | 1461 |

Example 33

Effect of Cumene Hydroperoxide on the Onset of the Gel State

A plastic 250 mL beaker was charged with 100 g of dicyclopentadiene base resin (containing 20-25% tricyclopentadiene) and 0-100 ppm cumene hydroperoxide (CHP) was added as a 1000 ppm concentration stock solution in resin. The beaker was placed in an oil bath, and a temperature probe was placed in the reaction vessel. Once the sample was equilibrated to the test temperature (30° C.) the metathesis catalyst was added. Polymerizations 33a-33h were catalyzed by the addition of 9.6 mg of catalyst C827 dissolved in a mixture of 1 g of toluene and 2 g of mineral oil (monomer to catalyst ratio 60,000:1). Polymerizations 33i-33m were catalyzed by the addition 19.2 mg of catalyst C827 suspended in 2 g of mineral oil (monomer to catalyst ratio 30,000:1). The temperatures of the reaction mixtures were monitored over the course of the polymerizations. The exotherm time is related to the onset of polymerization. Peak exotherm temperature is related to the completeness of the polymerization reaction. Lowered peak temperatures are an indication of incomplete polymerization. The exotherm times and peak temperatures for the unmodified and modified polymerizations can be seen in Table 13. Increasing concentrations of CHP in the resin resulted in increased time to reach polymerization exotherm, with no significant drop in exotherm peak temperature. At both catalyst concentrations, addition of CHP effectively modifies the onset of polymerization, and the delay time can be controlled over several hours by controlling the amount of CHP added. FIG. 1 shows the temperature profiles of examples 33a-33c with 0, 2.5, and 5 ppm CHP. The gel-modification of the invention is particularly useful, because it increases the workable pot life of the catalyzed resin without otherwise necessarily changing the overall temperature profile of the polymerization.

TABLE 13

Gel Modification by Cumene Hydroperoxide (CHP)

| Example | CHP concentration (ppm) | CHP:catalyst molar ratio | Exotherm Time (min) | Exotherm Peak Temperature (° C.) |
|---|---|---|---|---|
| 33a | 0 | 0.00 | 11.4 | 183 |
| 33b | 2.5 | 0.14 | 28.6 | 182 |
| 33c | 5 | 0.28 | 43.3 | 180 |
| 33d | 10 | 0.57 | 67.0 | 179 |
| 33e | 25 | 1.42 | 121.9 | 184 |
| 33f | 50 | 2.84 | 167.4 | 184 |
| 33g | 75 | 4.26 | 179.2 | 182 |
| 33h | 100 | 5.68 | 209.0 | 180 |
| 33i | 0 | 0.00 | 8.5 | 199 |
| 33j | 10 | 0.26 | 37.1 | 197 |
| 33k | 20 | 0.52 | 67.1 | 196 |
| 33l | 40 | 1.04 | 110.3 | 192 |
| 33m | 50 | 1.30 | 137.7 | 191 |

33a-33h: monomer/C827 = 60,000:1
33i-33m: monomer/C827 = 30,000:1

Example 34

Effect of Cumene Hydroperoxide (CHP) on DCPD Polymerization Viscosity Profile

Dicyclopentadiene base resin (containing 20-25% tricyclopentadiene) was filtered through activated alumina and silica gel to remove any contaminants. A plastic 500 mL beaker was charged with 400 g of the filtered resin as a control. Additional plastic 500 mL beakers were charged with 400 g of the filtered resin and 4, 25, or 100 ppm cumene hydroperoxide (CHP) was added as a 1000 ppm concentration stock solution in resin. Each resin sample was equilibrated at 23-25° C., and catalyzed by addition of 9.6 mg of C827 suspended in 2 g of mineral oil. Viscosity profiles are shown in FIG. 2, in which the cure profile of the filtered control sample is shown along with the cure profiles of CUP-modified resin compositions having CHP concentrations of 4, 25 and 100 ppm. The reaction modification of the invention is particularly useful because it increases the workable pot life of the catalyzed resin and allows for low viscosity characteristics to be retained for a longer period of time.

Example 35

Mechanical Properties of Unmodified and Modified polyDCPD Plaques

To evaluate mechanical properties of polydicyclopentadiene (polyDCPD) formulations, 200 g of dicyclopentadiene base resin (containing 20-25% tricyclopentadiene) was formulated with 2 PHR Ethanox® 4702 antioxidant and 0-100 ppm cumene hydroperoxide, equilibrated to 30° C. and catalyzed by the addition of 19.2 mg of C827 suspended in 2 g of mineral oil. After mixing, the catalyzed resin was poured into a 10×10×0.5" glass and aluminum mold and placed in a 40° C. oven until exotherm (Example 35a-d). After cure, the polyDCPD panels were cut into samples for measurement of Heat Deflection Temperature (HDT, ASTM D648), Izod Pendulum Impact Resistance (ASTM D526), and Flexural properties (ASTM D790). As shown in Table 14, there is no significant deviation in panel mechanical properties over a range of hydroperoxide-to-catalyst ratios.

TABLE 14

Effect of hydroperoxide gel modification on polyDCPD mechanical properties

| Example | CHP concentration (ppm) | CHP moles | CHP:catalyst molar ratio | HDT ° C. | Izod (ft-lb/in) | Flex. Peak (ksi) | Flex. Mod. (ksi) |
|---|---|---|---|---|---|---|---|
| 35a | 0 | 0.00E+00 | 0.00 | 138.0 | 1.1 | 13.0 | 304 |
| 35b | 20 | 2.63E−05 | 1.04 | 140.7 | 1.1 | 12.9 | 307 |
| 35c | 50 | 6.57E−05 | 2.61 | 140.0 | 1.0 | 13.0 | 306 |
| 35d | 100 | 1.31E−04 | 5.21 | 142.1 | 1.2 | 12.7 | 302 |

Example 36

Storage Stability of Phosphine Gel Modifier

A stock resin formulation was prepared by mixing dicyclopentadiene base resin (containing 20-25% tricyclopentadiene) with 2 PHR Ethanox® 4702 antioxidant and 0.5 PHR of a 0.15 wt % solution of TNBP in dicyclopentadiene as the gel modifier. An exotherm trial was conducted on a 100 g aliquot of this resin equilibrated to 40° C. according to the procedure outlined in Example 33, using C771 as the olefin metathesis catalyst (monomer to catalyst ratio 15,000:1) dissolved in a mixture of 1 g of toluene and 2 g of mineral oil (Example 36a). The remainder of the stock formulation was sparged with nitrogen, sealed, and stored at room temperature. Further exotherm trials were conducted according to the procedure of Example 36a on 100 g aliquots at 4-hour, 8-hour, and 24-hour intervals (Examples 36b-36d). The effectiveness of the phosphine at delaying the onset of polymerization dropped sharply over these time intervals, with near-total loss of pot life extension within 24 hours. (Table 15).

Example 37

Storage Stability of Cumene Hydroperoxide Gel Modifier

A stock resin formulation was prepared by mixing dicyclopentadiene base resin (containing 20-25% tricyclopentadiene) with 2 PHR Ethanox® 4702 antioxidant and 23 ppm of cumene hydroperoxide in dicyclopentadiene as the reaction gel-modifier. An exotherm trial was conducted on a 100 g aliquot of this resin equilibrated to 30° C. according to the procedure outlined in Example 33, using 19.2 mg of C827 as the olefin metathesis catalyst (monomer to catalyst ratio 30,000:1) suspended in 2 g of mineral oil (Example 37a). The remainder of the stock formulation was sparged with nitrogen, sealed, and stored at room temperature. Further exotherm trials were conducted according to the procedure outlined in Example 37a on 100 g aliquots at 15-day (360 hour), 35-day (840 hour), and 90-day (2,160 hour) intervals (Table 15). Unlike the standard phosphine gel modified resin (Example 36), the ability of cumene hydroperoxide to delay the onset of polymerization remains stable. The cumene hydroperoxide modified resin retained 84% of the delayed exotherm time effect after 90 days, with no significant change in peak exotherm temperature.

TABLE 15

Storage stability of phosphine and hydroperoxide gel modifiers

| Example | Gel Modifier | Time aged (hours) | Exotherm Time (min) | Exotherm Peak Temperature (° C.) |
|---|---|---|---|---|
| 36a* | TNBP | 0 | 50.4 | 203 |
| 36b | TNBP | 4 | 40.0 | 203 |
| 36c | TNBP | 8 | 32.7 | 203 |
| 36d | TNBP | 24 | 14.8 | 203 |
| 37a | CHP | 0 | 68.5 | 191 |
| 37b | CHP | 360 | 64.8 | 193 |
| 37c | CHP | 840 | 61.4 | 190 |
| 37d | CHP | 2,160 | 57.7 | 195 |

*unmodified exotherm time for this resin was 10.9 minutes
Examples 36a-36b: C771; monomer to catalyst ratio = 15,000:1; 40° C.
Examples 37a-37d: C827; monomer to catalyst ratio = 30,000:1; 30° C.

Example 38

Gel Modification by Other Hydroperoxides (TBHP)

An exotherm trial was conducted according to the procedure outlined in Example 33, using 40° C. as the oil bath and resin temperature. The resin was formulated with 0-21 ppm of tert-butyl hydroperoxide (TBHP), and the reaction polymerization was catalyzed by the addition of 9.6 mg of C827 dissolved in a mixture of 1 g of toluene and 2 g of mineral oil (Examples 38a-38e). The exotherm time and exotherm peak temperature can be seen in Table 16. Addition of increasing amounts of TBHP resulted in increasing times to reach polymerization exotherm and no significant drop in exotherm peak temperature.

TABLE 16

Gel modification by tert-Butyl Hydroperoxide

| Example | TBHP concentration (ppm) | TBHP:catalyst molar ratio | Exotherm Time (min) | Exotherm Peak Temperature (° C.) |
|---|---|---|---|---|
| 38a | 0 | 0.00 | 11.1 | 192 |
| 38b | 3 | 0.28 | 21.8 | 190 |
| 38c | 6.2 | 0.54 | 28.8 | 189 |
| 38d | 10.5 | 0.93 | 35.5 | 188 |
| 38e | 21.0 | 1.85 | 58.3 | 187 |

Example 39

CHP Gel Modification of Resins with $1^{st}$ Gen Catalysts

An exotherm trial was conducted according to the procedure outlined in Example 33, using 0-100 ppm cumene hydroperoxide and resin equilibrated to 30° C. The reaction polymerization was catalyzed by the addition of first generation ruthenium metathesis catalyst C801 dissolved in a mixture of 1 g of toluene and 2 g of mineral oil (monomer to catalyst ratio 5,000:1) (Examples 39a-39d). The exotherm times and exotherm peak temperatures can be seen in Table 17. Addition of increasing amounts of CHP resulted in increasing times to reach polymerization exotherm and no significant drop in exotherm peak temperature.

Example 40

CHP Gel Modification of Resin Formulated with $2^{nd}$ Gen Catalyst

An exotherm trial was conducted according to the procedure outlined in Example 33, using 0-50 ppm cumene hydroperoxide and resin equilibrated to 60° C. The reaction polymerization was catalyzed by the addition of $2^{nd}$ generation metathesis catalyst C771 dissolved in a mixture of 1 g of toluene and 2 g of mineral oil (monomer to catalyst ratio 60,000:1) (Examples 40a-40d). The exotherm times and exotherm peak temperatures can be seen in Table 17. Addition of increasing amounts of CHP resulted in increasing times to reach polymerization exotherm and no significant drop in exotherm peak temperature.

TABLE 17

Gel modification by CHP using 1st and 2nd generation ruthenium catalysts

| Example | catalyst | CHP concentration (ppm) | CHP:catalyst molar ratio | Exotherm Time (min) | Exotherm Peak Temperature (° C.) |
|---|---|---|---|---|---|
| 39a | c801 | 0 | 0.000 | 1.9 | 190 |
| 39b | c801 | 20 | 0.109 | 2.7 | 192 |
| 39c | c801 | 50 | 0.274 | 3.5 | 194 |
| 39d | c801 | 100 | 0.544 | 5.2 | 196 |
| 40a | c771 | 0 | 0.00. | 17.5 | 199 |
| 40b | c771 | 10 | 0.680 | 35.0 | 197 |
| 40c | c771 | 20 | 1.303 | 36.9 | 198 |
| 40d | c771 | 50 | 3.285 | 44.6 | 200 |

39a-39d: 30° C., C801, monomer to catalyst ratio = 5,000:1
40a-40d: 60° C., C771, monomer to catalyst ratio = 60,000:1

Example 41

Hydroperoxide Gel Modification at Higher Loadings

Exotherm trials were conducted according to the procedure outlined in Example 33 using 0-5,000 ppm of CHP. The resin was equilibrated to 60° C. to speed the rate of polymerization. The reaction polymerization was catalyzed by the addition of 9.6 mg of metathesis catalyst C827 dissolved in a mixture of 1 g of toluene and 2 g of mineral oil (Examples 41a-d). The exotherm times and exotherm peak temperatures can be seen in Table 18. Comparison of exotherm times and exotherm peak temperatures show increasing time required to reach polymerization exotherm, demonstrating that the onset of polymerization may be effectively delayed with high CHP:catalyst ratios if reaction conditions require. However, as hydroperoxide concentrations reach high levels, overall exotherm peak temperatures do start to decline (Example 41c), demonstrating some negative impact of high levels of cumene hydroperoxide on polymerization completeness. Once the loading of hydroperoxide becomes too high for a given set of polymerization conditions, the polymerization will fail to exotherm (Example 41d). The upper concentration limit for effective use of hydroperoxide compounds as gel modification agents will vary, depending on metathesis catalyst, olefin resin, and reaction conditions. However, as shown by Examples 33b-33g and Examples 41b-41d, there is a wide range of hydroperoxide:catalyst molar ratios that give useful modification of the onset of polymerization. The time to reach the gel and cure states can be controlled over a wide range for a given polymerization.

TABLE 18

Gel modification using CHP at higher concentrations

| Example | CHP concentration (ppm) | CHP:catalyst molar ratio | Exotherm Time (min) | Exotherm Peak Temperature (° C.) |
|---|---|---|---|---|
| 41a | 0 | 0.00 | 1.0 | 204 |
| 41b | 1,000 | 64.35 | 22.9 | 191 |
| 41c | 2,000 | 128.70 | 30.6 | 161 |
| 41d | 5,000 | 321.74 | failed to cure after 120 minutes | |

Example 42

Effect of Benzoyl Peroxide—Diacyl Peroxides are not Gel Modifiers

Exotherm trials were conducted according to the procedure outlined in Example 33 using 0-2000 ppm of benzoyl peroxide and resin equilibrated at 40° C. The reaction polymerization was catalyzed by the addition of metathesis catalyst C827 dissolved in a mixture of 1 g of toluene and 2 g of mineral oil (monomer to catalyst ratio 60,000:1) (Examples 42a-42f). The exotherm times and exotherm peak temperatures can be seen in Table 19. Increasing amounts of benzoyl peroxide resulted in no significant delay of the onset of the polymerization (exotherm time) until relatively large ratios of peroxide:catalyst. At such extremely high concentrations of benzoyl peroxide, the exotherm peak temperature dropped dramatically. This indicates that the di-acyl peroxide functional group is not an effective gel modifier compared to the hydroperoxide functional group.

Example 43

Effect of mCPBA—Peroxycarboxylic Acids are not Gel Modifiers

Exotherm trials were conducted according to the procedure outlined in Example 42, with the addition 20-2,000 ppm of mCPBA (3-chloroperoxybenzoic acid) to the resin formulation prior to addition of catalyst (Examples 43a-43d). No significant delay of the exotherm was noted at any concentration of mCPBA (Table 19). The exotherm time accelerated somewhat, and the exotherm peak temperature dropped dramatically. This indicates that the peroxycarboxylic acid functional group does not act to moderate the onset of polymerization as the hydroperoxide functional group does.

Example 44

Effect of Di-Tert-Butyl Peroxide—Dialkyl Peroxides are not Gel Modifiers

An exotherm trial was conducted according to the procedure outlined in Example 42, with the addition of 10,000 ppm di-tert-butyl peroxide. Only a very minor modification of the exotherm is observed, even at this high peroxide:catalyst ratio (Table 19). This indicates that dialkyl peroxide functional group does not act in the same gel modifying fashion as the hydroperoxide functional group.

TABLE 19

Gel modification using other types of peroxides

| Example | Modifier | modifier concentration (ppm) | modifier:catalyst molar ratio | Exotherm Time (min) | Exotherm Peak Temperature (° C.) |
|---|---|---|---|---|---|
| 42a | benzoyl peroxide | 0 | 0.00 | 11.1 | 192 |
| 42b | benzoyl peroxide | 2 | 0.09 | 11.5 | 191 |
| 42c | benzoyl peroxide | 11.6 | 0.41 | 10.2 | 191 |
| 42d | benzoyl peroxide | 24 | 0.85 | 11.5 | 188 |
| 42e | benzoyl peroxide | 1,000 | 35.59 | 18.3 | 146 |
| 42f | benzoyl peroxide | 2,000 | 71.18 | 29.2 | 128 |
| 43a | mCPBA | 20 | 1.00 | 10.8 | 190 |
| 43b | mCPBA | 100 | 5.00 | 8.9 | 184 |
| 43c | mCPBA | 1,000 | 49.95 | 4.7 | 168 |
| 43d | mCPBA | 2,000 | 99.91 | 4.1 | 163 |
| 44 | di-tert-butyl peroxide | 10,000 | 589.53 | 14.8 | 201 |

Examples 45(a-c) and 46(a-c)

Resin was prepared using the modified DCPD (containing 20-25% tricyclopentadiene), 20 ppm CHP, 2 phr Ethanox® 4702 antioxidant and either no adhesion promoter and no alcohol compound (Examples 45a, 46a), or 2 phr diisocyanate adhesion promoter (4,4'-MDI/2,4'-MDI) (Examples 45b, 46b) or 2 phr diisocyanate adhesion promoter (4,4'-MDI/2,4'-MDI) and 2 phr alcohol compound (HENB) (Examples 45c, 46c). The resin in Examples 45a and 46a was catalyzed by the addition of C827 (monomer to catalyst ratio 60,000:1) in a suspension of mineral oil. The resin in Examples 45b, 46b, 45c, and 46c was catalyzed by the addition of C827 (monomer to catalyst ratio 30,000:1) in a suspension of mineral oil. VARTM samples were prepared using the following glass fabrics (Hexcel 7781-F12; heat cleaned, no silane coupling agents); (BGF 7781-497A; amino- and methacrylate-silane coupling agents only). The ILSS of the resulting composites were measured (Table 20). The heat cleaned glass fabric with no silane coupling agent (Hexcel 7781-F12) showed (i) poor adhesion without adhesion promoter and alcohol (Example 45a); (ii) moderate adhesion with adhesion promoter alone (Example 45b); and (iii) moderate adhesion with adhesion promoter and alcohol (Example 45c). The multicompatible glass with amino- and methacrylate-silane coupling agent only (BGF 7781-497A) showed (i) moderate adhesion without adhesion promoter and alcohol (Example 46a); (ii) moderate adhesion with adhesion promoter alone (Example 46b); and (iii) superior adhesion with adhesion promoter and alcohol (Example 46c). Commercially available glass fabric and/or fiber with a complete sizing composition (e.g. film formers, lubricants, silane coupling agents, etc.) showed poor adhesion without adhesion promoter and alcohol (Table 1. Examples 1a-4a), showed superior adhesion with adhesion promoter alone (Table 1. Examples 1b-4b & Table 8. Examples 24a-26a) and superior adhesion with adhesion promoter and alcohol (Table 2. Examples 5a-8a & Table 8. Examples 24b-26b).

TABLE 20

ILSS for VARTM with Adhesion Promoter and Fabrics Having Various Sizing

| | | | ILSS (psi) | |
|---|---|---|---|---|
| Example | Adhesion Promoter | Alcohol | 45 Hexcel 7781-F12 | 46 BGF 7781-497A |
| a | None | None | 2178 | 3342 |
| b | 2 phr 4,4'-MDI/2,4'-MDI | None | 3094 | 4059 |
| c | 2 phr 4,4'-MDI/2,4'-MDI | 2 phr HENB | 5122 | 7465 |

Examples 47(a-e) and 48(a-e)

Resin was prepared using 150 grams of dicyclopentadiene (containing 20-25% tricyclopentadiene) and 2 phr Ethanox® 4702 and either 20,000 ppm di-tert-butyl peroxide (Examples 47a, 48a), or 20,000 ppm cumene hydroperoxide (Examples 47b, 48b), or 2000 ppm di-tert-butyl peroxide (Examples 47c, 48c), or 2000 ppm cumene hydroperoxide (Examples 47d, 48d), or no peroxide (Examples 47e, 48e). The prepared resin was equilibrated to 30° C. and combined with C827 catalyst (monomer to catalyst ratio 30,000:1) in a suspension of mineral oil. After mixing, the combined resin was poured into a 5"×7"×¼" aluminum mold placed in a 30° C. oven. Before exotherm, the uncured polymer was removed from the mold and then post-cured for 2 hours at either 180° C. or 200° C. Examples 47b and 48b, containing 20,000 ppm cumene hydroperoxide did not polymerize after 18 hours at 30° C.; therefore, no polymer samples were available for measuring glass transition temperature (Tg). Glass transition temperature (Tg) was measured by thermal mechanical analysis (TMA) according to ISO 11359-2 on ¼"×¼"×¼" samples. Cumene hydroperoxide (CHP) (80% purity) was used as received from Sigma Aldrich. Di-tert-butyl peroxide (98% purity) was used as received from Sigma Aldrich.

The data in Table 21 shows (i) that alkyl hydroperoxides, such as CHP, are gel modifiers and dialkyl peroxides, such as di-tert-butyl peroxide, are not gel modifiers; and (ii) dialkyl peroxides, such as di-tert-butyl peroxide, increase polymer cross-linking leading to higher Tg and alkyl hydroperoxides, such as CHP, do not increase polymer cross-linking.

TABLE 21

Effect of peroxides on gel time and polymer cross-linking

| Example | Post Cure Temperature | Peroxide | Peroxide Concentration (ppm) | Peroxide:Catalyst Molar ratio | Tg (° C.) | Gel Time (min) |
|---|---|---|---|---|---|---|
| 47a | 180° C. | di-tert-butyl peroxide | 20,000 | 590.78 | 148 | 5.7 |
| 47b | 180° C. | CHP | 20,000 | 567.72 | NR | NR |
| 47c | 180° C. | di-tert-butyl peroxide | 2000 | 59.08 | 152 | 4.6 |
| 47d | 180° C. | CHP | 2000 | 56.77 | 133 | 225.7 |
| 47e | 180° C. | None | None | None | 131 | 4.3 |
| 48a | 200° C. | di-tert-butyl peroxide | 20,000 | 590.78 | 161 | 5.7 |
| 48b | 200° C. | CHP | 20,000 | 567.72 | NR | NR |
| 48c | 200° C. | di-tert-butyl peroxide | 2000 | 59.08 | 155 | 4.6 |
| 48d | 200° C. | CHP | 2000 | 56.77 | 145 | 225.7 |
| 48e | 200° C. | None | None | None | 156 | 4.3 |

NR = no reaction

It is to be understood that while the invention has been described in conjunction with specific embodiments thereof, that the description above as well as the examples that follow are intended to illustrate and not limit the scope of the invention. Other aspects, advantages, and modifications within the scope of the invention will be apparent to those skilled in the art to which the invention pertains.

The claimed invention is:

1. A method for improving the adhesion of a resin composition to a substrate material, comprising:
   combining at least one adhesion promoter, at least one cyclic olefin, and at least one olefin metathesis catalyst to form the resin composition;
   contacting the resin composition with the substrate material; and
   subjecting the resin composition to conditions effective to promote an olefin metathesis reaction of the at least one cyclic olefin,
   wherein the at least one adhesion promoter comprises at least one compound containing at least two isocyanate groups and a compound containing a heteroatom-containing functional group and a metathesis-active olefin,
   wherein the at least one compound containing at least two isocyanate groups is selected from the group consisting of methylene diphenyl diisocyanate (MDI) including any mixture of its three isomers 2,2'-MDI, 2,4'-MDI and 4,4'-MDI; liquid MDI; solid MDI; hexamethylene diisocyanate trimer; isophorone diisocyanate, 4,4'methylene bis(cyclohexyl isocyanate); polymeric MDI; MDI prepolymer; and liquid carbodiimide modified 4,4'-MDI; tetramethylxylene diisocyanate; and isomers of isocyanato-[(isocyanatocyclohexyl)methyl] cyclohexane; and
   wherein the compound containing a heteroatom-containing functional group and a metathesis-active olefin is selected from the group consisting of 5-norbornene-2-methanol (NB-MeOH); 2-hydroxyethyl bicyclo[2.2.1]hept-2-ene-5-carboxylate (HENB); and allyl alcohol.

2. The method of claim 1,
   wherein the compound containing a heteroatom-containing functional group and a metathesis-active olefin is selected from the group consisting of 2-hydroxyethyl bicyclo[2.2.1]hept-2-ene-5-carboxylate (HENB) and allyl alcohol.

3. The method of claim 1, wherein the substrate material is selected from the group consisting of reinforcing materials, glass fibers, glass fabrics, carbon fibers, carbon fabrics, aramid fibers, aramid fabrics, polyolefin fibers, polyolefin fabrics, polymer fibers, polymer fabrics, metallic density modulators, microparticulate density modulators, macroparticulate density modulators, and mixtures thereof.

4. The method according to claim 1, wherein the resin composition further comprises at least one crosslinker.

5. The method according to claim 4, wherein the at least one crosslinker is selected from the group consisting of dialkyl peroxides, diacyl peroxides, peroxyacids, and mixtures thereof.

6. The method of claim 1, wherein the concentration of the adhesion promoter is 0.5 to 4.0 phr, based on the weight of adhesion promoter per hundred grams of base resin.

7. The method of claim 1, wherein the resin composition is subjected to a temperature of −78° C. to 150° C. to promote an olefin metathesis reaction of the at least one cyclic olefin.

8. The method of claim 1, wherein the at least one cyclic olefin is selected from the group consisting of strained cyclic olefins, unstrained cyclic olefins, dienes, unsaturated polymers, and mixtures thereof, wherein the cyclic olefin may contain a functional group, or be substituted with a group, selected from halogen, hydroxyl, hydrocarbyl, alkoxy, alkenyloxy, alkynyloxy, aryloxy, aralkyloxy, alkaryloxy, acyl, acyloxy, alkoxycarbonyl, alkylcarbonato, arylcarbonato, carboxy, carboxylato, carbamoyl, alkyl-substituted carbamoyl, haloalkyl-substituted carbamoyl, aryl-substituted carbamoyl, thiocarbamoyl alkyl-substituted thiocarbamoyl, aryl-substituted thiocarbamoyl, carbamido, cyano, cyanato, thiocyanato, formyl, thioformyl, amino, alkyl-substituted amino, aryl-substituted amino, alkylamido, arylamido, imino, alkylimino, arylimino, nitro, nitroso, sulfo, sulfonato, alkylsulfanyl, arylsulfanyl, alkylsulfinyl, arylsulfinyl, alkylsulfonyl, alkylaminosulfonyl, arylsulfonyl, boryl, borono, boronato, phosphono, phosphonato, phosphinato, phospho, phosphino, and mixtures thereof.

9. The method of claim 1, wherein the at least one cyclic olefin is selected from the group consisting of cyclobutene, cycloheptene, cyclooctene, cyclononene, cyclodecene, cyclooctadiene, cyclononadiene, cyclododecatriene, tetracyclododecadiene, substituted norbornenes, substituted dicyclopentadienes, dicyclopentadiene, tricyclopentadiene, dicyclohexadiene, norbornene, 5-methyl-2-norbornene, 5-ethyl-2-norbornene, 5-isobutyl-2-norbornene, 5,6-dimethyl-2-norbornene, 5-phenylnorbornene, 5-benzylnorbornene, 5-acetylnorbornene, 5-methoxycarbonylnorbornene, 5-ethoxycarbony-1-norbornene, 5-methyl-5-methoxy-carbonylnorbornene, 5-cyanonorbornene, 5,5,6-trimethyl-2-norbornene, cyclo-hexenylnorbornene, endo, exo-5,6-dimethoxynorbornene, endo, endo-5,6-dimethoxynorbornene, endo,exo-5,6-dimethoxycarbonylnorbornene, endo, endo-5,6-dimethoxycarbonylnorbornene, 2,3-dimethoxynorbornene, norbornadiene, tricycloundecene, tetracyclododecene, 8-methyltetracyclododecene, 8-ethyl-tetracyclododecene, 8-methoxycarbonyltetracyclododecene, 8-methyl-8-tetracyclo-dodecene, 8-cyanotetracyclododecene, pentacyclopentadecene, or pentacyclohexadecene, 5-butyl-2-norbornene, 5-hexyl-2-norbornene, 5-octyl-2-norbornene, 5-decyl-2-norbornene, 5-dodecyl-2-norbornene, 5-vinyl-2-norbornene, 5-ethylidene-2-norbornene, 5-isopropenyl-2-norbornene, 5-propenyl-2-norbornene, and 5-butenyl-2-norbornene.

10. The method of claim 1, wherein the at least one olefin metathesis catalyst is a Group 8 transition metal complex having the structure of formula (I)

$$X^1 \underset{X^2}{\overset{L^1}{\underset{|}{\overset{(L^3)_n}{|}}}} M=(C)_m=C \underset{R^2}{\overset{R^1}{\diagup}} \quad (I)$$

$$(L^2)_k$$

wherein:
M is a Group 8 transition metal;
$L^1$, $L^2$, and $L^3$ are independently selected from neutral electron donor ligands;
n is 0 or 1, such that $L^3$ may or may not be present;
m is 0, 1, or 2;
k is 0 or 1;
$X^1$ and $X^2$ are independently anionic ligands; and
$R^1$ and $R^2$ are independently selected from the group consisting of hydrogen, hydrocarbyl, substituted hydrocarbyl, heteroatom-containing hydrocarbyl, substituted heteroatom-containing hydrocarbyl, and functional groups; wherein one or both of $R^1$ and $R^2$ may have the structure $-(W)_n-U^+V^-$, in which W is selected from the group consisting of hydrocarbylene, substituted hydrocarbylene, heteroatom-containing hydrocarbylene, and substituted heteroatom-containing hydrocarbylene; U is a positively charged Group 15 or Group 16 element substituted with hydrogen, hydrocarbyl, substituted hydrocarbyl, heteroatom-containing hydrocarbyl, or substituted heteroatom-containing hydrocarbyl; V is a negatively charged counterion; and n is zero or 1,
wherein any two or more of $X^1$, $X^2$, $L^1$, $L^2$, $L^3$, $R^1$, and $R^2$ can be taken together to form one or more cyclic groups, and further wherein any one or more of $X^1$, $X^2$, $L^1$, $L^2$, $L^3$, $R^1$, and $R^2$ may be attached to a support.

11. The method of claim 10, wherein at least one of $L^1$, $L^2$, and $L^3$ is an N-heterocyclic carbene ligand.

12. The method of claim 1, wherein the at least one olefin metathesis catalyst has the structure $$R^3-(Q^1)_x-X\overset{[(Q^3)_w-R^{3A}]_p}{\underset{X^2}{\overset{|}{\underset{|}{\overset{(L^3)_n}{|}}}}} \overset{[(Q^4)_z-R^{4A}]_q}{\underset{R^2}{\overset{|}{\diagup}}} -(Q^2)_y-R^4$$

wherein:
M is a Group 8 transition metal;
n is 0 or 1;
m is 0, 1, or 2;
k is 0 or 1;
$X^1$ and $X^2$ are independently selected from anionic ligands;
$L^2$ and $L^3$ are independently selected from neutral electron donor ligands, or may be taken together to form a single bidentate electron-donating heterocyclic ligand;
$R^1$ and $R^2$ are independently selected from the group consisting of hydrogen, hydrocarbyl, substituted hydrocarbyl, heteroatom-containing hydrocarbyl, substituted heteroatom-containing hydrocarbyl, and functional groups;
X and Y are independently selected from the group consisting of C, N, O, S, and P;
p is zero when X is O or S, and p is 1 when X is N or P;
q is zero when Y is O or S, and q is 1 when Y is N or P;
$Q^1$, $Q^2$, $Q^3$, and $Q^4$ are independently selected from the group consisting of hydrocarbylene, substituted hydrocarbylene, heteroatom-containing hydrocarbylene, substituted heteroatom-containing hydrocarbylene, and —(CO)—, and further wherein two or more substituents on adjacent atoms within Q may be linked to form an additional cyclic group;
w, x, y, and z are independently zero or 1; and
$R^3$, $R^{3A}$, $R^4$, and $R^{4A}$ are independently selected from the group consisting of hydrogen, hydrocarbyl, substituted hydrocarbyl, heteroatom-containing hydrocarbyl, and substituted heteroatom-containing hydrocarbyl,
wherein any two or more of $X^1$, $X^2$, $L^2$, $L^3$, $R^1$, $R^2$, $Q^1$, $Q^2$, $Q^3$, $Q^4$, $R^3$, $R^{3A}$, $R^4$, and $R^{4A}$ can be taken together to form a cyclic group, and further wherein any one or more of $X^1$, $X^2$, $L^2$, $L^3$, $Q^1$, $Q^2$, $Q^3$, $Q^4$, $R^1$, $R^2$, $R^3$, $R^{3A}$, $R^4$, and $R^{4A}$ may be attached to a support.

13. The method of claim 12, wherein $R^1$ and $R^2$ are taken together to form an indenylidene moiety.

14. The method of claim 12, wherein M is ruthenium, w, x, y, and z are zero, X and Y are N, and $R^{3A}$ and $R^{4A}$ are linked to form -Q-, such that the complex has the structure $$R^3-N\overset{\overset{Q}{\frown}}{\underset{X^2}{\overset{|}{\underset{|}{\overset{(L^3)_n}{|}}}}}N-R^4$$

$$X^1\underset{L^2}{\overset{|}{\underset{|}{\overset{Ru}{|}}}}=C\overset{R^1}{\underset{R^2}{\diagdown}}$$

wherein:
Q is —CR$^{11}$R$^{12}$—CR$^{13}$R$^{14}$— or —CR$^{11}$=CR$^{13}$—, wherein R$^{11}$, R$^{12}$, R$^{13}$, and R$^{14}$ are independently selected from the group consisting of hydrogen, hydrocarbyl, substituted hydrocarbyl, heteroatom-containing hydrocarbyl, substituted heteroatom-containing hydrocarbyl, and functional groups, or wherein any two of R$^{11}$, R$^{12}$, R$^{13}$, and R$^{14}$ may be linked together to form a substituted or unsubstituted, saturated or unsaturated ring;

R$^3$ and R$^4$ are aromatic;

R$^1$ and R$^2$ are independently selected from the group consisting of hydrogen, hydrocarbyl, substituted hydrocarbyl, heteroatom-containing hydrocarbyl, substituted heteroatom-containing hydrocarbyl, and functional groups; or R$^1$ and R$^2$ are taken together to form an indenylidene moiety; and X$^1$ and X$^2$ are halogen.

15. The method of claim 14, wherein:
Q is —CR$^{11}$R$^{12}$—CR$^{13}$R$^{14}$— wherein R$^{11}$, R$^{12}$, R$^{13}$, and R$^{14}$ are independently selected from the group consisting of hydrogen, C$_1$-C$_{12}$ alkyl, substituted C$_1$-C$_{12}$ alkyl, C$_1$-C$_{12}$ heteroalkyl, substituted C$_1$-C$_{12}$ heteroalkyl, phenyl, and substituted phenyl; and R$^3$ and R$^4$ are unsubstituted phenyl or phenyl substituted with one or more substituents selected from the group consisting of C$_1$-C$_{20}$ alkyl, substituted C$_1$-C$_{20}$ alkyl, C$_1$-C$_{20}$ heteroalkyl, substituted C$_1$-C$_{20}$ heteroalkyl, C$_5$-C$_{24}$ aryl, substituted C$_5$-C$_{24}$ aryl, C$_5$-C$_{24}$ heteroaryl, C$_6$-C$_{24}$ aralkyl, C$_6$-C$_{24}$ alkaryl, and halogen.

16. The method of claim 1, wherein the at least one olefin metathesis catalyst has the structure

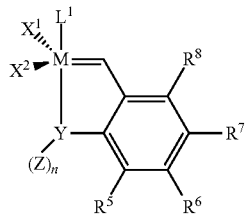

wherein:
M is a Group 8 transition metal;
X$^1$ and X$^2$ are independently anionic ligands;
L$^1$ is selected from neutral electron donor ligands;
Y is a heteroatom selected from the group consisting of N, O, S, and P;
R$^5$, R$^6$, R$^7$, and R$^8$ are each, independently, selected from the group consisting of hydrogen, halogen, alkyl, alkenyl, alkynyl, aryl, heteroalkyl, heteroatom containing alkenyl, heteroalkenyl, heteroaryl, alkoxy, alkenyloxy, aryloxy, alkoxycarbonyl, carbonyl, alkylamino, alkylthio, aminosulfonyl, monoalkylaminosulfonyl, dialkylaminosulfonyl, alkylsulfonyl, nitrile, nitro, alkylsulfinyl, trihaloalkyl, perfluoroalkyl, carboxylic acid, ketone, aldehyde, nitrate, isocyanate, hydroxyl, ester, ether, amine, imine, amide, trifluoroamide, sulfide, disulfide, sulfonate, carbamate, silane, siloxane, phosphine, phosphate, borate, and -A-Fn, wherein A is a divalent hydrocarbon moiety selected from alkylene and arylalkylene, wherein the alkyl portion of the alkylene and arylalkylene groups can be linear or branched, saturated or unsaturated, cyclic or acyclic, and substituted or unsubstituted, wherein the aryl portion of the of arylalkylene can be substituted or unsubstituted, and wherein hetero atoms and/or functional groups may be present in either the aryl or the alkyl portions of the alkylene and arylalkylene groups, and Fn is a functional group; and any combination of R$^5$, R$^6$, R$^7$, and R$^8$ can be linked to form one or more cyclic groups;

n is 1 or 2, such that n is 1 for the divalent heteroatoms O or S, and n is 2 for the trivalent heteroatoms N or P; and Z is a group selected from the group consisting of hydrogen, alkyl, aryl, functionalized alkyl, functionalized aryl where the functional group may independently be one or more or the following: alkoxy, aryloxy, halogen, carboxylic acid, ketone, aldehyde, nitrate, isocyanate, hydroxyl, ester, ether, amine, imine, amide, trifluoroamide, sulfide, disulfide, carbamate, silane, siloxane, phosphine, phosphate, or borate; methyl, isopropyl, sec-butyl, t-butyl, neopentyl, benzyl, phenyl, and trimethylsilyl; and wherein any combination or combinations of X$^1$, X$^2$, L$^1$, Y, Z, R$^5$, R$^6$, R$^7$, and R$^8$ may be linked to a support.

17. An article of manufacture prepared by the method of claim 1.

18. A composition, comprising:
at least one cyclic olefin;
at least one olefin metathesis catalyst;
at least one adhesion promoter containing at least one compound containing at least two isocyanate groups and a compound containing a heteroatom-containing functional group and a metathesis-active olefin; and
wherein the at least one compound containing at least two isocyanate groups is selected from the group consisting of methylene diphenyl diisocyanate (MDI) including any mixture of its three isomers 2,2'-MDI, 2,4'-MDI and 4,4'-MDI; liquid MDI; solid MDI; hexamethylene diisocyanate trimer; isophorone diisocyanate, 4,4'methylene bis(cyclohexyl isocyanate); polymeric MDI; MDI prepolymer; liquid carbodiimide modified 4,4'-MDI; tetramethylxylene diisocyanate; and isomers of isocyanato-[(isocyanatocyclohexyl)methyl] cyclohexane; and
wherein the compound containing a heteroatom-containing functional group and a metathesis-active olefin is selected from the group consisting of 5-norbornene-2-methanol (NB-MeOH); 2-hydroxyethyl bicyclo[2.2.1]hept-2-ene-5-carboxylate (HENB); and allyl alcohol.

19. The composition of claim 18, wherein the compound containing a heteroatom-containing functional group and a metathesis-active olefin is selected from the group consisting of 2-hydroxyethyl bicyclo[2.2.1]hept-2-ene-5-carboxylate (HENB) and allyl alcohol.

20. The composition of claim 18, further comprising at least one substrate material.

21. The composition of claim 20, wherein the substrate material is selected from the group consisting of reinforcing materials, glass fibers, glass fabrics, carbon fibers, carbon fabrics, aramid fibers, aramid fabrics, polyolefin fibers, polyolefin fabrics, polymer fibers, polymer fabrics, metallic density modulators, microparticulate density modulators, macroparticulate density modulators, and mixtures thereof.

22. The composition of claim 18, wherein the concentration of the adhesion promoter is 0.5 to 4.0 phr, based on the weight of adhesion promoter per hundred grams of base resin.

23. The method of claim 2, wherein the concentration of the adhesion promoter is 0.5 to 4.0 phr, based on the weight of adhesion promoter per hundred grams of base resin.

24. An article of manufacture comprising at least one composition of claim 18, wherein the at least one composition is subjected to conditions effective to promote an olefin metathesis reaction of the at least one cyclic olefin.

* * * * *